United States Patent [19]

Humphrey

[11] 4,180,325
[45] Dec. 25, 1979

[54] LENS METER WITH AUTOMATED READOUT

[75] Inventor: William E. Humphrey, San Leandro, Calif.

[73] Assignee: Humphrey Instruments, Inc., San Leandro, Calif.

[21] Appl. No.: 813,211

[22] Filed: Jul. 5, 1977

[51] Int. Cl.$^2$ .............................................. G01B 9/00
[52] U.S. Cl. ..................................................... 356/127
[58] Field of Search ................................ 356/124–127, 356/128; 250/237 R, 237 G, 233

[56] References Cited

U.S. PATENT DOCUMENTS

| | | | |
|---|---|---|---|
| 2,997,699 | 8/1961 | Lovell | 250/233 |
| 3,446,559 | 5/1969 | Astheimer et al. | 356/128 |
| 3,606,548 | 9/1971 | Dyson | 356/128 |
| 3,614,239 | 10/1971 | Kissell | 250/233 |
| 3,880,525 | 8/1975 | Johnson | 356/127 |

Primary Examiner—Conrad J. Clark
Attorney, Agent, or Firm—Townsend and Townsend

[57] ABSTRACT

An automated readout for a lens meter is disclosed in combination with a light beam deflecting type of lens meter such as that of a Hartman test. In such a light beam deflecting type of lens meter, a light source having one or more beams is passed through a suspect optical system and deflected by the suspect optical system to a deviated path. Measurement of the deviated path within a preselected area of excursion is typically equated to various powers of the suspect optical system in sphere, cylinder, cylinder axis, and prism. The invention provides for a means of measurement of deviated paths and includes a moving boundary locus with edges of distinctly different shape placed to intercept and occult said deflected beam in a known plane within the area of excursion at a distance from the suspect optical system. The moving boundary locus is typically arranged for movement along a predetermined path at a velocity within the known plane. The boundary locus includes a first substantially transparent portion, a second substantially opaque portion, and at least two boundaries between the opaque and transparent portions. Each of the two boundaries defines a unique nonambiguous intersection within the area of excursion for each position of the beam and sweeps the preselected area of excursion at differing angularities with respect to the predetermined path of said moving boundary locus. The beam, after leaving the moving boundary locus, is reimaged to a photosensitive detector. By the expedient of measuring the position of the moving boundary locus when the moving boundary occults the beam for two of the boundaries, the amount of beam excursion can be measured and related to optical system measurement. The detector is provided with a circuit which averages the two detector states provided by occultation. This enables lens systems of varying light transmissivity to be measured.

38 Claims, 12 Drawing Figures

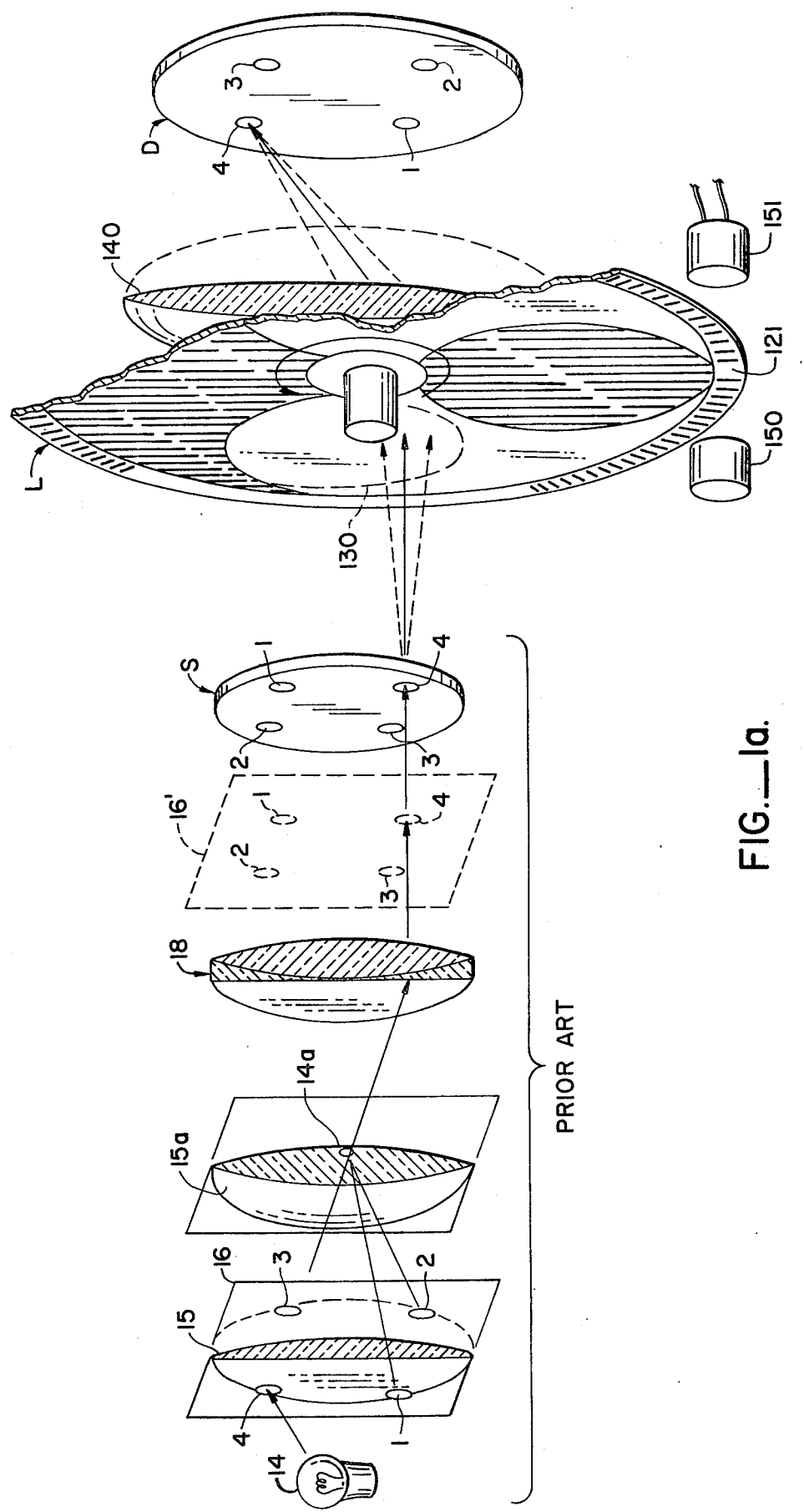
FIG._1a.

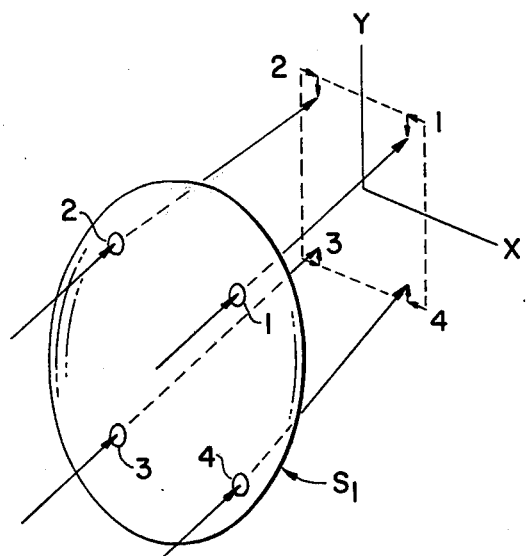
FIG._Ib.
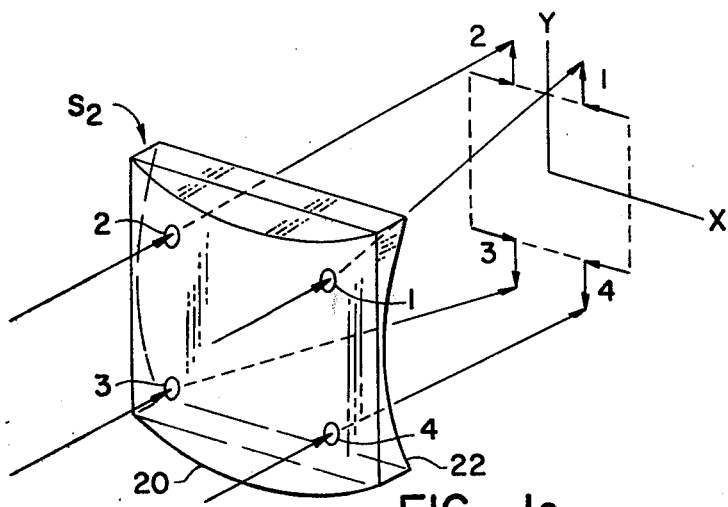
FIG._Ic.
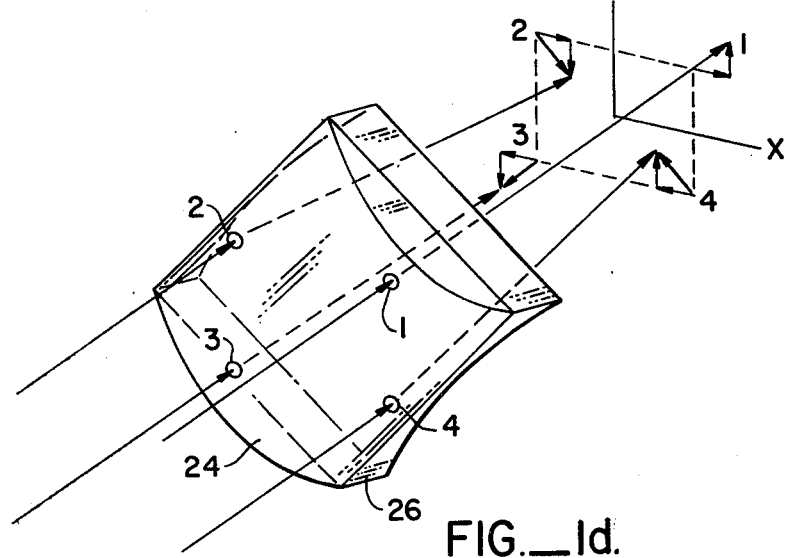
FIG._Id.

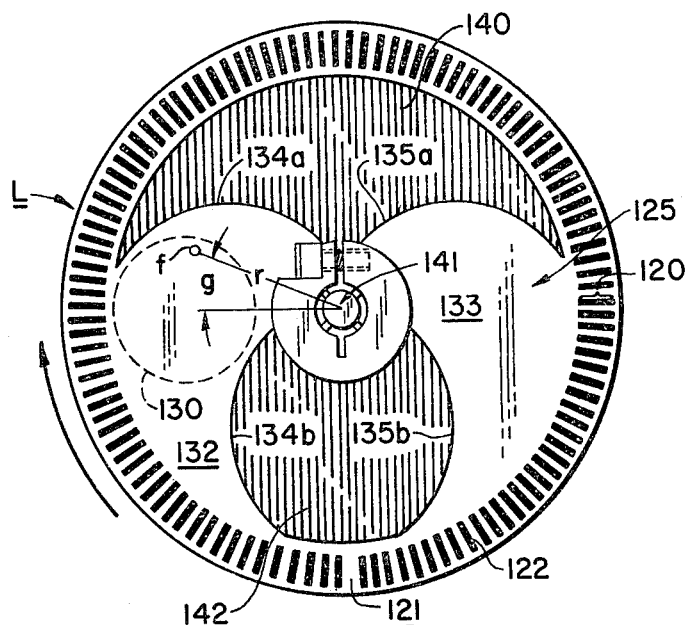
FIG._2.
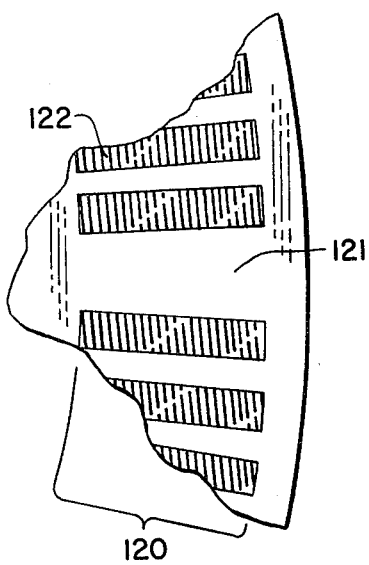
FIG._3.
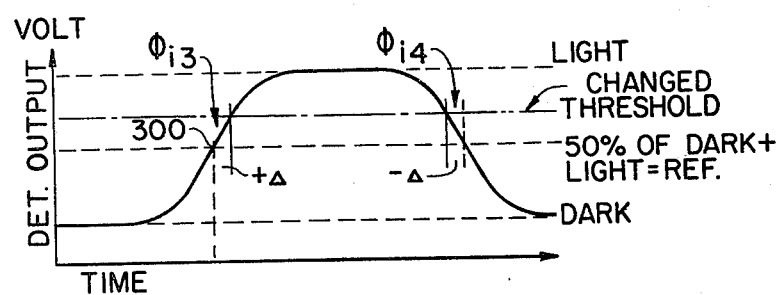
FIG._6a.
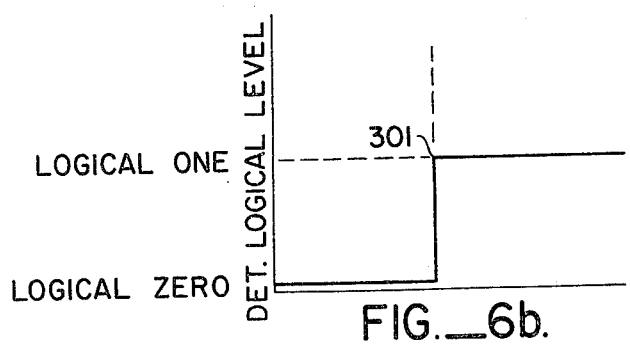
FIG._6b.
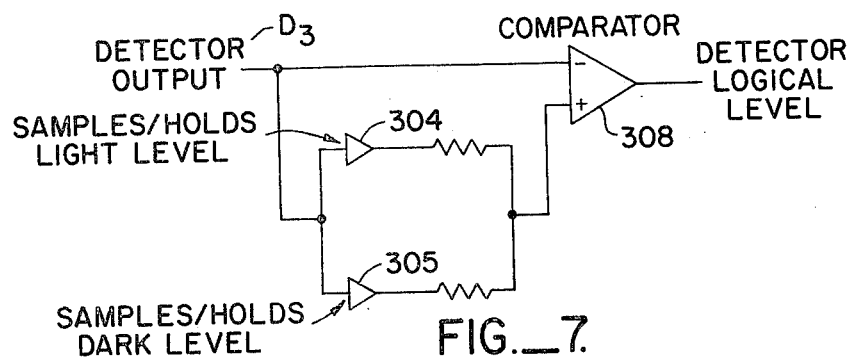
FIG._7.

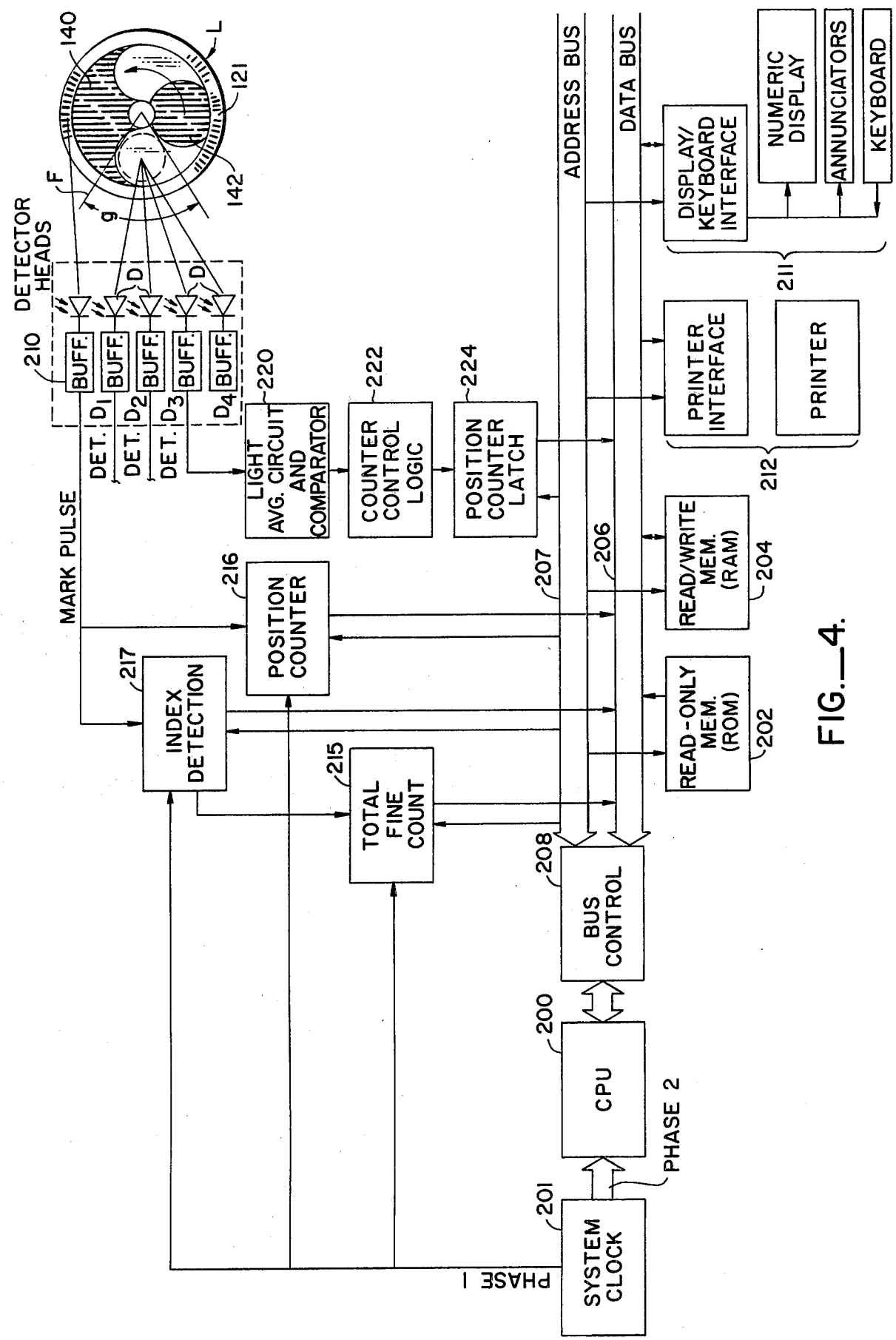
FIG._4.

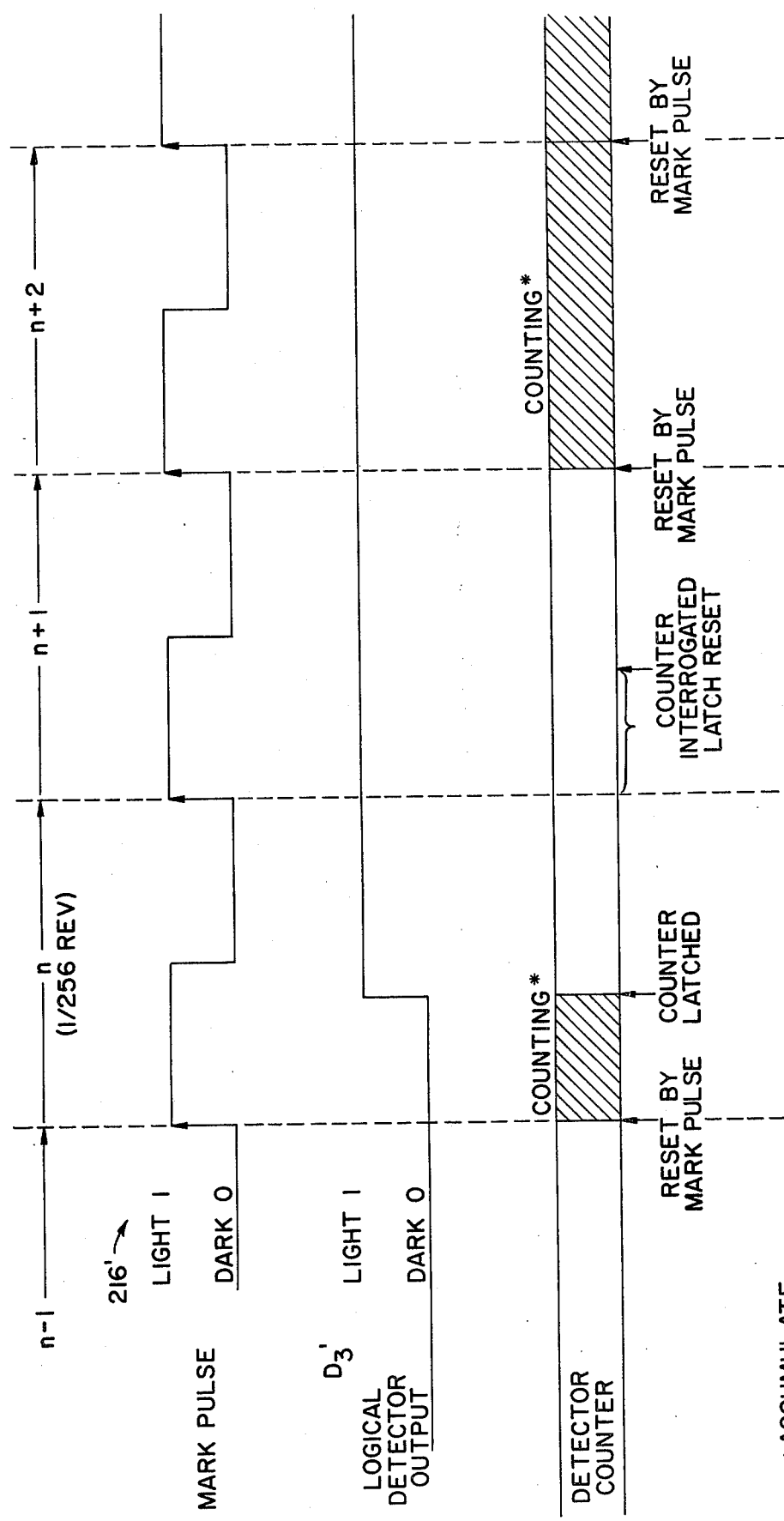
FIG._5.

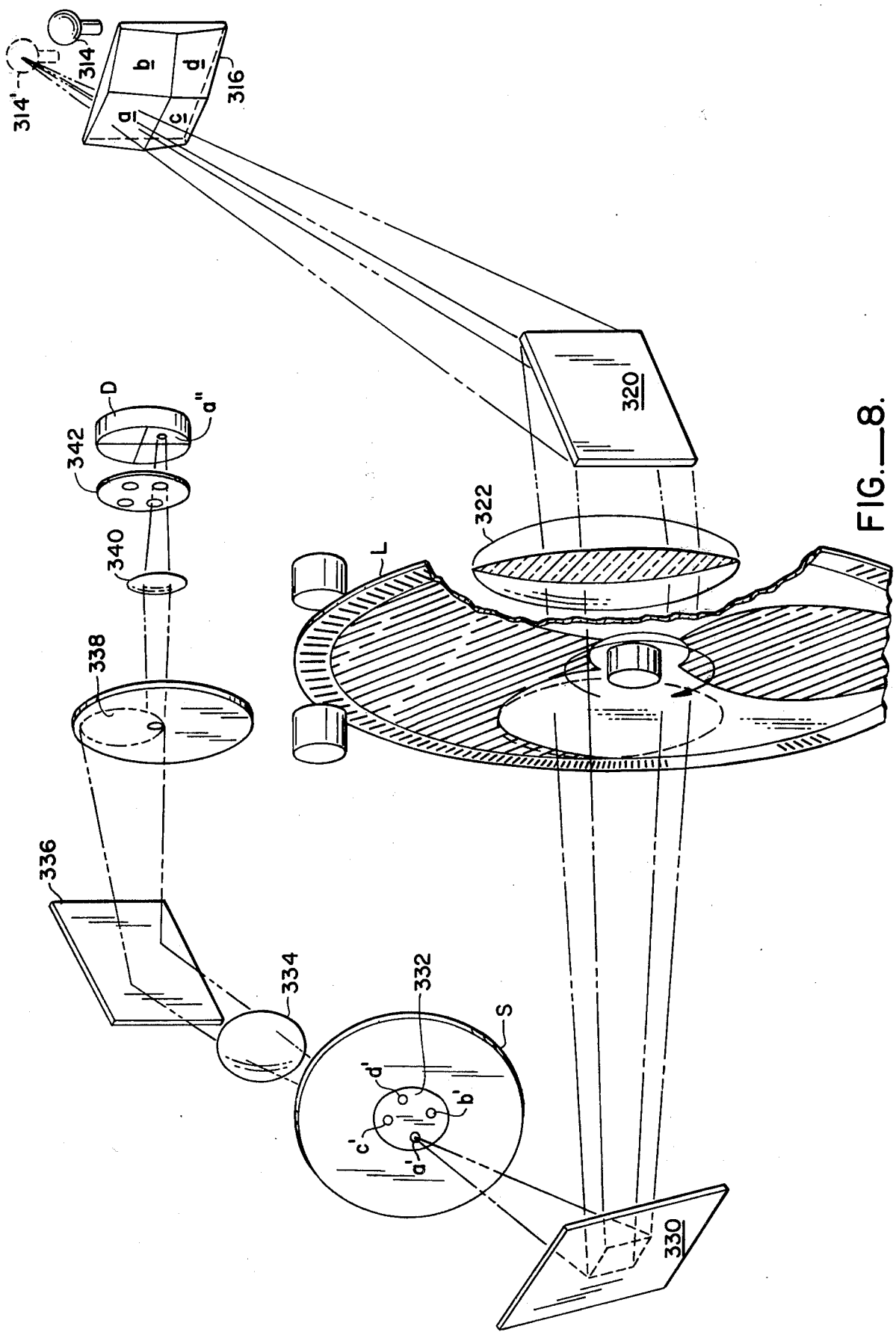
FIG._8.

LENS METER WITH AUTOMATED READOUT

This invention relates to a lens meter. Specifically, a lens meter is disclosed which can measure sphere, cylinder, cylinder axis and prism components of a suspect lens. All of these measurements can be obtained on an automated basis.

SUMMARY OF THE PRIOR ART

Conventional lens meters commonly employ what is known as a target mire. Typically, the suspect optical system is placed into the lens meter preferably at the major reference point of the suspect optical system. The imaging of a target mire occurs through a very small area of the suspect optical system, again preferably at the major reference point. In measurement, the target mire is manually rotated to be aligned with either a maximum or a minimum of meridian power in the suspect optical system. Thus, it can be seen that rotational alignment of the lens meter to a suspect astigmatic axis of the suspect optical system occurs. Once the target mire is aligned and lines within the image are focused to a maximum clairty (say, for example, to the maximum of meridian power), a first recordation is made. Thereafter, a standard lens is moved to produce focus with a second and different set of lines in the target mire image (say, to the minimum of meridian power). A second recordation is made. By the expedient of noting one reading as sphere, noting the difference between the readings as cylinder, and noting the alignment of the target mire at maximum or minimum as axis, a conventional measurement of the power of a suspect system in power of sphere, power of cylinder, and alignment of cylinder can be made.

This conventional prior art system is not without its disadvantages. First, it requires rotation of an element in the lens meter into coincidence with a principal axis of a suspect optical system. Secondly, such lens meters are not conveniently adapted to provisions for automation; a device which automatically determines the prescription provided in a pair of glasses cannot be easily designed around their operation. Third, when the target mire is rotated to focus at maximum meridional power, portions of the target mire image for minimum meridional power are obscured. Conversely, when the target mire for minimum meridional power is in focus, the portion of the target mire image for maximum meridional power is obscured. Additionally, such conventional lens meters are only effective through a small segment of a lens for which the prism deviation is small. Uniformity of the entire lens is commonly not analyzed without numerous repetitions of the original process. Where lenses are moved to sample other points on their surface, the entire measurement procedure must be repeated, usually with the manual addition of compensating prism power.

It should be additionally noted that such prior art lens meters can be in error by a factor which is directly proportional to any error in the eye of an operator utilizing the lens meter. It has been discovered that astigmatic errors can vectorially add. Thus, where an operator with an astigmatic error looks through a conventional lens meter, his reading of the suspect optics can be off by a factor related to the operator's personal astigmatism. Similarly, the operator's spherical correction may alter the readings. While such an error will decrease with the increasing power of a telescope commonly affixed to and associated with such lens meters, it should be understood that such an error can and often is introduced into the analysis of a suspect optical system by a conventional lens meter.

"A Process and Apparatus For the Astigmatic and Spherical Subjective Testing of the Eye," U.S. Pat. No. 3,947,097, issued Mar. 30, 1976, has been developed by me. Regarding the testing of the lenses, this prior art patent is complicated by two factors. First, the eye in viewing a distant object spherically accommodates or "hunts." This "hunting" of the eye for an image at the retinal plane renders the process therein disclosed generally not satisfactory for lens measurements.

Secondly, the aforementioned process and apparatus requires either relatively moving cross cylinders or specifically designed lenses, especially for the astigmatic measurements. Specifically, relatively moving special lenses such as those shown in my "Variable Astigmatic Lens and Method For Constructing Lens." U.S. Pat. No. 3,751,138, issued Aug. 7, 1973, are used. It should be noted that when these lenses are used, translation of the elements must occur for the disclosed process.

Additionally, it has been shown that by utilizing cross cylinders, astigmatism can be described in elements of cross cylinder with the cross cylinder axis being preferably aligned 45° one to another. Once this description is shown, the resultant components of astigmatism can vectorially add. Heretofore, however, all such processes either use relatively moving cross cylinders for the measurement or special lens elements such as those previously described. While astigmatic measurement can occur which is independent of sphere, instruments incorporating these relatively moving special optics are complex.

Finally, apparatus for measuring light beam excursion using a rotating disk is known. However, such devices have heretofore included a radial boundary. While measurement of the change of angle from the center of rotation of the disk has been possible, variations in distance towards and away from the center of disk rotation have not been detected. See Johnson U.S. Pat. No. 3,880,525 at Column 2, lines 9–36.

SUMMARY OF THE INVENTION

An automated readout for a lens meter is disclosed in such a light beam deflecting type of lens meter, a light source is passed through a suspect optical system and deflected by the suspect optical system to a deviated path. Measurement of the deviated path within a preselected area of excursion is typically equated to various powers of the suspect optical system in sphere, cylinder, cylinder axis, and prism. The invention provides for a means of measurement of deviated paths and includes a moving boundary locus with edges of distinctly different shape placed to intercept and occult said deflected beam in a known plane within the area of excursion at a distance from the suspect optical system. The moving boundary locus is typically arranged for movement along a predetermined path at a velocity within the known plane. The boundary locus includes a first substantially transparent portion, a second substantially opaque portion, and at least two boundaries between the opaque and transparent portions. Each of the two boundaries defines a unique non-ambiguous intersection within the area of excursion for each position of the beam and sweeps the preselected area of excursion at differing angularities with respect to the predetermined path of said moving boundary locus. The beam, after leaving the moving boundary locus, is reimaged to a photosensitive detector. By the expedient of measuring the position of the moving boundary locus when the moving boundary occults the beam for two of the boundaries, the amount of beam excursion can be measured and related to optical system measurement. In the preferred embodiment, four boundaries are employed, and the detector is provided with a circuit which averages pairs of detector states provided by occultations. This enables lens systems of varying light transmissivity to be measured with increased precision.

OTHER OBJECTS AND ADVANTAGES OF THE INVENTION

An object of this invention is to disclose an apparatus to measure the amount of deflection caused by the refraction of the beam through a suspect optical system. According to this aspect of the invention, a moving boundary locus is placed to intercept and occult the deflected beam in a known plane covering an area of beam excursion, this known plane being at a preselected distance from the suspect optical system. The moving boundary locus is typically arranged for movement along a predetermined path at a velocity within the known plane. The boundary locus includes a first substantially transparent portion, a second substantially opaque portion, and at least two boundaries between the opaque and transparent portions, each of these boundaries having edges of distinctly different shape. Each of the two boundaries sweeps the preselected area of excursion at differing angularities to define a unique non-ambiguous intersection within the area of excursion for each position of the beam with respect to the path of the moving boundary locus. By the expedient of focusing the beam to a detector, measuring the instant of boundary occultation and the precise position of the moving boundary locus, angular excursion of the beam can readily be determined.

An advantage of this process and apparatus is that readout of the angular beam deflection can be determined on a substantially instantaneous basis.

A further advantage of this invention is that the readout is not subject to "hunting." The optical system does not require telltale indications to move towards and away from the positions of optimum focus.

A further object of this invention is to relate the position of beam excursion to time. According to this aspect of the invention, the velocity of the moving boundary locus is maintained substantially constant. By timing the intervals to detector signals, the positions of the moving boundary locus become known and excursion of the beam can be determined as a function of time.

An advantage of this aspect of the invention is that once beam excursion is determined as a function of time, it may be readily measured and analyzed by computer apparatus and the like.

A further advantage of this invention is that the locus can be placed at a wide variety of locations in a light path. For example, occultation of a collimated beam can occur. Likewise, occultation of a divergent or convergent beam can occur.

A further object of this invention is to disclose an apparatus for simultaneously detecting the excursion of the plurality of beams passing through a suspect optical system. According to this aspect of the invention, a plurality of beams are passed through the suspect optical system and then onto occultation at the moving boundary locus. These beams are in turn focused immediately after their passage through the moving boundary locus to discrete detectors, one for each beam. By the expedient of focusing each beam at its own detector, deflection of a plurality of beams can be measured by the disclosed apparatus.

An advantage of this aspect of the invention is that excursion of one beam does not optically interfere with the excursion of remaining beams. For example, four discrete beams can all be detected for occultation at the same location by the moving boundary locus and then pass on to their discrete detectors. Separate sequential use of separate sequential beams is not required.

An object of this invention is to set forth the general parameter of a rotating moving boundary locus which can measure two dimensional excursions of a beam within a plane. Where the plane includes a rotating moving boundary locus having substantially opaque and substantially transparent portions at least two boundaries therebetween, such boundaries should have the relation where $d\theta/dr$ of one boundary is algebraically larger than the value $d\theta/dr$ for the other boundary (where $\theta$ is angle and r is radius). Both of these relations should hold true for any value of r (radius) with the expected area of excursion. It is preferred, but not required, that the sign of $d\theta/dr$ does not change.

A further object of this invention is to set forth the general parameter of a translating moving boundary locus which can measure two dimensional excursions of a beam within a plane. Where the plane includes a translating boundary locus translating in the X direction of a Cartesian coordinate system having a substantially opaque portion, a substantially transparent portion and at least two boundaries therebetween, such boundaries should have the relation where $dx/dy$ of one boundary is algebraically larger than the value $dx/dy$ for the other boundary. Both of these relations should hold true for any value of y within the expected area of excursion. It is preferred, but not required, that the sign of $dx/dy$ not change.

An advantage of this invention is that the disclosed readout apparatus can be used with conventional Hartman test type optics. By the expedient of measuring beam excursion at the moving boundary locus, automated readout may be simply obtained from Hartman type optics.

A further object of this invention is to disclose a preferred embodiment of a moving boundary locus to provide the edges of distinctly different shape. According to this aspect of the invention, the moving boundary locus rotates about an axis. The rotating boundary locus includes a substantially transparent portion, a substantially opaque portion, with two boundaries therebetween. One boundary is laid out in accordance with the general mathematical formula $R=k\theta$; the other boundary is laid out according to the general mathematical formula $R=k\theta$. By the expedient of measuring once an occultation at each boundary, lens measurement can be effected.

An advantage of this aspect of the invention is that the moving boundary locus can rotate at constant rotational velocity; relatively simple movement of the moving boundary locus can be effected.

A further advantage of this aspect of the invention is that the moving boundary locus can be designed for an multiplicity of optical solutions. By the expedient of putting on four boundaries, multiple occultations with resultant checks of beam deflection can be obtained.

A further object of this invention is to disclose a moving boundary locus which is particularly adaptable to the measurement of suspect optical systems having varying amounts of transmissivity. According to this aspect of the invention, the moving boundary locus is provided with four boundaries, two boundaries defined according to the equation $R=k\theta$ and the remaining two boundaries defined according to the equation $R=-k\theta$. These boundaries are rotationally positioned so that the substantially transparent portions of the moving boundary locus pass light to the detectors for one-half of the time, and block light passage to the detectors for the remaining half of the time. By the expedient of connecting an integrating circuit to the detector and causing occultation to be indicated by passing the average light detected value integrated over at least one full cycle of locus rotation, a highly sensitive detector with uniform output for a wide variety of suspect optical system shadings is obtained.

An advantage of this aspect of the invention is that it is peculiarly suited for the measurement of all types of suspect optical systems having varying light transmissivity. For example, eyeglasses containing either constant or variable shadings can easily be measured. This measurement of varying light transmissivity suspect optics can occur remotely and does not require any variability in the intensity of the measuring beam. Moreover, calibration to "shaded" lenses is automatic; individual manual adjustment is not required.

A further object of this invention is to disclose the use of the automated readout of this invention in combination with a number of different lens meter embodiments. According to this aspect, a lens meter including a light source emanating either a substantially collimated beam of light, or divergent or convergent light can be used.

Additionally, the moving boundary locus method may be employed to automate other optical tests such as the Hartman type optical analysis. The Hartman method is the experimental equivalent to an optical ray trace in which the location of ray bundles passing through an array of apertures adjacent to a test lens are determined through knowledge of the bundle positions at two or more planes (one plane being, for example, the plane of the suspect optics). In the use of the moving boundary locus method, these bundle positions at a given plane may be measured simultaneously for an arbitrary arrangement of apertures, each of which will be imaged to its own individual photoreceptor. Thus, there is no confusion regarding which bundle is being measured, as each bundle measurement is associated with its own unique photodetector. This is an advantage over some other embodiments (photograph for example) of Hartman type tests in which sometimes there is confusion as to which bundle is which when their positions are measured. As applied to the specific problem of measuring ophthalmic lenses, the same mathematical analysis presented here is possible employing sums or differences of the measured positions of suitable bundles traversing a measuring plane in a Hartman configuration.

A further advantage of this invention is that the suspect optics do not have to be rotated to any particular alignment. Rather, the suspect optics can be placed in the lens meter apparatus arbitrarily with respect to any suspect principal axes.

Yet a further advantage of this invention is that the change in beam angularity is particularly suited for automated readout. By translating the automated readout—here shown in polar coordinates—to conventional Cartesian coordinates, sphere and related cylinder together with angle can be determined.

Yet another advantage of this invention is that specialized lenses having compound and complex optical surfaces are not required. Rather, the lens meter of this invention together with its automated readout apparatus includes only conventional optics which are easily obtained.

A further object of this invention is to disclose an apparatus and process for measuring suspect lenses that does not require operator participation. According to this aspect of the invention, a suspect lens is merely placed within a predetermined viewing path. Once placed, measurement occurs in a small timed interval. Translation of the lens with respect to the measurement apertures can rapidly measure uniformity of the lens. The translation of the suspect optics effects only a variation in prism measurement as the optical center of the lens system is shifted in determining lens uniformity.

An advantage of this aspect of the invention is that optical errors of an operator cannot add in the measurement of the suspect optics. For example, where the operator participates optically in measurement, he must include his own refractive corrections. Some error can result. Moreover, algebraic computational and recording errors of operators in utilizing prior art devices can be completely avoided.

A further object of this invention is to disclose a lens meter which measures astigmatism and cross cylinder. According to this aspect of the invention, the beam excursion at the boundary locus is broken down into cross cylinder components. By the disclosed logic, this beam deflection results both in the measurement of sphere and cross cylinder together with the related axis angle.

An advantage of this aspect of the invention is that the discrete measurements of astigmatisms are separated one from another and are suitable for algebraic summation.

Yet another advantage of this invention is that the algebraic summation can rapidly be accommodated by conventional electronic techniques to resolve beam angularity into lens sphere, cylinder and related cylinder axes.

Still another advantage of this invention is that the presence of lens powers other than conventional sphere, cylinder and prism can be detected. When such other lens powers are located, provision can be made to indicate the presence of such other powers.

Other objects, features and advantages of this invention will become more apparent after referring to the following specification and attached drawings in which:

FIG. 1a is an optical schematic diagram illustrating Hartman type optics projecting spaced apart beams through a suspect lens with the beams being measured for excursion by the moving boundary locus of this invention and focused to a photodetector indicating actual beam excursion through beam occultation when the precise rotational interval when the precise rotational interval of the moving boundary locus is known;

FIG. 1b is an optical schematic of a positive spherical lens within the apparatus of the FIG. 1a illustrating the excursion of the light beams caused by the positive spherical lens;

FIG. 1c is an optical schematic of a 0°–90° cross cylinder lens inserted within the optics of the apparatus of FIG. 1a, illustrating the excursion of the light beams caused by the 0°-90° cross cylinder lens;

FIG. 1d is an optical schematic of a 45°-135° cross cylinder lens within the optics of the apparatus of FIG. 1a, illustrating the excursion of beams passing through the optics;

FIG. 2 illustrates the moving boundary locus of this invention with the preferred edges of distinctly different shape being imparted to the boundaries;

FIG. 3 is an enlarged detail of the peripheral portion of the moving boundary locus, illustrating individual marker spacing for establishing the precise rotational position of the moving boundary locus;

FIG. 4 is a schematic of a central processing unit type computer connected to the moving boundary locus of this invention, the computer determining the precise excursion of a detected beam within the plane of the moving boundary locus;

FIG. 5 is a timing diagram useful in understanding various interrogations of the angular interval of the moving boundary locus;

FIGS. 6a and 6b are graphical time diagrams, illustrating the light averaging capability of this invention for sensing the occultation of light where lenses of various shadings are utilized in the optics of this invention;

FIG. 7 is a simplified diagram illustrating the use of a sampling circuit for detecting the time of occultation of a light beam; and, FIG. 8 illustrates the moving boundary locus of this invention utilized in a light system having non-collimated light beams, the occulations here occuring in converging light.

In order to provide organization to the following patent application, applicant will first discuss the Hartman type optics. Samples of suspect lenses will be illustrated so that the mathematics associated with the Hartman type test can be understood.

The moving boundary locus will then be discussed. This locus will be analyzed.

Thereafter, associated computer circuitry for the detection of the angular interval of occultation by the moving boundary locus will be set forth.

Finally, the conversion of the angular interval—which will typically be framed in terms of time interval—to conventional lens power of sphere, cylinder, axis and prism will be discussed.

Finally, it will be emphasized that the moving boundary locus of this invention is not confined to Hartman type optics. Reference will be made to FIG. 8 to show that the locus works equally well in convergent or divergent light.

HARTMAN TYPE OPTICS

Referring to FIG. 1a, Hartman type optics are illustrated. These optics are state-of-the-art following from that procedure first identified by J. Hartman in 1904, set forth in Z Instrum K de, 24,1,33,97 (1904). Simply stated, the Hartman test is a test for spherical aberration, coma, astigmatism, prism, and the like. In this test, incident rays from a point source (typically located at an infinite distance) are isolated by small holes. Typically, the small holes are in a metal disk located close to the lens or mirror under test. After the rays from a point source have impinged upon or passed through the mirror or lens under test, the rays are examined for excursion. Various schemes have been used to measure such excursion. The moving boundary locus of this invention is such a scheme for measuring excursion.

In a Hartman type test, one of the most convenient point sources of light to use is a distant star. As is well known in the art, such distant point sources of light can be artificially created. This much is clearly suggested in Strong, "Concepts of Classical Optics," W. H. Freeman and Company, San Francisco, 1958, at FIG. 16-1 and pp. 351–372.

One of the numerous schemes of simulating a point source of light is set forth in the article entitled "A Spot Diagram for Generator Lens Testing" by T. L. Williams in *Optica Acta*, 1968, Vol. 15, No. 6, pp. 553–566. The portion of FIG. 1a labeled prior art is an adaption of FIG. 2 of this prior art article.

A point source of light is emulated in FIG. 1a by a light source 14, which is typically a high-intensity source 14. To assume collimination, light source 14 impinges upon a condensing lens 15 of the plano-convex variety after passage through aperture 14a and relay lens 15a. Before reaching aperture 14a, it passes through a metal disk 16 having four holes, 1 through 4 arrayed here in precise 90° intervals on the metal plate. It can be seen that four discrete light beams pass through plate 16. Preferebly, plate 16 is juxtaposed to condensing lens 15.

Light source 14 is typically provided with heavy electrical filtering and is a direct current type light source. This is because modulation of any light emanating from the light source will ultimately produce "noise" or unwanted light modulation at photodetectors used with this invention. When an occultation is occurring, such noise could give a false indication of an occultation and interfere with instrument accuracy.

Light passing through condensing lens 15 and mask 16 is typically collimated by a collimator lens 18. At collimator lens 18, the discrete collimated beams from the respective holes 1 through 4 are passed to the suspect optics S. From suspect optics S, they pass through the moving boundary locus L, focusing lens 140 and onto a photodetector D.

It should be understood that disk 16 can be alternately located. For example, disk 16 can be located to the position $16^1$ shown in broken lines between suspect optics S and condensing lens 18.

It will be immediately understood by the viewer, the collimated rays will pass from the condensing lens system through the suspect optics. At the suspect optics, deflection will occur. This deflection will be a function of the power of the suspect optics.

Compared to the conventional Hartman test, it can be seen that the condensing lens 15 and collimating lens 18 are, in effect, an artificial star. They produce light as if it came from an infinitely distant point source such as a star.

Having set forth the simple optics necessary for producing sampling beams through a suspect lens S, the effect that the suspect lens S can have on such beams will be simply illustrated.

Referring to FIG. 1b, suspect optics S are shown in the form of a spherical lens S1. As is well-known in the art, spherical lens S1 will cause light to be deflected inwardly. This is shown in FIG. 1b with respect to a Cartesian coordinate axis system. Writing such deflection in an algebraic equation will give the general expression for spherical equivalent (Seq)

$$Seq = -X_1 + X_2 + X_3 - X_4 - Y_1 - Y_2 + Y_3 + Y_4$$

where, $X_1$, $Y_1$ are the deflections of light ray 1 with remaining deflections being correspondingly identified. For simplicity, a factor of proportionality between sphere power and deflection has been assumed as unity; hence, does not appear in these relations.

Referring attention to FIG. 1c, deflection produced by cross cylinder lenses is illustrated. Specifically, suspect optics S2 are shown comprising a positive cylinder 20 aligned along the 90° axis or Y axis and a negative cylinder 22 aligned along the 0° axis or X axis. Typically, such lens elements are composite and exclude the illustrated optical interface between them—this interface being shown only for ease of understanding.

Adopting the same convention, the 0°–90° cylinder ($C_+$) can be expressed $$C_+ = 2(+X_1 - X_2 - X_3 + X_4 - Y_1 - Y_2 + Y_3 + Y_4)$$

where, $X_1, Y_1$ are the deflections of light ray 1 and the corresponding deflections of the remaining light rays are correspondingly illustrated.

It is known that cross cylinder lenses can vectorially add. For example, see my U.S. Pat. No. 3,822,932 issued July 9, 1974, entitled "Optometric Apparatus and Process Having Independent Astigmatic and Spherical Inputs."

FIG. 1d illustrates a positive cylinderical lens 24 at 45° of angularity and a negative cylinderical lens 26 at 135° of angularity. The optical interface between lenses 24, 26 is shown for ease of understanding only. Where $C_x$ equals 45°–135° angularity, the algebraic equation for such deflection may be written $$C_x = 2(+X_1 + X_2 - X_3 - X_4 + Y_1 - Y_2 - Y_3 + Y_4)$$

where, the X and Y coordinate deflections are written as before.

It will be appreciated that the above algebraic expressions when combined will locate the powers of most eyeglass lenses. Specifically, sphere, cylinder, cylinder axis will all be a function of the above-expressed general equations. However, lenses can be in forms other than sphere, cylinder and prism. If they are, it is important to be able to know that the lenses are not conventionally described and alert the operator to this fact.

Such lenses can be generally detected by the following equations:

$$CA = +X_1 + X_2 - X_3 - X_4 - Y_1 + Y_2 + Y_3 - Y_4$$

$$PV_1 = -X_1 + X_2 - X_3 + X_4 - Y_1 + Y_2 - Y_3 + Y_4$$

$$PV_2 = +X_1 - X_2 + X_3 - X_4 - Y_1 + Y_2 - Y_3 + Y_4$$

where, CA is proportional to circular stigmatism, $PV_1$ and $PV_2$ are proportional to components of power variation across the lens surface.

Regarding circular astigmatism (CA), the refractive vergence resulting from combining a series sphero-cylinder lenses used in tandem can usually be adequately expressed in terms of equivalent lens effects of some simpler sphero-cylinder lens in an appropriate lens plane. This is possible because a pair of sphere lenses used in tandem can be expressed as another "effective sphere" by well-known formulae, or a sphere and cylinder may be similarly "combined" to an equivalent sphere-cylinder using similar formulae for the appropriate meridians. However, this convenient equivalent for several lenses used in tandem is not universally true.

The usual formulae for combining lens effects apply to a pair of cylinders of similar oriented axes, to yield a new equivalent lens. However, cylinder lenses whose axes are not aligned lead to new optical effects not expressible in terms of simple sphero-cylinder lens effects. The effects that depart from those generated by conventional lenses will be called "circular astigmatism." The size of the effect (circular astigmatism) generated by a pair of obliquely aligned cylinders is fully comparable to the effects normally generated by the separation of thin lenses, i.e., the circular astigmatism is proportional to the power of each cylinder and their separation. Fortunately, this is usually a small power in the most important case of the structure of the human eye and can usually be neglected as a factor in human vision.

Regarding power variations associated with the quantities $PV_1$ and $PV_2$, these types of lens power variations are illustrated by those lenses shown and described in U.S. Pat. No. 3,507,565 issued Apr. 21, 1970 to Luis W. Alverez and William E. Humphrey, entitled "Variable Power Lens and System at Selected Angular Orientations," and U.S. Pat. No. 3,751,138 issued Aug. 7, 1973 by myself, entitled "Variable Astigmatic Lens and Method for Constructing Lens." As will readily be appreciated by those skilled in the optic arts, these lenses include spherical and cylindrical lens properties which are variable over the surface of the lens. Additionally, other types of lenses can produce these type of variable sphere and cylinder powers. For example, bifocals registered at the optical boundaries so that one lens registers to at least one aperture and the remaining lens registers to the remaining apertures can produce such an indication of lens power variation.

I have found generally that if multiple $$[(S)(CA)] < 0.2$$

$$[\sqrt{(PV_1)^2 + (PV_2)^2}](S) < 0.3$$

then, the overall powers of the lens system as measured will not be appreciably affected. The terms S will be hereinafter described.

It should be appreciated in the above equations, three light beams required to identify a solution in sphere, cylinder, cylinder axis and prism. However, determination of power variations (PV), increased data for precision and checking giving commercial photodetector with four detectors make arrays preferred.

Having given the general equation parameters, attention may now be directed to the configuration of the moving boundary locus L.

Moving Boundary Locus

Having set forth the overall optical scheme of this invention, attention can now be directed to FIG. 2. Referring to FIG. 2, a preferred embodiment of the moving boundary locus in the form of a rotating disk is illustrated.

Moving boundary locus L is made of a transparent material such as glass. The disk is provided with two broad information areas. The first such area is a border area 120 which defines disk rotation. The second area comprises the internal area 125 of the disk which occult the deflected light beams.

Border area 120 consists of a group of discrete notches 122 placed in a preselected angular spatial relationship around the periphery of the glass disk. In this case, they are placed at a spatial interval of 256 notches to the revolution. The function of notches 122 is for precise rotational location of the disk. When this precise rotational location of the disk is identified in combination with the impingement of light at detector 150 (see FIG. 1a), precise angular measurement can occur. Rotational reference is made to a missing notch at interval 121. As will hereinafter be set forth, by electronic recognition of this interval through time sensing circuitry, precise rotational positioning of locus L at time of occultation can be determined.

It should be understood that border area 120 can consist of a number of embodiments. For example, a multi-bond binary encoding disk, such as manufactured by Baldwin Electronics, Inc. of Little Rock, Arkansas, could be used to determine precise rotational location of the moving boundary locus L.

The respective beams pass through an area shown in broken lines 130. In accordance with the explanation of FIG. 1a, excursion of the beams within the area is to be expected from the total vocabulary of suspect lenses S which can be placed within the meter of this invention. It is the position of the excursion of the beam which the moving boundary locus determines and measures.

The position of the beams as they pass through the disk in area 130 can readily be determined. In explaining how this segment of the invention works, attention will first be given to the parameters of the disk and a discussion of the boundaries between the opaque and transparent areas. Secondly, the function of how these areas work will be set forth. Finally, the general case for such moving boundary locus will be explained.

Broadly, the rotating boundary locus includes two transparent areas and two opaque areas. Turning attention to the transparent areas 132, 133, each one of these areas includes a boundary which can be described by the equation $R = k\theta$ (for boundaries 134a and 134b) and $R = -k\theta$ (for boundaries 135a and 135b).

Each of the boundaries 134a and 134b on one hand, and 135a and 135b on the other hand, are separated by a precise angular interval of 90°. Thus, it can be seen that the transparent portion of the moving disk as it passes any one spot within the area 130, passes light for one-half of the time and does not pass light for the remaining one-half of the time. This feature will hereinafter be emphasized in importance as cooperating with a light averaging circuit. Although other means of light averaging may also be employed to advantage, this light averaging circuit makes possible the measurement of suspect optics and lenses having various shadings and resultant varying light transmissivity.

Referring to the upper opaque portion 140, it will be seen that the opaque area gradually increases in occupied angular interval with movement away from the axis 141 of the rotating boundary locus. This is because the respective boundaries 134a and 135a occupy an increasing angular interval of the disk as the distance radially outward from axis 141 increases.

Portion 142 is of the opposite construction. Specifically, the angular interval between the curves 134b and 135b decreases with outwardly moving radial distance from the axis of rotation 141.

Assuming that a beam passes through the disk at a distance r and an angle $\theta$, the passage of the beam can be intuitively understood before considering the more general case of the mathematics disclosed herein. Specifically, and for changes of the distance r towards and away from axis 141, it will be seen that the time during which the beam is obscured by the respective opaque surfaces 140 and 142 can be determined. In the case of opaque surface 140, the longer the obscuration of the beam by the surface 140, the further away from the axis 141 will be the location of the beam. In the case of opaque surface 142, the shorter the obscuration of the beam, the further away from the axis 141 will be the beam. Thus, the opaque surfaces each provide discrete angular intervals which indicate the polar coordinates r of the beam away from the rotational axis 141.

Referring to the angle of the beam about axis 141, the integrated angle interval between the recordation of missing notch 121 and two opaque to transparent boundaries can be used to determine angularity. For example, by observing boundaries 134a and 135a as they respectively pass the beam, it will be observed that the average of their angular excursion measured from the recordation of notch 121 will provide an exact measure of beam position as angle about axis 141. This rotation can be measured with extreme accuracy. By relating this rotation interval to the precise rotational interval of the tracks 120, migration of the beam in angle $\theta$ can readily be determined.

It will be apparent that more than the four boundaries here shown can be utilized. For example, six boundaries could be used. Likewise, the opaque and transparent portions of the boundaries could be reversed.

It will be noted that each of the respective transparent areas 132, 133 and opaque areas 140, 142 is of a chosen size to completely occupy the expected area of beam excursion 130. A reset at the peripheral area 120 by missing notch 121 should only occur when one of these areas completely occupies the expected area of excursion 130. Otherwise, radical numerical value shifts will occur with slight angle changes making the resultant calculations hereinafter illustrated much more difficult.

Attention can now be devoted to each of the four shown apertures utilized at the suspect optics.

Preferably in FIG. 1a, the diaphrams aperture 1-4 are 15 mils. in diameter. An optimum range of each of the apertures 1-4 could be from 10 to 60 mils. with an aperture as small as 5 mils. and an aperture as large as 100 mils. operable.

It should be noted that the upper and lower limits of the aperture size are controlled by two parameters. Where the aperture becomes smaller, defraction defects can be present. With defraction defects, the downstream of light path to detector D becomes distorted due to optical interferences and becomes unreliable.

Where the aperture 16-1 in diaphragm 16 increases in size, an increasing sample of a lens will be taken. As most lenses vary in optical effect over their surface areas, the downstreams cones of light will be correspondingly geometrically distorted as the sample area increases. It has been found that with eyeglasses, once this area exceeds 100 mils. optical geometric distortion prevents sensing by occultation with accuracy by moving boundary locus L.

Having set forth the migration of the beam, the more general case can now be explained.

It should be apparent to the reader that the moving path of a boundary locus according to this invention can vary widely. For example, the moving path could be linear and comprise a series of boundaries all sequentially passing the area of expected beam excursion. Likewise, the boundary locus could be painted on the exterior of a transparent revolving cylinder. Light could be deflected through the sidewalls of the cylinder with occultation of a beam occurring with boundaries painted on the cylinder sidewalls. It is to be understood that the rotational disk embodiment here shown is a preferred example.

The boundary here illustrated comprises successive opaque and transparent areas on the surface of the disk. It should be understood that absolutely transparent or absolutely opaque areas are not required for the practice of this invention. Varying surfaces can be used so long as they are all capable of passing there through a beam of light which can be intercepted without appreciable degradation by a detector. Likewise, lights of various colors could be used in combination with color discriminatory filters. For example, a combination of lights and narrow band pass filters could be used to successively pass various beams. These beams, when passed, could be measured in timed sequence at a single detector plane.

The boundaries cannot be parallel to the intended path of movement of the boundary locus. In such a case, there would be no sweeping of the area of excursion and no detection of the beam.

It is required that the two boundaries differ with one another to be boundaries of distinctly different shape. This differing in angularity requires that each boundary sweep the area of intended beam excursion and that the two boundaries, when occultation occurs, form a common point of intersection. This common point of intersection can define the point of excursion of the beam.

Regarding the moving boundary locus, it is preferred that the boundary move at a known and constant speed. When moving at a known and reasonably constant speed, the equation for determination of the location of the beam can be reduced to one of time combined with knowledge of position from the marks 121 and 122. That is to say, by observing the time of respective occultations, precise location of the beam excursion can be measured. Once excursion is known, the resultant prescription can be obtained.

The particular configuration of the moving boundary locus illustrated in FIGS. 2 and 3 is preferred. In actual practice, the boundary can have other configurations.

As a practical matter, it is important that at least two of the boundary contours must be employed. The slope of one of these boundary contours must be algebraically larger than the other with respect to the direction of translation of the boundary across the light path. Such a slope gives the boundaries a non-ambiguous point of intersection, which non-ambiguous point of intersection insures accurate location of the beam within a suspected area of excursion, for example, the area 130 in FIG. 2.

It has been found convenient that the slope not change its sign. If the slope is chosen so that a sign change occurs, it will be found that the resultant function is non-monotonic. That is to say, the value of one component producing the slope decreases instead of increases over the area of excursion. This produces increased difficulty of solution of the resultant equations.

Naturally, the boundary can be described with respect to polar coordinates—where the boundary is rotated as shown in the preferred embodiment—or Cartesian coordinates—where the boundary is merely translated by the light beams with the respective opaque and transparent areas defining boundaries described by the conventional X,Y description.

Where the boundary is one that rotates, the slope $d\theta/dr$ of one boundary must be algebraically larger than the other at any given radius. Obviously, this is where rotation occurs in the direction $\theta$.

Where the boundary is translated in the X direction in a Cartesian system, the slope $dx/dy$ of one boundary must be algebraically larger than the corresponding slope for the other boundary at any given Y in the range of measurement.

It will be appreciated that both functions "$d\theta/dr$" and "$dx/dy$" are essentially co-tangent functions. That is, these respective functions go to zero and change sign ($+$ or $-$) when the respective boundaries are normal or near normal to the path of boundary movement. Naturally, when these boundaries approach in alignment the path of locus movement there are large values for "$d\theta/dr$" and "$dx/dy$" generated. At these latter respective slopes, it must be remembered that a sweep of the expected area of excursion is required. It is an important limitation that slope variation occur over the expected area of excursion. Naturally, where the boundary does not completely cross the expected area of excursion, the limitations of this general condition would not be met.

Attention should also be directed to the number of sampling apertures which the system utilizes. Where two sampling apertures are used, there would be insufficient information present to generate a lens solution, unless registration to a principal axis of the suspect lens system could occur. Where three apertures are present, the solution in sphere, cylinder, cylinder axis and prism components can result, together with one test of the consistency of the measurement. Where four apertures are present, the functions of power variation (herein described) can be derived from the system and provide either verification of measurement precision or surface regularity.

The moving boundary locus L naturally serves to identify the precise angle of beam excursion. By the expedient of driving the locus at a constant angular velocity, angular interval can be reduced to time interval. Thus, it is preferred if the locus is driven at a constant speed.

Having set forth the parameters of the general case, attention can now be devoted to the focus of the beams under excursion to a photodetector circuit.

Focusing Optics

Referring back to FIG. 1a, an example of the light detector of this mechanism is illustrated. Moving boundary locus L is shown. Area 130 is illustrating having a light ray from aperture 4 on suspect optics S impinging thereon. Immediately behind the focusing optics L is a focusing lens 140. Focusing lens 140 takes beams emanating from area 4 on suspect optics S and focuses them to detector D at aperture 4.

Detector D is an array of four photosensitive detectors. As light impinges on each sensitive area of the detector, independent signals are emanated from that area. It should be understood that this element is a standard item of commercial manufacture. For example, it may be a "Pin Spot/4D" photodiode manufactured by United Detector Technology Corporation of Santa Monica, California.

It will be appreciated by those skilled in the optics art that this is accomplished by focusing area 4 on suspect optics to area 4 on detector D. Further, it will be appreciated that no matter the excursion which beam 4 is subject to by suspect optics S, it will impinge on detector D at substantially the same area 4 illustrated. The only difference will be an excursion in the area of the moving boundary locus L. Naturally, such excursion will produce occultation of different time intervals. These occultations of timed intervals will occur at different rotational positions of the moving boundary locus L.

Moving boundary locus L is also measured for rotation by a light source 150 and a photosensitive detector 151. The respective light source 150 and photosensitive detector 151 determine each time a notch 120 passes. By connecting the photosensor 150 to appropriate electronic circuitry (shown in FIG. 4), occultation of each light beam can occur.

It will be appreciated that any number of focusing schemes to detectors can be utilized. The only requirement is that the photosensitive detectors observe the timing of occultation and monitor the rotation of locus L.

Having set forth the detector, the attention may now be directed to FIG. 4, a schematic of the electronic circuitry utilized for this invention.

Electronic Circuitry

The electronic circuitry of this invention includes four logical steps. First, monitoring of the rotational position of the rotating boundary locus L occurs. Secondly, recordation of occultations as they occur at the photodiode D occurs. Third, the circuitry computes the angular interval of the occurring occultation. This is typically done to an accuracy of about 1 part in 50,000 of the total rotation, or 2/100,000ths of the total rotation. Finally, these angular values are computed to spherical power, cylindrical power and axis and prism. These computed values are presented to the operator by either a light emitting diode (LED) display or printout.

Referring to FIG. 4, the standard parts of an electronic computer are shown. Particularly, a central processing unit (or CPU) 200, designated as Chip 8080, manufactured by Intel Corporation of Santa Clara, California (hereinafter Intel) includes a system clock 201 (Intel 8224). System clock 201 has a Phase I and Phase II output as will hereinafter be more completely set forth. Phase I is used for driving a position counter (National Semiconductor chip 163 of Sunnyvale, California) index direction and total fine count (National Semiconductor chip 173 of Sunnyvale, California). Phase II of the system clock is used for detecting occultations. In this manner, transition of the total fine count 215, index detection 217, and position counter 216 and position counter latch 224 does not occur simultaneously with the detection of an occultation. As will hereinafter be set forth, inaccuracies can be avoided where position counter change occurs substantially simultaneous with an occultation.

The CPU 200 inputs and outputs through a bus control 208 (Intel 8228), with input buffer (Intel 8212) and priority out (Intel 8214). Bus control 208 functions to align the various inputs and outputs for circuit interrogation, computation and output.

A read only memory (ROM) 202 (Intel 2708) contains the program for the central processing unit 200. Read write memory (RAM) 204 (Intel 8111) stores for retrieval various quantities read partially computed and fully computed by the detectors D.

An address bus 207 and a data bus 208 function to move data throughout the system. Standard computer components such as printer interface and printer 212 and a display keyboard interface 211, including numeric display and keyboard, 211 are connected. Since these are standard state-of-the-art items, they will not be further discussed herein.

Referring to the moving boundary locus L as schematically shown on FIG. 4, it will be appreciated that five separate outputs are received. As set forth herein, photodiode and amplifier-buffer assembly 210 monitors the count of each of the notches 121 as they pass. This photodiode gives a rotational reading of the moving boundary locus L. Similarly, each of the areas of the photodiode D has a discrete output from the central area 125 of locus L.

Each of these optical outputs from the respective photodiodes included in 210 are buffered. This is accomplished by a double amplifier which includes a current to voltage amplifier and then one or more simple voltage amplifiers connected in series. The output signal is conventionally provided with reduced impedence which is less subject to noise interference.

It is necessary to note when one complete rotation of the boundary locus L occurs. This can be accomplished by either omitting a mark (as shown in FIG. 3) or alternately having a mark a double thickness. In the illustration shown in FIG. 3, omission of a mark occurs.

The total fine count is accumulated at a total fine counter 215. At the same time, a position counter 216 functions to count each of the 255 opaque portions of border 120 as it passes. For convenience, a 0 reference occurs in the counter each time the void space 121 passes and the first mark 122 following is detected by a photodiode of assembly 210.

Position counting is accomplished by total fine count 215, position counter 216 and position counter latch 224. Index detector 217 recommences the total fine count whenever a blank space 121 in the moving boundary locus L is detected.

Secondly, position counter 216 determines the gross rotational position of the locus L to one part in 256. Thirdly, the total fine count 215 is accumulated at total fine counter 215. It is reset each time a complete rotation is detected by index detector 217.

Index detector 217 tests the regularity of the mark pulses received from photodiode 210. These pulses occur at regular intervals, dependent upon the speed of locus L rotation, usually five revolutions per second. When a missing interval 121 is detected, the index detection circuit outputs to the total fine counter 215. The total fine counter is stored and resets upon the detection and recommences counting.

It will be appreciated that locus L will initially read out in polar coordinates. Where there is an angular excursion of (g), the occultations' respective boundaries will shift in angular phase. Angular shifts may, thus, be readily identified.

Taking a variation in radius (f), it can be seen that area 140 of locus L will produce an increasing occultation angle with the increasing radius. The effect of area 142 will be the opposite. With increasing radius, the occultation will diminish. Thus, by simple measurements of the time intervals of occultation, excursions of radius can be readily measured.

Referring to the timing diagram of FIG. 5, function of the counting apparatus can be further understood. Broadly, position counter 216 receives a mark pulse $216^1$. Pulse $216^1$ occurs once every 256th of a revolution of the locus L. With the light state being indicated as 1 and the dark state being indicated at 0, it will be seen that every dark to light going occultation produces a positive going mark pulse. This positive going mark pulse increments position counter 216. Where the light state is unchanged throughout a full cycle n index detector 217 takes an output to the total fine count 215. Resetting of the total fine count 215 occurs.

Assuming that detector D at quadrant 3 (denominated $D_3$ on the diagram) receives an occultation (dark going light), the output will be shown as indicated in FIG. 5 at output $D_3^1$. Detector output will pass through light averaging and comparator circuit 220 to generate output $D_3^1$ to counter control logic 222. Serially connected position counter latch 224 will be latched upon an occultation occurring. Input through CPU 200 of the total fine count at time of occultation to position counter latch 224 will occur (see FIG. 4).

Returing to FIG. 5, during the next phase (n+1), the latched counter will be interrogated by the CPU and output to RAM 204. Once interrogation has occurred and during the next successive phase (n+2), position counter 224 will be reset and commence looking for the next successive occultation.

It will be appreciated that each of the counters is interrogated by action of its respective photodiode four times per revolution of locus L, once at each occultation. These respective interrogations will output counts at approximately 90° intervals, dependent upon the radius R and angle $\phi$ of the deflections generated by suspect optics.

After one complete revolution of the moving boundary locus, each of the four detector segments will generate four different values for a total of sixteen different values. Each value will indicate a time of occultation (two light going dark and two dark going light). This numeric information is factored so that $(256)^2$ or 65,536 indicates one full rotation and lesser values indicate a corresponding fraction of a rotation.

Those skilled in the computer arts will appreciate that there is a special case which can cause difficulty. Where an occultation occurs precisely at an interval of one of the marks 122, confusion could arise. Assuming that simultaneous occultation marking and counter indexing could occur, it would not be possible to detect whether a counter was full or had just emptied. A rotational error of 1 part in 256 could occur. This magnitude would be an intolerable error for the moving boundary locus L of this optical instrument.

To avoid this phenomenon, the clock circuit outputs in a Phase I and Phase II relationship. The computer circuitry is allowed to see an occultation during Phase II. During Phase I, counter resets occur. Therefore, an occultation can never occur during a reset and a reset can never occur during an occultation. If a phase transition at detector D occurs before the mark edge, the counter is inhibited and not received until it is read at the interval n+1. If the transition occurs after the mark, the count is received, reset and then inhibited, and the count is frozen during the interval n+1, and interrogated during the interval n+2. By, in effect, staggering the reset and the interrogation of the detectors D, confusion between indexing and occultation is avoided.

The circuitry of this invention also has to accommodate a wide variation of light levels at the detector quadrants of detector D. It is now common to use thin corrective lenses of varying optical shadings (both in color and overall optical density). Specifically, lens meters reading the various shadings of eyeglass lenses can be expected to receive widely varying outputs at the photodetector D. For example, prescriptive dark glasses are used. Alternately, colored lenses in shades of yellow, pink, blue are common in prescriptive optics. Moreover, these respective optics can vary in shading with typically the upper part of the optics being shaded heavily (the part that the viewer sees towards the sky and sun) and the lower parts of the optics shaded less heavily (the part that the viewer sees towards the ground and shade). Each detector segment must be individually tailored for the particular reading being taken.

Referring to the diagram of FIG. 6a, a timing diagram of output is shown, illustrating a dark going light occultation. Typically, the output from detector assembly 210 for segment $D_3$ will be a voltage output. The $D_3$ segment of the photodiode will put out a minimum output in the dark state and put out the higher voltage in the light state. Upon an occultaton occuring, a curve representative of the occultation is shown with respect to time in FIG. 6a.

It is usually desirable to detect 50% of the transition state between the dark and light voltage. This point is marked on the diagram as point 300.

FIG. 6b underlying FIG. 6a and having the same horizontal time scale illustrates the desired electrical output. Specifically, a logical zero (0) is illustrated. When the light passes the 50% dark/light reference indicated at 300 in FIG. 6a, a detector level of logical one (1) indicated at point 301 in the diagram of FIG. 6b is desired.

Returning to the case of shaded lenses, it will be appreciated that both the light and dark level can change. For example, the dark level of the photodiodes will be a function of temperature, humidity, ambient lighting and other parameters of the environment in which the lens meter operates. For example, minute imperfections of manufacture can change the dark noise level from quadrant to quadrant of detector D.

The light intensity of the photodetector will be a function of the foregoing and the lens shading. Since these respective photodiodes are read on a substantially instantaneous basis, an averaging circuit to individually tailor each quadrant to the photodetector becomes important.

Referring to FIG. 7, a sampling circuit is illustrated. A sample hold element 304 (National Semiconductor chip 398 of Sunnyvale, California) samples and holds the light level at a known "clear" orientation of the chopper disk for each photodetector from one of the four areas of detector D, say segment $D_3$. Similarly, a sample hold dark level 305 (National Semiconductor 398) samples and holds the dark level at a known "opaque" orientation of the chopper disk from the same respective quadrant of photodetector D. The outputs of these respective sample hold circuits are parallel connected through averaging resistors to the input of a comparator 308 (National Semiconductor chip 339).

An output from one of the discrete detector segments (say segment $D_3$) also inputs to comparator 308. When the 50% state is passed, comparator 308 outputs an occultation. This occultation takes precisely the form illustrated in FIG. 6b with respect to time.

Comparator 308 includes a circuit hysteresis. Broadly, when a state change occurs going positive, comparator reference input 308 is dropped by a small negative amount. When a state change occurs going negative, comparator 308 is boosted by a small positive amount. The amount of the drop or the amount of the boost is designed to exceed the maximum level of noise. Therefore, only one logical change occurs for each occultation. Since such hysteresis circuits are well-known, they will not be further discussed herein.

Having discussed the generation of the angular intervals of beam excursion for one detector segment D3, it will be appreciated that the detection of the remaining segments are all analogous. A numerical input to the computer circuitry of FIG. 4 will occur which contains angular information in a polar coordinate form.

Having discussed the origin of the angular formation in a polar coordinate form, the calculations performed by the CPU on the angular data can now be set forth.

Computer Computations

In calibration of the computer, disk rotation is arbitrarily taken as in a clockwise direction as seen from the detector side of the disk for purposes of discussion. The transparent interval 121 in peripheral information area 120 is also arbitrarily taken as set at a rotational position when the small opaque area 142 completely obscures the area of beam excursion 130. The sampling areas are conventionally identified counterclockwise as shown in FIG. 1a.

The basic information contained in the occultation of the differing edges can be conveniently expressed in the form of two numbers for the case of simple contours of shape: $R = +k\theta$ and $R = -k\theta$. The quantity f is defined as the difference of angular orientations between occultations at $R = +k\theta$ and at $R = -k\theta$ locus contours. That is, all the angle orientations of occultations for one shape are added together, all the angle orientations of occultations of the other shape are added together, and the first sum is subtracted from the second sum to form f. Qualitatively, f is then primarily a measure of radial distance of the occultations from the center of the rotating chopper disk. The quantity g is defined as the sum of the angular orientations of all the occultations in one full turn. Clearly, g will be a measure of azimuthal position of the occultations about the center of the rotating chopper disk.

One may then write:

$$R = \alpha f + \beta$$

where, $\alpha$ is a constant scale factor for the radial change f and $\beta$ is a reference constant to establish the origin for the observed radial change.

Similarly, angular shifts $\phi$ must satisfy the relation:

$$\phi = \gamma g + \delta$$

where, $\gamma$ is a constant multiple for the angular excursion g and $\gamma$ is a constant for the origin of the angular change—which is typically related to the origin of the index mark 121 in the peripherical information area 120.

In order to effect the desired translation of the directly read polar coordinates to standard Cartesian coordinates, the equations:

$$X = R \cos \phi - X_0$$

$$Y = R \sin \phi - Y_0$$

are employed where, $X_0$ is the Cartesian coordinate constant for the point of origin of the X axis system, and $Y_0$ is the Cartesian coordinate constant for the point of origin of the Y axis system.

Similarly, a scale factor S for sphere and cylinder is required as well as a zeroing term Z for the origin of zero sphere. Additionally, an axis correction A and a vertex correction $d_1$ for vertex computations—that is, for measurements of lens power at a shifted reference plane. Additionally, it may be desirable to generate a zeroing term for 0°–90° cylinder ($Z_{c+}$) and a zero point of origin for 45°–135° cylinder ($Z_{cx}$).

All of the above constants can be empirically determined. For example, the individual optics and their relative spacings can be adjusted so that representative constant values are achieved.

The input values to the computer program are angular values $\phi_{ij}$, where i designates the particular aperture being sampled (see FIG. 1a, aperture 1–4), and j designates the particular boundary effecting the occultation. Thus, for each sampling aperture, there are four readings; the four sampling apertures utilized, thus, generate a total of sixteen outputs.

Having adjusted the computer optics, the radial excursion for each aperture $f_i$ can be written:

$$f_i = \phi_{i3} + \phi_{i4} - \phi_{i1} - \phi_{i2}$$

where, $f_i$ is the radius factor for each sampling area, and $\phi_{i1}$ is the angular shift produced at occultation of boarder 135b, $\phi_{i2}$ is the angular shift produced at occultation of border 135a, $\phi_{i3}$ is the angular shift produced at occultation of border 134a and $\phi_{i4}$ is the angular shift produced at occultation of border 134b.

Similarly, shifts in azimuth $g_i$ can be identified by the equation $$g_i = \phi_{i1} + \phi_{i2} + \phi_{i3} + \phi_{i4}$$

where, the $\phi$ values are identified as above.

Intuitively, it can be seen that the above equation can provide a convenient test. Specifically, the time interval of light passage of clear areas 132, 133 should be equal. In other words, since each clear portion of the disk is specifically designed to obscure a beam impinging at any particular radius for exactly one-fourth of a revolution, the following equation should approximate 0:

$$t_i = \phi_{i1} + \phi_{i4} - \phi_{i2} - \phi_{i3}$$

where, $t_i$ should be nominal value near 0 and would not be expected to exceed plus or minus twenty (20) out of $256^2$ where $\phi_{i1}$ is the occultation by boundary 135b, $\phi_{i4}$ is the occultation by boundary 134b, $\phi_{i2}$ is the occulation by boundary 135a and $\phi_{i3}$ is the occultation by boundary 134a.

If at this point the count exceeds the limit of plus or minus 20, the computation can be aborted. Either an instrument malfunction has occurred (for example, burned-out lamp) or the lens is not being measured properly (for example, a very dirty lens).

It should be remembered that each of the above computations for $f_i$ and $g_i$ has to be repeated for each of the sampling apertures 1–4. Excursions in radius $R_i$ and angle $\phi_i$ for each of the four sampling intervals can then be written:

$$R_i = \alpha f_i + \beta$$

$$\phi_i = \gamma g_i + \delta$$

where, $R_i$ represents the radial excursion and $\phi_i$ is the actual angular excursion related to the chopper disk system.

Having obtained each of the excursions in polar coordinates for each sampling aperture, these excursions can readily be converted to Cartesian coordinate form in accordance with the following equations:

$$X_i = R_i \cos \phi_i - X_0$$

$$Y_i = R_i \sin \phi_i - Y_0$$

where, $X_i$ is the Cartesian horizontal excursion of lens deflection for each sampling aperture (i) and $Y_i$ is the vertical Cartesian excursion of lens deflection for each sampling aperture (i).

Having obtained the vertical and horizontal Cartesian excursions for each sampling aperture, the obtaining of simple prism should be apparent. For example, horizontal prism (prism base in, base out) can be determined by the formula $$P_x = \sum_{i=1}^{4} X_i$$

where, $P_x$ is the horizontal prism and, $$P_y = \sum_{i=1}^{4} Y_i$$

where, $P_y$ is vertical prism (prism up, prism down).

Note that prism power (normally measured in prism diopters) is shown simply related to the Cartesian excursions of lens deflection ($X_i$, $Y_i$). This is accomplished by a suitable choice of the scale size of the parameters $\alpha$, $\beta$, $X_0$ and $Y_0$. In effect, any scaling factor one might expect to find in the prism relations has been already included in the scaling of these four parameters so that the result can be directly computed in the form of prism diopters with a minimum of arithmetic operations.

As has been previously set forth, spherical equivalent (Seq) (aside from a scale factor to be considered later) can be determined by the equation $$Seq = -X_1 + X_2 + X_3 - X_4 - Y_1 - Y_2 + Y_3 + Y_4$$

Similarly, 0°–90° astigmatism can be determined by the equation $$C_+/2 = (+X_1 - X_2 - X_3 + X_4 - Y_1 - Y_2 + Y_3 + Y_4)$$

45°–135° astigmatism ($c_x$) can be determined by the equation $$C_x/2 = (+X_1 + X_2 - X_3 - X_4 + Y_1 - Y_2 - Y_3 + Y_4)$$

At this juncture, it is possible to check the suspect lenses for variations other than those in conventional prism, sphere and cylinder axis. Consequently, tests for non-toric surfaces as previously described for the circular astigmatism (CA) and for power variation ($PV_1$ and $PV_2$) can be run by testing the relations previously set forth, where $$[(S)(CA)] < 0.2$$

and, $$[(S)\sqrt{(PV_1)^2 + (PV_2)^2}] < 0.3$$

and,

S is a scale factor defined later then, if both of these relations are found to be satisfied, computation can continue. If, however, the equations are not satisfied, appropriate operator warnings can be provided. The operator is informed by appropriate indicia that a suspect lens system S exists which includes other than conventional power variations in sphere, cylinder, axis and prism.

Having run these respective tests for the presence of nontoric surfaces, the following three equations can be simultaneously solved:

$$(S)(C_+/2) = C/2 \cos 2(\theta + A) - Z_{c+}$$

$$(S)(C_x/2) = C/2 \sin \gamma(\theta + A) - Z_{cx}$$

$$(S)(Seq) = S_1 + C/2$$

It is important to note that in the above three equations, the values C for cylinder, azimuthal angle $\theta$, and sphere $S_1$ are being solved for. Constants, including scaling constant S and axis correction A, as well as $Z_{c+}$ and $Z_{cx}$ have already been determined as properties of the instrument optics.

As an aside to those skilled in the art, it will be noted that presenting the result as simultaneous solution of equations is the most desirable manner for purposes of clarity. A simple division of the above two appearing equations to obtain a tangent is a likely algebraic operation in the solution, but is not as desirable in clearly defining the result, as the tangent cycle repeats every 180°. Ambiguity of angular solution would be present, requiring of the obtained results of the arctan to be further defined. In any case, these equations represent nothing more than the common conversion of rectangular coordinates to polar coordinates.

Having obtained solutions to the above equations, the final computations for sphere, cylinder and conventional cylinder axis are as follows:

$$S_{rx} = S_1 - Z$$

$$C_{rx} = C$$

$$\theta_{rx} = \theta$$

where, $S_{rx}$ is the prescriptive sphere, $C_{rx}$ is the prescriptive cylinder and $\theta_{rx}$ is the cylinder axis.

It will, thus, be seen at this juncture that prism (base in, base out; base up, base down), sphere, cylinder and cylinder axis are all obtained by this computational process.

In actual practice, the orientation of the sampling apertures 1 through 4 may be rotated to the desired frame of reference, for example a lens table. This change in orientation causes correspondent adjustment to the prism values obtained. Such a change may be computed by the following equations:

$$P_x^1 = P_x \cos A + P_y \sin A$$

$$P_y^1 = P_y \cos A + P_x \sin A$$

where, $P_x^1$ is the corrected base in, base out prism and $P_y^1$ is the corrected base up, base down prism.

It should be noted that such a correction to cylinder axis by amount A has already been provided in previously presented relations.

Where a vertex correction is added, the lenses are typically measured for their lens power at a distant $d_1$ from the place where they are to have their intended optical effect. Such a movement of the lenses will cause change in the resultant prescriptive $S^1_{rx}$ and resultant cylinder $C^1_{rx}$ as follows:

$$S^1_{rx} = S_{rx}[1+(d_1)(S_{rx})]^{-1}$$

$$C^1_{rx} = (S_{rx}+C_{rx})[1+(S_{rx}+C_{rx})]^{-1}$$

$$-S_{rx}[1+(d_1)(S_{rx})]^{-1}$$

As there is no change in cylinder axis upon such movement, the equation:

$$\theta_{rx} = \theta$$

will hold.

Embodiment in Non-Parallel Light

It is possible to utilize with this invention the moving boundary locus L within an ambient wherein light is convergent and/or divergent. For purposes of this illustration, such a system can be briefly described.

Referring to FIG. 8, a light source 314 is shown in front of a multifaced prism 316. Prism 316 includes four discrete prism quadrants: a, b, c and d. Each of these respective quadrants makes the light appearing downstream of the prism and light source as if four discrete apparent light sources were present. In the figure here shown, and in the case of quadrant a, light source 314 is given an apparent source of origin $314^1$ by prism section a of prism 316. Typically, light is divergent from the apparent light source $314^1$ to a diagonal mirror 320 where the light then passes through a relay lens. As can plainly be seen, light between light source 314 and condensing lens 322 is divergent. After lens 322, the light becomes convergent. Moving boundary locus L is placed immediate to condensing lens 322. As can be seen, the respective boundaries sweep across the lens 322 and cause an occultation to occur. This occultation occurs across the convergent light beam. (Exchange of condensing lens 322 with moving boundary locus L results in an alternate configuration in which occultation occurs in a divergent light beam; however, analysis of the workings is more simply presented as shown in FIG. 8.)

From lines 322, the light then impinges upon a second mirror 330 and passes through an aperture plate 332. The four apparent light sources are imaged as tiny, intense spots of light at or near the plane of aperture plate 332. Optionally, aperture plate 332 may have within it four apertures: $a^1$, $b^1$, $c^1$, $d^1$; these apertures serve to localize and to pass light through the suspect optics S which are typically registered to aperture 332.

The lens 322 and optional apertures serve to pass a bundle of light through the lens at particular points. Each bundle of light is deflected by the power of the lens at the particular sampling area. This deflection of the light produces a measurable downstream excursion of the divergent cone of light emanating from each aperture.

After passing through one of the apertures—the aperture $a^1$ in aperture plate 322 and the suspect optics S—the light then passes through a lens 334. Lens 334 in conjunction with sampling mask 338 provides a means of determining the extent of angular excursion provided by suspect lenses of the divergent cone of light collected by lens 334. Aperture 338 is typically located near the focal plane of lens 334. At sampling mask 338, the light then passes to one of the quadrants of a detector D, here shown as quadrant $a''$.

For convenience and downstream of sampling mask 338, a lens 340 may be located. This lens may focus all light beams passing through mask 338 so that they impinge at a focused and known location on the detector D; for example, one light beam will focus at the respective quadrant $a''$. Similarly, each other sampling area $b^1$, $c^1$ and $d^1$ will have a divergent cone of light emanating, of which a portion will pass through aperture 338 and onto the appropriate photodetector region of detector D. An aperture plate 342 may be employed to reject light from the photosensitive area which does not correspond to the intended illumination areas $a^1$, $b^1$, $c^1$, $d^1$ of aperture 332.

The function of this system may be readily understood. It can be seen that the divergent cone of light between the aperture $a^1$ and the mask 338 will undergo an angular mirgation. This migration will be a direct function of the power of the lens at the particular sampling aperture. At the same time, this cone of light will have sweeping across it the shadow of the particular boundary producing an occultation at any given time. Thus, quadrant $a''$ of detector D will see at differing periods of time (dependent upon the migration of the cone of light) an occultation. This occultation will function in a manner precisely analogous to that previously described; all algebraic notations will remain unchanged.

Briefly, the scheme herein illustrated is preferred for a number of reasons. One of these reasons is that this particular optical alignment is particularly insensitive to stray light penetrating the system. Broadly, the detector D and the apertures 338 and 342 are sensitive only to beams of light passing through a region localized to each sampling aperture at the suspect lens S by aperture plate 342 and, additionally, being of such angular orientation as to be capable of passing through aperture 338. Stray light with differing angularity or point of origin cannot penetrate the system.

Sample computer programs useful with this invention follow.

An important aspect of this invention is that the preferred embodiment employs opaque and clear disk areas separated by four moving boundaries, previously described. The advantage to be gained from this configuration lies in increased reliability and reduced sensitivity to the exact threshold level for determining the logical occultation time. This can be illustrated with respect to FIG. 6a.

In FIG. 6a, it will be noted that a changed threshold for the comparator circuit in FIG. 7 has been illustrated. As here shown, the threshold has shifted upwardly and above the 50% dark/light reference.

This shift does not degrade instrument accuracy. Instead, it results in equal and opposite deviation of readings at the separate boundaries, which deviations effectively cancel each other. This may be redily understood by referring to the equations for the values f, g, previously described.

It will be remembered that the equation for f is $$f = (\phi_{i3} + \phi_{i4}) - (\phi_{i1} + \phi_{i2})$$

and, the equation for g is $$g = (\phi_{i3} + \phi_{i4}) - (\phi_{i1} + \phi_{i2})$$

It will be seen that both equations contain the same terms $\phi_{i3} + \phi_{i4}$ and $\phi_{i1} + \phi_{i2}$.

However, these respective terms include the transition between a dark going light boundary and light going dark boundary.

Referring to FIG. 6a, it will be seen that a dark going light and a light going dark boundary has been plotted. Assuming that the changed threshold moves upwardly, it can be seen that the quantity $\phi_{i3}$ will change by the amount plus $\Delta$. However, looking at the occultation of light going dark boundary $\phi_{i4}$, it can be seen that this value will change by an amount minus $\Delta$. In both cases, the quantities $\Delta$ is the changed time at which an occultation is recorded because of the shifted threshold value.

Altering each of the respective values $\phi$ by the term $\Delta$ (adding $\Delta$ in the case of $\phi_{i3}$ and subtracting $\Delta$ in the case of $\phi_{i4}$), it can be seen that the algebraic sum remains exactly the same. Thus, an erroneous threshold level results in an opposite time shift for these two types of occultations. By employing and summing the effect of one of each of these types of occultation, the joint effect of any erroneous threshold level is compensated for and minimized. It should be noted that this is an important feature of this invention. Specifically, it enables larger light rays to work with this invention than might otherwise be employed. Whether an occultation is detected early or late, it is compensated for in the subsequently resulting angular summations. Thus, the angular summations themselves contain requisite instrument accuracy.

It should be apparent that the enclosed invention can admit of a number of embodiments. It has been discussed at length herein that the shape and configuration of the locus is a key element of this invention.

Consider the following. The locus could as well be photosensitive. In such an embodiment, the downstream detector could be emitted and the locus itself could be the photosensitive element. Similarly, the locus could be photosensitive.

Likewise, it will be apparent to those skilled in the optic arts that although all of the optics herein illustrated are refractive, the invention could as well be used with reflective optics. This could be done either concentrically to reflective optics with the optic elements either mounted concentrically or by use of beam splitter or excentrically to the mirror under test with appropriate off-axis correction.

Likewise, the photosensor and light source locations can be reversed. With the exception of the advantages derived from the configuration of FIG. 8, such light source and photodetector reversal does not affect the advantages flowing from the geometry of the moving boundary locus herein set forth.

Moreover, the locus itself could be a light emitting body. Consider the cases where either the locus itself is internally illuminated, alternately acts as a reflecting and diffused light source, or is even a rotated image on a cathode-ray tube.

The term "deviated" has been used in this application. This use is designed to cover both refractive and reflective optics which could find use with this invention. It should be understood that the disclosed embodiment is definitely preferred; this has previously been made clear through an illustration of all of the various examples and advantages flowing from this invention.

The attached is a listing of a microprocessor program to operate the lens meter. It is written in assembly language for the Intel 8080A microprocessor, and intended to be assembled on an Intel MDS-800 development system equipped with 32K of memory and a dual Floppy Disc. The language is defined by the Intel publications "Intel 8080 Assembly Language Programming Manual" (#98-004C Rev. C) and "ISIS-II Assembler Supplement for 8085 Programming" (#98-369A). A less formal description of the language is described in the "Intel 8080 Microcomputer Systems User's Manual (September 1975)." The purpose of this program is the generation of lens parameters in prescription values from raw data obtained from the optical system.

```
N LOC  OBJ       SEQ      SOURCE STATEMENT

0 ;****************************************************************
                 1 ;
                 2 ;           LENS METER DATA ACQUISITION PACKAGE
                 3 ;
                 4 ;****************************************************************
                 5 ;
                 6 ;           PROGRAM NAME:   LMDATA.ASM
                 7 ;           AUTHOR:         J. CORENMAN 6/28/77
                 8 ;
                 9 ; RECENT EDIT HISTORY....
                10 ;       6/28/77 JEC    A BUGS??
                11 ;       6/21/77 JEC
                12 ;       6/20/77 JEC    CONVERTED FROM LMPRO
                13         NAME LMDATA
                14 ;
                15 ;
                16 ;
                17 ;
                18 ;
```

```
N LOC  OBJ          SEQ         SOURCE STATEMENT
                    19 ;
                    20 ; DEFINITIONS...
                    21
0001                22          BIT0    EQU     00000001B
0002                23          BIT1    EQU     00000010B
0004                24          BIT2    EQU     00000100B
0008                25          BIT3    EQU     00001000B
0010                26          BIT4    EQU     00010000B
0020                27          BIT5    EQU     00100000B
0040                28          BIT6    EQU     01000000B
0080                29          BIT7    EQU     10000000B
                    30 ;
                    31 ; DEVICE REGISTERS...
                    32 ;
0080                33          DTACTR  EQU     80H     ;DETECTOR "A" COUNTER
0081                34          DTBCTR  EQU     81H     ;DETECTOR "B" COUNTER
0082                35          DTCCTR  EQU     82H     ;DETECTOR "C" COUNTER
0083                36          DTDCTR  EQU     83H     ;DETECTOR "D" COUNTER
0085                37          FCOUNT  EQU     85H     ;FINE COUNT
0084                38          FLAGS   EQU     84H     ;FLAG REGISTER
0086                39          MRKCTR  EQU     86H     ;MARK COUNT REGISTER
                    40
0040                41          KBDREG  EQU     40H     ;KEYBOARD REGISTER
0020                42          DSPCTR  EQU     20H     ;DISPLAY COUNTER
0011                43          VAREG   EQU     11H     ;8251 STATUS REGISTER
0010                44          VADATA  EQU     10H     ;8251 DATA REGISTER
                    45 ;
                    46 ; OUTPUT DEFS...
                    47 ;
0080                48          THREG   EQU     80H     ;THRESHOLD SET REGISTER
0040                49          ANCTR   EQU     40H     ;ANNUNCIATOR (ADD GROUP CODE)
0047                50          LMPREG  EQU     47H     ;MAIN LAMP CONTROL
0020                51          NUMDSP  EQU     20H     ;NUMERIC DISPLAY OUTPUT
0008                52          ICREG   EQU     08H     ;INTERRRUPT CONTROLLER
                    53 ;
                    54 ;OTHER DEFS...
                    55 ;
                    56          EXTRN   REG1
                    57          PUBLIC  ERRFLG, LMDATA
                    58 ;        DATA SPACE....
                    59 ;
                    60          DSEG
0000 00             61 DETENA:  DB      0       ;DETECTOR DRIVER ENABLE
0001 00             62 ERRFLG:  DB      0       ;DETECTOR ERROR FLAG
                    63
                    64 ; DETECTOR BUFFERS...LOCATED AT END OF RAM...
                    65
                    66          ASEG
1DC5                67          ORG     1C00H+512-59
                    68
1DC5                69 DTAPTR:  DS 2
1DC7                70 DTBPTR:  DS 2
1DC9                71 DTCPTR:  DS 2
1DCB                72 DTDPTR:  DS 2
                    73
                    74 ;DATA BUFFER...4*4*3 BYTES
                    75
1DCD                76 DTBUF:   DS 48
                    77
                    78 ;INTERRUPT VECTORS
                    79 ;
                    80          ASEG
                    81
0008                82          ORG 08H         ;RESTART 1
0008 C30501   C     83          JMP IDXINT
0010                84          ORG 10H         ;RESTART 2
0010 C39E00   C     85          JMP DETINT
                    86          CSEG
                    87
```

```
N LOC   OBJ        SEQ    SOURCE STATEMENT

88 ;      FRONT END OF DATA ACQUISITION...
                    89 ;      SET THE THRESHOLD, CLEAR THE DATA BUFFER, AND THEN DO ONE
                    90 ;      REVOLUTION WITH THE INTERRUPT STUFF ENABLED...
                    91 ;
0000 AF             92 LMDATA: XRA A
0001 320100  D      93         STA ERRFLG       ;CLEAR ERROR FLAG
0004 CD6001  C      94         CALL LAMPON
0007 CD0001  C      95         CALL THSET
                    96 ;
                    97 ;INITIALIZE BUFFER...
                    98 ;
000A 3E00           99         MVI A,0          ;CLEAR AC
000C 0E30          100         MVI C,48         ;BUFFER LENGTH
000E 21CD1D        101         LXI H,DTBUF      ;POINTER TO BUFFER
0011 77            102 LP1:    MOV M,A          ;STORE A ZERO
0012 23            103         INX H
0013 0D            104         DCR C
0014 C21100  C     105         JNZ LP1          ;AGAIN...
                  106
0017 21C51D        107         LXI H,DTAPTR     ;FIRST DATA POINTER
001A 3E04          108         MVI A,4
001C 11CD1D        109         LXI D,DTBUF
001F 010C00        110         LXI B,12
0022 73            111 LP2:    MOV M,E          ;STORE INITIAL POINTER
0023 23            112         INX H
0024 72            113         MOV M,D
0025 23            114         INX H
0026 EB            115         XCHG
0027 09            116         DAD B            ;UPDATE DATA POINTER
0028 EB            117         XCHG
0029 3D            118         DCR A
002A C22200  C     119         JNZ LP2
                  120
                  121 ;
                  122 ;SYNC W/ ORIGIN....
                  123 ;
002D DB06          124 LP1A:   IN MRKCTR
002F B7            125         ORA A
0030 C22D00  C     126         JNZ LP1A
0033 3E01          127         MVI A,1
0035 320000  D     128         STA DETENA       ;ENABLE DRIVER
                  129 ;
                  130 ;WAIT FOR NEXT INDEX MARK, CHECK DATA...
                  131
0038 DB06          132 LP2A:   IN MRKCTR
003A FEFE          133         CPI 254
003C C23800  C     134         JNZ LP2A
                  135 ;
003F AF            136         XRA A
0040 320000  D     137         STA DETENA
                  138
                  139 ;
                  140 ;CHECK POINTERS...
                  141 ;
0043 0E04          142         MVI C,4
0045 11D91D        143         LXI D,DTBUF+12
0048 21C51D        144         LXI H,DTAPTR
004B 7E            145 LP2B:   MOV A,M          ;GET LOW BYTE OF POINTER
004C 23            146         INX H
004D BB            147         CMP E
004E C26200  C     148         JNZ DTERR
0051 7E            149         MOV A,M ;HI BYTE
0052 23            150         INX H
0053 BA            151         CMP D
0054 C26200  C     152         JNZ DTERR
0057 7B            153         MOV A,E          ;UPDATE COMPARISON POINTER
```

```
N LOC   OBJ         SEQ         SOURCE STATEMENT

0058 C60C           154         ADI 12
005A 5F             155         MOV E,A
005B 0D             156         DCR C
005C C24800  C      157         JNZ LP2B
005F C36700  C      158         JMP LP3B
                    159 ;
0062 3E01           160 DTERR:  MVI A,1
0064 320100  D      161         STA ERRFLG
0067 21CD1D         162 LP3B:   LXI H,DTBUF
006A 110000  E      163         LXI D,REG1      ;FLOATING POINT REGISTERS
006D 0E10           164         MVI C,16        ;COUNTER
006F C5             165 LP3:    PUSH B  ;SAVE COUNT
0070 D5             166         PUSH D          ;AND FLOATING POINTER
0071 46             167         MOV B,M         ;GET FINE COUNT (* 256)
0072 0E00           168         MVI C,0
0074 23             169         INX H
0075 5E             170         MOV E,M         ;GET TOTAL FINE COUNT
0076 1600           171         MVI D,0
0078 23             172         INX H
0079 7E             173         MOV A,M         ;GET COURSE COUNT
007A 23             174         INX H
007B E5             175         PUSH H          ;SAVE POINTER
007C F5             176         PUSH PSW        ;AND COUNT
007D CD4E01  C      177         CALL DIV8       ;DIVIDE FINE COUNT *256 BY AVG TOTAL F.C.
0080 F1             178         POP PSW         ;GET COURSE COUNT
0081 47             179         MOV B,A         ;*256
0082 0E00           180         MVI C,0
0084 09             181         DAD B           ;ADD TO QUO.
0085 44             182         MOV B,H         ;TO ARG1
0086 4D             183         MOV C,L
0087 E1             184         POP H
0088 D1             185         POP D           ;GET FLOATING POINT POINTER
0089 AF             186         XRA A           ;ZERO AC
008A 12             187         STAX D          ;LOW BYTE IS ZERO
008B 13             188         INX D
008C 79             189         MOV A,C
008D 12             190         STAX D          ;MIDLLE BYTE
008E 13             191         INX D
008F 78             192         MOV A,B
0090 12             193         STAX D          ;HI BYTE
0091 13             194         INX D
0092 AF             195         XRA A
0093 12             196         STAX D          ;ZERO EXPONENT
0094 13             197         INX D
0095 C1             198         POP B
0096 0D             199         DCR C
0097 C26F00  C      200         JNZ LP3
009A CD7301  C      201         CALL LMPOFF
009D C9             202         RET
                    203 ;       DETECTOR INTERRUPT DRIVER...
                    204 ;       CHECK FLAG BYTE FOR EACH DETECTOR AND CALL APPROPRIATE ROUTINE...
                    205 ;       DATA BUFFER FORMAT...BYTE 1 = FINE COUNT, 2 = TOTAL F.C., 3 = MARK
                    206 ;
009E F5             207 DETINT: PUSH PSW        ;SAVE REGGIES...
009F C5             208         PUSH B
00A0 D5             209         PUSH D
00A1 E5             210         PUSH H
00A2 3A0000  D      211         LDA DETENA      ;CHECK DISABLE FLAG
00A5 0F             212         RRC
00A6 D2C500  C      213         JNC DTIRT0      ;DISABLED...
00A9 DB84           214         IN FLAGS        ;GET FLAG BYTE
00AB 0F             215         RRC             ;DETECTOR A FLAG TO CARRY
00AC DCD000  C      216         CC DTAINT       ;SET, GO PROCESS IT
00AF 0F             217         RRC             ;DET B FLAG TO CARRY
00B0 DCEA00  C      218         CC DTBINT
00B3 0F             219         RRC             ;DET C FLAG TO CARRY
```

```
N LOC  OBJ      SEQ         SOURCE STATEMENT

00B4 DCF300  C  220         CC DTCINT
00B7 0F         221         RRC              ;DET D TO CARRY
00B8 DCFC00  C  222         CC DTDINT
00BB 3E08       223 DTIRT1: MVI A,BIT3
00BD D308       224         OUT ICREG
00BF E1         225         POP H
00C0 D1         226         POP D
00C1 C1         227         POP B
00C2 F1         228         POP PSW
00C3 FB         229         EI
00C4 C9         230         RET
00C5 DB80       231 DTIRT0: IN DTACTR
00C7 DB81       232         IN DTBCTR
00C9 DB82       233         IN DTCCTR
00CB DB83       234         IN DTDCTR
00CD C3BB00  C  235         JMP DTIRT1
                236 ;DETECTOR A INTERRUPT ROUTINE...GET DATA COUNT, GENERATE POINTER INTO
                237 ;BUFFER, STORE COUNT...
                238 ;
00D0 F5         239 DTAINT: PUSH PSW
00D1 21C51D     240         LXI H,DTAPTR     ;OUR DATA POINTER
00D4 DB80       241         IN DTACTR        ;GET DATA
00D6 5E         242 DTXINT: MOV E,M          ;GET POINTER INTO D,E
00D7 23         243         INX H
00D8 56         244         MOV D,M
00D9 12         245         STAX D           ;STORE FINE COUNT
00DA 1C         246         INR E
00DB DB85       247         IN FCOUNT        ;GET FINE COUNT
00DD 12         248         STAX D
00DE 1C         249         INR E
00DF DB86       250         IN MRKCTR
00E1 12         251         STAX D
00E2 1C         252         INR E
00E3 CAE800  C  253         JZ DTXRET        ;OVERFLOW
00E6 2B         254         DCX H
00E7 73         255         MOV M,E          ;STORE POINTER
00E8 F1         256 DTXRET: POP PSW
00E9 C9         257         RET
                258 ;
                259 ;
                260 ;DETECTOR B INTERRUPT...
                261 ;
00EA F5         262 DTBINT: PUSH PSW
00EB 21C71D     263         LXI H,DTBPTR
00EE DB81       264         IN DTBCTR
00F0 C3D600  C  265         JMP DTXINT
                266 ;
00F3 F5         267 DTCINT: PUSH PSW
00F4 21C91D     268         LXI H,DTCPTR
00F7 DB82       269         IN DTCCTR
00F9 C3D600  C  270         JMP DTXINT
                271
00FC F5         272 DTDINT: PUSH PSW
00FD 21CB1D     273         LXI H,DTDPTR
0100 DB83       274         IN DTDCTR
0102 C3D600  C  275         JMP DTXINT
                276 ;
                277 ;MARK TRACK ORIGIN INTERRUPT...
                278 ; GET THE TOTAL FINE COUNT.
                279 ;
0105 F5         280 IDXINT: PUSH PSW
0106 DB86       281         IN MRKCTR
0108 F1         282         POP PSW
0109 FB         283         EI
010A C9         284         RET
```

```
N LOC  OBJ       SEQ     SOURCE STATEMENT
                 285 ;      SET DETECTOR THRESHOLD...
                 286 ;      GET CURRENT MARK COUNT, FIND NEXT HIGHER VALUE IN TABLE,
                 287 ;      AND WAIT FOR THAT MARK COUNT. SET HI OR LOW AS INDICATED, THEN
                 288 ;      WAIT AGAIN FOR NEXT MARK VALUE IN TABLE AND SET THE OTHER THRESHOLD.
                 289 ;
0108 214201  C   290 THSET:  LXI H,THTBL      ;POINT H,L TO TABLE OF INTERESTING MARK COUNTS
                 291 ;
010E DB86        292 THSLP1: IN  MRKCTR       ;GET MARK COUNT
0110 BE          293         CMP M            ;CHECK MARK AGAINST TABLE
0111 DA1E01  C   294         JC  THS2         ;TABLE IS BIGGER, GO WAIT FOR IT
                 295 ;
                 296 ; TABLE VALUE IS TOO SMALL...TRY THE NEXT...
                 297 ;
0114 23          298         INX H            ;SKIP THIS ENTRY
0115 23          299         INX H
0116 7E          300         MOV A,M          ;CHECK FOR TERM
0117 B7          301         ORA A
0118 C20E01  C   302         JNZ THSLP1       ;NOT THE END, CHECK AGAIN
011B 214201  C   303         LXI H,THTBL      ;END REACHED, TAKE IT FROM THE BEGINNING
                 304 ;
                 305 ; WAIT FOR SPECIFIED MARK...
                 306 ;
011E CD2701  C   307 THS2:   CALL THOUT       ;OUTPUT FLAG
0121 23          308         INX H            ;MOVE TO NEXT MARK VALUE
0122 23          309         INX H
0123 CD2701  C   310         CALL THOUT
0126 C9          311         RET
                 312 ;
                 313 ;WAIT FOR SPECIFIED MARK AND OUTPUT A PULSE...
                 314 ;
0127 CD5F01  C   315 THOUT:  CALL WAIT
012A DB86        316         IN  MRKCTR       ;GET CURRENT POSITION
012C BE          317         CMP M            ;CHECK AGAINST TABLE BYTE
012D C22701  C   318         JNZ THOUT
0130 23          319         INX H            ;MOVE TO FLAG BIT
0131 7E          320         MOV A,M
0132 2B          321         DCX H
0133 D380        322         OUT THREG        ;SET FLAG
0135 CD5F01  C   323 THOUT2: CALL WAIT
0138 DB86        324         IN  MRKCTR       ;GET POSITION
013A BE          325         CMP M
013B CA3501  C   326         JZ  THOUT2       ;WAIT FOR NEXT MARK
013E AF          327         XRA A            ;CREAR ACC
013F D380        328         OUT THREG        ;RESET FLAG
0141 C9          329         RET
                 330 ;
                 331 ;TABLE OF MARK COUNTS AND WHETHER THEY REPRESENT DARK OR LIGHT...
                 332 ;
0080             333         DARK    EQU  BIT7
0040             334         LIGHT   EQU  BIT6
                 335
0142 00          336 THTBL:  DB   0, DARK
0143 80
0144 40          337         DB   64, LIGHT
0145 40
0146 80          338         DB   128, DARK
0147 80
0148 C0          339         DB   192, LIGHT
0149 40
014A 00          340         DB   0, DARK
014B 80
014C 00          341         DB   0, 0
014D 00
```

```
N LOC  OBJ        SEQ      SOURCE STATEMENT

342 ; 8-BIT DIVIDE ROUTINE...DIVIDE B,C BY D,E INTO H,L BY SUCCESSIVE SUBTRACTION
                  343 ;
014E 210000       344 DIV8:   LXI H,0
0151 7B           345         MOV A,E      ;CHECK FOR ZERO DIVISOR
0152 B2           346         ORA D
0153 C8           347         RZ
0154 79           348 DIVLP:  MOV A,C
0155 93           349         SUB E
0156 4F           350         MOV C,A
0157 78           351         MOV A,B
0158 9A           352         SBB D
0159 47           353         MOV B,A
015A D8           354         RC
015B 23           355         INX H
015C C35401  C    356         JMP DIVLP
                  357 ;       WAIT ROUTINE...
                  358 ;
015F C9           359 WAIT:   RET
                  360 ;       LAMP CONTROL....
                  361 ;
0160 3E01         362 LMPON:  MVI A,BIT0
0162 D347         363         OUT LMPREG   ;ENABLE LAMP
0164 DB86         364         IN MRKCTR
0166 C680         365         ADI 128
0168 4F           366         MOV C,A
0169 CD5F01  C    367 LMPLP:  CALL WAIT    ;100 MS WAIT LOOP..
016C DB86         368         IN MRKCTR
016E B9           369         CMP C
016F C26901  C    370         JNZ LMPLP
0172 C9           371         RET
                  372 ;
                  373 ;
                  374 ;
0173 AF           375 LMPOFF: XRA A
0174 D347         376         OUT LMPREG
0176 C9           377         RET
                  378 ;       THE END....
                  379         END
```

PUBLIC SYMBOLS

ERRFLG D 0001    LMDATA C 0000

EXTERNAL SYMBOLS
REG1   E 0000

USER SYMBOLS
ANCTR  A 0040    BIT0   A 0001    BIT1   A 0002    BIT2   A 0004    BIT3   A 0008    BIT4   A 0010    BIT5   A 0020
BIT6   A 0040    BIT7   A 0080    DARK   A 0080    DETENA D 0000    DETINT C 009E    DIV8   C 014E    DIVLP  C 0154
DSPCTR A 0020    DTACTR A 0080    DTAINT C 00D0    DTAPTR A 1DC5    DTBCTR A 0081    DTBINT C 00EA    DTBPTR A 1DC7
DTBUF  A 1DCD    DTCCTR A 0082    DTCINT C 00F3    DTCPTR A 1DC9    DTDCTR A 0083    DTDINT C 00FC    DTDPTR A 1DCB
DTERR  C 0062    DTIRT0 C 00C5    DTIRT1 C 00B8    DTXINT C 00D6    DTXRET C 00E8    ERRFLG D 0001    FCOUNT A 0085
FLAGS  A 0084    ICREG  A 0008    IDXINT C 0105    KBDREG A 0040    LAMPON C 0160    LIGHT  A 0040    LMDATA C 0000
LMPLP  C 0169    LMPOFF C 0173    LMPREG A 0047    LP1    C 0011    LP1A   C 002D    LP2    C 0022    LP2A   C 0038
LP2B   C 004B    LP3    C 006F    LP3B   C 0067    MRKCTR A 0086    NUMDSP A 0020    REG1   E 0000    THOUT  C 0127
THOUT2 C 0135    THREG  A 0090    THS2   C 011E    THSET  C 010B    THSLP1 C 010E    THTBL  C 0142    VADATA A 0010
VAREG  A 0011    WAIT   C 015F

ASSEMBLY COMPLETE, NO ERROR(S)

```
N LOC  OBJ       SEQ        SOURCE STATEMENT

0 ;*********************************************
                  1 ;
                  2 ;              LENS METER MONITOR
                  3 ;
                  4 ;*********************************************
                  5 ;
                  6 ;         PROGRAM NAME:   MONITR.ASM
                  7 ;         AUTHOR:         J. CORENMAN
                  8 ;
                  9 ;    RECENT EDIT HISTORY:
                 10 ;       6/29/77  JEC
                 11 ;       6/28/77  JEC
                 12 ;       6/27/77  JEC
                 13 ;
                 14 ;
                 15        NAME  MONITR
                 16 ;
                 17 ;DEFS...
                 18 ;
0001             19        BIT0   EQU   00000001B
0002             20        BIT1   EQU   00000010B
0004             21        BIT2   EQU   00000100B
0008             22        BIT3   EQU   00001000B
0010             23        BIT4   EQU   00010000B
0020             24        BIT5   EQU   00100000B
0040             25        BIT6   EQU   01000000B
0080             26        BIT7   EQU   10000000B
                 27 ;
                 28 ;EXTERNALS...
                 29 ;
                 30        EXTRN  RDSEQ, INTPR, KBDFLG, KBDCOD
                 31 ;
                 32 ;VECTORS, ETC...
                 33 ;
                 34        ASEG
0000             35        ORG 0
0000 C30000  C   36        JMP START
                 37
0030             38        ORG 30H         ;USART VECTOR - UNUSED
0030 FB          39        EI
0031 C9          40        RET
                 41
0038             42        ORG 38H         ;RESTART 7 = UNUSED
0038 FB          43        EI
0039 C9          44        RET
                 45
                 46
                 47        DSEG
0000             48        DS 40           ;STACK SPACE
0028 0000        49 STCK:  DW 0
                 50
                 51
                 52        CSEG
                 53 ; WAIT FOR A KEYBOARD CODE, DISPATCH
                 54 ;
0000 312800  D   55 START: LXI SP,STCK     ;SET STACK POINTER
0003 21001C      56        LXI H,1C00H     ;START OF RAM
0006 010002      57        LXI B,0200H     ;2 BANKS FROM ZERO
0009 3600        58 CLRLP: MVI M,0         ;CLEAR RAM TO ZERO
000B 23          59        INX H
000C 0D          60        DCR C
000D C20900  C   61        JNZ CLRLP
0010 05          62        DCR B
0011 C20900  C   63        JNZ CLRLP
0014 FB          64        EI
                 65
```

```
N LOC  OBJ        SEQ        SOURCE STATEMENT

0015 CD3500   C   66 LOOP:   CALL GETKBD      ;GET A KEY CODE
0018 D610         67         SUI 16
001A DA1500   C   68         JC LOOP          ;LESS THAN 16, IGNORE
001D E60F         69         ANI 0FH
001F 07           70         RLC
0020 4F           71         MOV C,A          ;TO B,C
0021 0600         72         MVI B,0
0023 214200   C   73         LXI H,DSPTBL
0026 09           74         DAD B
0027 4E           75         MOV C,M          ;GET CODE
0028 23           76         INX H
0029 46           77         MOV B,M
002A 78           78         MOV A,B          ;CHECK FOR ZERO
002B B1           79         ORA C
002C CA1500   C   80         JZ LOOP
002F CD0000   E   81         CALL INTPR       ;CALL THE INTERPREER
0032 C31500   C   82         JMP LOOP
                  83 ;GET A KEYBOARD CODE...
                  84 ;
0035 AF           85 GETKBD: XRA A
0036 210000   E   86         LXI H,KBDFLG
0039 BE           87         CMP M
003A CA3500   C   88         JZ GETKBD
003D 77           89         MOV M,A
003E 3A0000   E   90         LDA KBDCOD
0041 C9           91         RET
                  92 ;DISPATCH TABLE...
                  93 ;
0042 0000     E   94 DSPTBL: DW RDSEQ         ;16: MEASURE
0044 0000         95         DW 0             ;17: RIGHT
0046 0000         96         DW 0             ;18: LEFT
0048 0000         97         DW 0             ;19: PRISM
004A 0000         98         DW 0             ;20: PRINT
004C 0000         99         DW 0             ;21: LAYOUT
004E 0000         100        DW 0             ;22: ADD
0050 0000         101        DW 0             ;23: MM/DIOPT
0052 0000         102        DW 0             ;24: CYL CON
0054 0000         103        DW 0             ;25: CONTACT
0056 0000         104        DW 0             ;26
0058 0000         105        DW 0             ;27
005A 0000         106        DW 0             ;28
005C 0000         107        DW 0             ;29
005E 0000         108        DW 0             ;30
0060 0000         109        DW 0             ;31
                  110 ;THE END..
                  111        END
```

PUBLIC SYMBOLS

EXTERNAL SYMBOLS
INTPR  E 0000    KBDCOD E 0000    KBDFLG E 0000    RDSEQ E 0000

USER SYMBOLS
BIT0   A 0001   BIT1   A 0002   BIT2    A 0004   BIT3   A 0008   BIT4  A 0010   BIT5   A 0020   BIT6    A 0040
BIT7   A 0080   CLRLP  C 0009   DSPTBL  C 0042   GETKBD C 0035   INTPR E 0000   KBDCOD E 0000   KBDFLG  E 0000
LOOP   C 0015   RDSEQ  E 0000   START   C 0000   STCK   D 0028

ASSEMBLY COMPLETE, NO ERROR(S)

```
LOC  OBJ        SEQ      SOURCE STATEMENT

0 ;****************************************************
                1 ;
                2 ;            LENS METER MATH PROGRAM SEQUENCES
                3 ;
                4 ;****************************************************
                5 ;
                6 ;       PROGRAM NAME:   MPRGM.ASM
                7 ;       AUTHOR:         J. CORENMAN
                8 ;
                9 ; EDIT HISTORY:
               10 ;       6/30/77 JEC     CORRECTIONS
               11 ;       6/29/77 JEC     RE-DONE
               12 ;       6/26/77 JEC
               13 ;       6/23/77 JEC     STARTED
               14 ;
               15          NAME MPRGM
               16 ;
               17 ; DEFS...
               18          PUBLIC  SEQORG, RDSEQ
               19 ;
               20 ;
0000           21          STOP EQU 0
0001           22          ENTER EQU STOP+1
0002           23          PLUS EQU ENTER+1
0003           24          MINUS EQU PLUS+1
0004           25          MPY EQU MINUS+1
0005           26          DIV EQU MPY+1
0006           27          LOAD EQU DIV+1
0007           28          STO EQU LOAD+1
0008           29          RCL EQU STO+1
0009           30          EXCHG EQU RCL+1
000A           31          ROLUP EQU EXCHG+1
000B           32          ROLDN EQU ROLUP+1
000C           33          CHGSIN EQU ROLDN+1
000D           34          ABS EQU CHGSIN+1
000E           35          SIN EQU ABS+1
000F           36          COS EQU SIN+1
0010           37          ASIN EQU COS+1
0011           38          ACOS EQU ASIN+1
0012           39          SQRT EQU ACOS+1
0013           40          GOSUB EQU SQRT+1
0014           41          GOTO EQU GOSUB+1
0015           42          RTN EQU GOTO+1
0016           43          XEQ0 EQU RTN+1
0017           44          XNE0 EQU XEQ0+1
0018           45          XGT0 EQU XNE0+1
0019           46          XGE0 EQU XGT0+1
001A           47          XLT0 EQU XGE0+1
001B           48          XLE0 EQU XLT0+1
001C           49          XEQY EQU XLE0+1
001D           50          XNEY EQU XEQY+1
001E           51          XGTY EQU XNEY+1
001F           52          XGEY EQU XGTY+1
0020           53          XLTY EQU XGEY+1
0021           54          XLEY EQU XLTY+1
0022           55          DISPLY EQU XLEY+1
0023           56          DSPCLR EQU DISPLY+1
0024           57          GETCNT EQU DSPCLR+1
0025           58          LAMPS EQU GETCNT+1
               59
               60          CSEG
               61 ; FRONT END FOR THE BASIC MEASURE SEQUENCE...
               62 ;
               63 SEQORG:
               64
```

```
N LOC  OBJ        SEQ           SOURCE STATEMENT 0000 24          65 RDSEQ:  DB      GETCNT  ;GET THE DATA INTO R1-R16
0001 23          66         DB      DSPCLR
0002 25          67         DB      LAMPS, 0,0
0003 00
0004 00
0005 25          68         DB      LAMPS, 1,0
0006 01
0007 00
0008 25          69         DB      LAMPS, 2,0
0009 02
000A 00
                 70 ;
                 71 ;COMPUTE X1, Y1 BY LOADING THE STACK WITH RAW DATA AND CALLING A SUBROUTINE.
                 72 ;THE RESULTS ARE THEN STORED BACK INTO R1 = X1, R2 = Y1
                 73 ;
000B 08          74         DB      RCL, 4
000C 04
000D 08          75         DB      RCL, 3
000E 03
000F 08          76         DB      RCL, 2
0010 02
0011 08          77         DB      RCL, 1
0012 01
0013 13          78         DB      GOSUB
0014 9401  C     79         DW      XYCLC
0016 07          80         DB      STO, 1       ;REG1 = X1
0017 01
0018 09          81         DB      EXCHG
0019 07          82         DB      STO, 2       ;REG2 = Y1
001A 02
                 83 ;
                 84 ;REPEAT FOR X2, Y2, ETC...
                 85 ;
001B 08          86         DB      RCL, 8
001C 08
001D 08          87         DB      RCL, 7
001E 07
001F 08          88         DB      RCL, 6
0020 06
0021 08          89         DB      RCL, 5
0022 05
0023 13          90         DB      GOSUB
0024 9401  C     91         DW      XYCLC
0026 07          92         DB      STO, 3       ;REG3 = X2
0027 03
0028 09          93         DB      EXCHG
0029 07          94         DB      STO, 4       ;REG4 = Y2
002A 04
                 95
002B 08          96         DB      RCL, 12
002C 0C
002D 08          97         DB      RCL, 11
002E 0B
002F 08          98         DB      RCL, 10
0030 0A
0031 08          99         DB      RCL, 9
0032 09
0033 13         100         DB      GOSUB
0034 9401  C    101         DW      XYCLC
0036 07         102         DB      STO, 5       ;REG5 = X3
0037 05
0038 09         103         DB      EXCHG
0039 07         104         DB      STO, 6       ;REG6 = Y3
003A 06
                105
```

| LOC OBJ | SEQ | SOURCE STATEMENT | |
|---|---|---|---|
| 003B 08 | 106 | DB | RCL, 16 |
| 003C 10 | | | |
| 003D 08 | 107 | DB | RCL, 15 |
| 003E 0F | | | |
| 003F 08 | 108 | DB | RCL, 14 |
| 0040 0E | | | |
| 0041 08 | 109 | DB | RCL, 13 |
| 0042 0D | | | |
| 0043 13 | 110 | DB | GOSUB |
| 0044 9401 C | 111 | DW | XYCLC |
| 0046 07 | 112 | DB | STO, 7    ;REG7 = X4 |
| 0047 07 | | | |
| 0048 09 | 113 | DB | EXCHG |
| 0049 07 | 114 | DB | STO, 8    ;REG8 = Y4 |
| 004A 08 | | | |
| | 115 ; | | |
| | 116 ;NOW FORM INTERMMEDIATE PRISM VALUES...PX = X1+X2+X3+X4 | | |
| | 117 ; | | |
| 004B 08 | 118 | DB | RCL, 1 |
| 004C 01 | | | |
| 004D 08 | 119 | DB | RCL, 3 |
| 004E 03 | | | |
| 004F 08 | 120 | DB | RCL, 5 |
| 0050 05 | | | |
| 0051 08 | 121 | DB | RCL, 7 |
| 0052 07 | | | |
| 0053 02 | 122 | DB | PLUS |
| 0054 02 | 123 | DB | PLUS |
| 0055 02 | 124 | DB | PLUS |
| 0056 07 | 125 | DB | STO, 9    ;REG9 = PX |
| 0057 09 | | | |
| | 126 ; | | |
| | 127 ;AND PY = Y1+Y2+Y3+Y4 | | |
| | 128 ; | | |
| 0058 08 | 129 | DB | RCL, 2 |
| 0059 02 | | | |
| 005A 08 | 130 | DB | RCL, 4 |
| 005B 04 | | | |
| 005C 08 | 131 | DB | RCL, 6 |
| 005D 06 | | | |
| 005E 08 | 132 | DB | RCL, 8 |
| 005F 08 | | | |
| 0060 02 | 133 | DB | PLUS |
| 0061 02 | 134 | DB | PLUS |
| 0062 02 | 135 | DB | PLUS |
| 0063 07 | 136 | DB | STO, 10   ;REG10 = PY |
| 0064 0A | | | |
| | 137 ; | | |
| | 138 ;NOW COMPUTE VARIOUS SUMS OF X AND Y VALUES... | | |
| | 139 ;     REG11 = X1-X2-X3+X4   (PNNP) | | |
| | 140 ;     REG12 = X1+X2-X3-X4   (PPNN) | | |
| | 141 ;     REG13 = X1-X2+X3-X4   (PNPN) | | |
| | 142 ;     REG14 = Y1-Y2-Y3+Y4   (PNNP) | | |
| | 143 ;     REG15 = Y1+Y2-Y3-Y4   (PPNN) | | |
| | 144 ;     REG16 = Y1-Y2+Y3-Y4   (PNPN) | | |
| | 145 ; | | |
| 0065 08 | 146 | DB | RCL, 1 |
| 0066 01 | | | |
| 0067 08 | 147 | DB | RCL, 7 |
| 0068 07 | | | |
| 0069 08 | 148 | DB | RCL, 5 |
| 006A 05 | | | |
| 006B 08 | 149 | DB | RCL, 3 |
| 006C 03 | | | |
| 006D 13 | 150 | DB | GOSUB |
| 006E D801 C | 151 | DW | XYSUM |

| LOC OBJ | SEQ | SOURCE STATEMENT | |
|---|---|---|---|
| 0070 07 | 152 | DB | STO,11 |
| 0071 0B | | | |
| | 153 | | |
| 0072 08 | 154 | DB | RCL,1 |
| 0073 01 | | | |
| 0074 08 | 155 | DB | RCL,3 |
| 0075 03 | | | |
| 0076 08 | 156 | DB | RCL,5 |
| 0077 05 | | | |
| 0078 08 | 157 | DB | RCL,7 |
| 0079 07 | | | |
| 007A 13 | 158 | DB | GOSUB |
| 007B D801 C | 159 | DW | XYSUM |
| 007D 07 | 160 | DB | STO,12 |
| 007E 0C | | | |
| | 161 | | |
| | 162 | | |
| 007F 08 | 163 | DB | RCL,1 |
| 0080 01 | | | |
| 0081 08 | 164 | DB | RCL,5 |
| 0082 05 | | | |
| 0083 08 | 165 | DB | RCL,3 |
| 0084 03 | | | |
| 0085 08 | 166 | DB | RCL,7 |
| 0086 07 | | | |
| 0087 13 | 167 | DB | GOSUB |
| 0088 D801 C | 168 | DW | XYSUM |
| 008A 07 | 169 | DB | STO,13 |
| 008B 0D | | | |
| | 170 | | |
| 008C 08 | 171 | DB | RCL,2 |
| 008D 02 | | | |
| 008E 08 | 172 | DB | RCL,8 |
| 008F 08 | | | |
| 0090 08 | 173 | DB | RCL,4 |
| 0091 04 | | | |
| 0092 08 | 174 | DB | RCL,6 |
| 0093 06 | | | |
| 0094 13 | 175 | DB | GOSUB |
| 0095 D801 C | 176 | DW | XYSUM |
| 0097 07 | 177 | DB | STO,14 |
| 0098 0E | | | |
| | 178 | | |
| 0099 08 | 179 | DB | RCL,2 |
| 009A 02 | | | |
| 009B 08 | 180 | DB | RCL,4 |
| 009C 04 | | | |
| 009D 08 | 181 | DB | RCL,6 |
| 009E 06 | | | |
| 009F 08 | 182 | DB | RCL,8 |
| 00A0 08 | | | |
| 00A1 13 | 183 | DB | GOSUB |
| 00A2 D801 C | 184 | DW | XYSUM |
| 00A4 07 | 185 | DB | STO,15 |
| 00A5 0F | | | |
| | 186 | | |
| 00A6 08 | 187 | DB | RCL,2 |
| 00A7 02 | | | |
| 00A8 08 | 188 | DB | RCL,6 |
| 00A9 06 | | | |
| 00AA 08 | 189 | DB | RCL,4 |
| 00AB 04 | | | |
| 00AC 08 | 190 | DB | RCL,8 |
| 00AD 08 | | | |
| 00AE 13 | 191 | DB | GOSUB |
| 00AF D801 C | 192 | DW | XYSUM |

```
LOC  OBJ       SEQ     SOURCE STATEMENT

00B1 07        193     DB      STO, 16
00B2 10
               194 ;
               195 ;NOW USE THESE VALUES TO COMPUTE SEQ, C+, CX, PV1 AND PV2
               196 ;
00B3 08        197     DB      RCL, 11
00B4 0B
00B5 08        198     DB      RCL, 15
00B6 0F
00B7 02        199     DB      PLUS
00B8 0C        200     DB      CHGSIN
00B9 07        201     DB      STO, 1          ;REG1 = SEQ
00BA 01
00BB 08        202     DB      RCL, 11
00BC 0B
00BD 08        203     DB      RCL, 15
00BE 0F
00BF 03        204     DB      MINUS
00C0 06        205     DB      LOAD
00C1 2702  C   206     DW      C2PT0
00C3 04        207     DB      MPY
00C4 07        208     DB      STO, 2          ;REG2 = C+
00C5 02
               209
00C6 08        210     DB      RCL, 12
00C7 0C
00C8 08        211     DB      RCL, 14
00C9 0E
00CA 02        212     DB      PLUS
00CB 06        213     DB      LOAD
00CC 2702  C   214     DW      C2PT0
00CE 04        215     DB      MPY
00CF 07        216     DB      STO, 3          ;REG3 = CX
00D0 03
               217
00D1 08        218     DB      RCL, 13
00D2 0D
00D3 08        219     DB      RCL, 16
00D4 10
00D5 02        220     DB      PLUS
00D6 0C        221     DB      CHGSIN
00D7 07        222     DB      STO, 4          ;REG4 = PV1
00D8 04
               223
00D9 08        224     DB      RCL, 13
00DA 0D
00DB 08        225     DB      RCL, 16
00DC 10
00DD 03        226     DB      MINUS
00DE 07        227     DB      STO, 5          ;REG5 = PV2
00DF 05
               228
               229 ;
               230 ;NOW COMPUTE C = S * SQRT( C+2 + CX2)
               231 ;
00E0 08        232     DB      RCL, 2          ;C+
00E1 02
00E2 01        233     DB      ENTER
00E3 04        234     DB      MPY
00E4 08        235     DB      RCL, 3          ;CX
00E5 03
00E6 01        236     DB      ENTER
00E7 04        237     DB      MPY
00E8 02        238     DB      PLUS
00E9 12        239     DB      SQRT
00EA 06        240     DB      LOAD
```

```
LOC  OBJ      SEQ      SOURCE STATEMENT

00EB 0702  C  241      DW    S
00ED 04       242      DB    MPY
00EE 07       243      DB    STO, 6        ;REG6 = C
00EF 06
              244 ;
              245 ;NOW COMPUTE THE AXIS FROM EITHER ARCSIN OR ARCCOS...
              246 ;IF C+ < CX THEN USE  2 * (AXIS + A) = ARCCOS ((S * C+ + ZC+ )/C ), AND
              247 ;                     IF CX < 0 THEN SUBTRACT FROM 360 DEGREES.
              248 ;         ELSE USE   2 * (AXIS + A) = ARCSIN ((S * CX + ZCX )/C ), AND
              249 ;                     IF C+ < 0 THEN SUBTRACT FROM 180 DEGREES.
              250 ;
00F0 08       251      DB    RCL, 3        ;CX
00F1 03
00F2 08       252      DB    RCL, 2        ;C+
00F3 02
00F4 20       253      DB    XLTY
00F5 2101  C  254      DW    LCOS
              255
00F7 08       256      DB    RCL, 3        ;CX
00F8 03
00F9 06       257      DB    LOAD
00FA 0702  C  258      DW    S
00FC 04       259      DB    MPY
00FD 06       260      DB    LOAD
00FE 1B02  C  261      DW    ZCX2
0100 02       262      DB    PLUS
0101 08       263      DB    RCL, 6        ;C
0102 06
0103 05       264      DB    DIV
0104 10       265      DB    ASIN
0105 08       266      DB RCL, 2           ;C+ CHECK
0106 02
0107 19       267      DB    XGE0
0108 1301  C  268      DW    LSIN2
010A 0B       269      DB    ROLDN
010B 06       270      DB    LOAD
010C 1F02  C  271      DW    C0PT5         ;180 DEGREES
010E 09       272      DB    EXCHG
010F 03       273      DB    MINUS
0110 14       274      DB    GOTO
0111 1401  C  275      DW    LSIN3
0113 0B       276 LSIN2: DB  ROLDN
0114 06       277 LSIN3: DB  LOAD
0115 2702  C  278      DW    C2PT0
0117 05       279      DB    DIV
0118 06       280      DB    LOAD
0119 0F02  C  281      DW    AA
011B 03       282      DB    MINUS
011C 07       283      DB    STO, 7        ;REG7 = AXIS
011D 07
011E 14       284      DB    GOTO
011F 4701  C  285      DW    LRX
              286
0121 06       287 LCOS: DB   LOAD
0122 0702  C  288      DW    S
0124 08       289      DB    RCL, 2        ;C+
0125 02
0126 04       290      DB    MPY
0127 06       291      DB    LOAD
0128 1702  C  292      DW    ZCPLS2
012A 02       293      DB    PLUS
012B 08       294      DB    RCL, 6
012C 06
012D 05       295      DB    DIV
012E 11       296      DB    ACOS
012F 08       297      DB    RCL, 3        ;CX CHECK
0130 03
```

| LOC | OBJ | | SEQ | | SOURCE STATEMENT | |
|---|---|---|---|---|---|---|
| 0131 | 19 | | 298 | DB | XGE0 | |
| 0132 | 3C01 | C | 299 | DW | LCOS2 | |
| 0134 | 06 | | 300 | DB | LOAD | |
| 0135 | 2302 | C | 301 | DW | C1PT0 | |
| 0137 | 09 | | 302 | DB | EXCHG | |
| 0138 | 03 | | 303 | DB | MINUS | |
| 0139 | 14 | | 304 | DB | GOTO | |
| 013A | 3D01 | C | 305 | DW | LCOS3 | |
| 013C | 0B | | 306 LCOS2: | DB | ROLDN | |
| 013D | 06 | | 307 LCOS3: | DB | LOAD | |
| 013E | 2702 | C | 308 | DW | C2PT0 | |
| 0140 | 05 | | 309 | DB | DIV | |
| 0141 | 06 | | 310 | DB | LOAD | |
| 0142 | 0F02 | C | 311 | DW | AA | |
| 0144 | 03 | | 312 | DB | MINUS | |
| 0145 | 07 | | 313 | DB | STO, 7 | ;REG7 = AXIS |
| 0146 | 07 | | | | | |
| | | | 314 | | | |
| | | | 315 LRX: | | | |
| | | | 316 ; | | | |
| | | | 317 ;NOW FINALLY FORM RX VALUES... | | | |
| | | | 318 ; SRX = SEQ * S - C/2 - Z | | | |
| | | | 319 ; | | | |
| 0147 | 08 | | 320 | DB | RCL, 6 | ;C |
| 0148 | 06 | | | | | |
| 0149 | 06 | | 321 | DB | LOAD | |
| 014A | 2702 | C | 322 | DW | C2PT0 | |
| 014C | 05 | | 323 | DB | DIV | |
| 014D | 06 | | 324 | DB | LOAD | |
| 014E | 0802 | C | 325 | DW | Z | |
| 0150 | 02 | | 326 | DB | PLUS | |
| 0151 | 0C | | 327 | DB | CHGSIN | |
| 0152 | 06 | | 328 | DB | LOAD | |
| 0153 | 0702 | C | 329 | DW | S | |
| 0155 | 08 | | 330 | DB | RCL, 1 | ;SEQ |
| 0156 | 01 | | | | | |
| 0157 | 04 | | 331 | DB | MPY | |
| 0158 | 02 | | 332 | DB | PLUS | |
| 0159 | 07 | | 333 | DB | STO, 10 | ;SRX |
| 015A | 0A | | | | | |
| | | | 334 ; | | | |
| | | | 335 ; CRX = C | | | |
| | | | 336 ; | | | |
| 015B | 08 | | 337 | DB | RCL, 6 | ;C |
| 015C | 06 | | | | | |
| 015D | 07 | | 338 | DB | STO, 11 | |
| 015E | 0B | | | | | |
| | | | 339 ; | | | |
| | | | 340 ;AXISRX = AXIS | | | |
| | | | 341 ; | | | |
| 015F | 08 | | 342 | DB | RCL, 7 | |
| 0160 | 07 | | | | | |
| 0161 | 06 | | 343 | DB | LOAD | |
| 0162 | 2F02 | C | 344 | DW | C360 | |
| 0164 | 04 | | 345 | DB | MPY | ;CONVERT TO DEGREES |
| 0165 | 07 | | 346 AXLP: | DB | STO, 12 | ;REG12 = RX AXIS |
| 0166 | 0C | | | | | |
| 0167 | 06 | | 347 | DB | LOAD | |
| 0168 | 1F02 | C | 348 | DW | C0PT5 | |
| 016A | 03 | | 349 | DB | MINUS | |
| 016B | 1A | | 350 | DB | XLT0 | |
| 016C | 7801 | C | 351 | DW | AXUP | ;LESS THAN 0.5 DEGREE |
| 016E | 06 | | 352 | DB | LOAD | |
| 016F | 2B02 | C | 353 | DW | C180 | |
| 0171 | 03 | | 354 | DB | MINUS | |
| 0172 | 19 | | 355 | DB | XGE0 | ;OVER 180.5 |

```
LOC  OBJ       SEQ      SOURCE STATEMENT 0173 8101  C  356           DW    AXDWN
0175 14       357           DB    GOTO
0176 8A01  C  358           DW    AXOK
              359
0178 08       360 AXUP:    DB    RCL, 12
0179 0C
017A 06       361           DB    LOAD
017B 2B02  C  362           DW    C180
017D 02       363           DB    PLUS
017E 14       364           DB    GOTO
017F 6501  C  365           DW    AXLP
              366
0181 08       367 AXDWN:   DB    RCL, 12
0182 0C
0183 06       368           DB    LOAD
0184 2B02  C  369           DW    C180
0186 03       370           DB    MINUS
0187 14       371           DB    GOTO
0188 6501  C  372           DW    AXLP
              373 AXOK:
              374 ;
              375 ;NOW DISPLAY THE RESULTS...
              376 ;
018A 08       377           DB    RCL, 12
018B 0C
018C 08       378           DB    RCL, 11
018D 0B
018E 08       379           DB    RCL, 10
018F 0A
0190 13       380           DB    GOSUB
0191 DD01  C  381           DW    DSPSCA
0193 00       382           DB    STOP        ;WHEW!
              383 ;SUBROUTINE TO COMPUTE X,Y FROM RAW COUNTS...
              384 ;
0194 07       385 XYCLC:   DB    STO, 17     ;STORE RAW COUNTS IN REG 17-20
0195 11
0196 0B       386           DB    ROLDN
0197 07       387           DB    STO, 18
0198 12
0199 0B       388           DB    ROLDN
019A 07       389           DB    STO, 19
019B 13
019C 0B       390           DB    ROLDN
019D 07       391           DB    STO, 20
019E 14
019F 0B       392           DB    ROLDN
01A0 02       393           DB    PLUS
01A1 0C       394           DB    CHGSIN
01A2 02       395           DB    PLUS
01A3 02       396           DB    PLUS         ;X = F
01A4 06       397           DB    LOAD
01A5 EF01  C  398           DW    ALPHA
01A7 04       399           DB    MPY
01A8 06       400           DB    LOAD
01A9 F301  C  401           DW    BETA
01AB 02       402           DB    PLUS         ;X = R
01AC 08       403           DB    RCL, 17
01AD 11
01AE 08       404           DB    RCL, 18
01AF 12
01B0 02       405           DB    PLUS
01B1 08       406           DB    RCL, 19
01B2 13
01B3 02       407           DB    PLUS
01B4 08       408           DB    RCL, 20
01B5 14
```

```
LOC  OBJ       SEQ      SOURCE STATEMENT

01B6 02        409      DB    PLUS
01B7 06        410      DB    LOAD
01B8 F701  C   411      DW    GAMMA
01BA 04        412      DB    MPY
01BB 06        413      DB    LOAD
01BC FB01  C   414      DW    DELTA
01BE 02        415      DB    PLUS        ;X = THETA, Y = R
01BF 09        416      DB    EXCHG
01C0 07        417      DB    STO, 20     ;REG20 = R
01C1 14
01C2 09        418      DB    EXCHG
01C3 07        419      DB    STO, 19     ;REG19 = THETA
01C4 13
01C5 0E        420      DB    SIN
01C6 08        421      DB    RCL, 20
01C7 14
01C8 04        422      DB    MPY         ;Y = R SIN(THETA)
01C9 06        423      DB    LOAD
01CA 0302  C   424      DW    Y0
01CC 03        425      DB    MINUS
               426
01CD 08        427      DB    RCL, 19
01CE 13
01CF 0F        428      DB    COS
01D0 08        429      DB    RCL, 20
01D1 14
01D2 04        430      DB    MPY
01D3 06        431      DB    LOAD
01D4 FF01  C   432      DW    X0
01D6 03        433      DB    MINUS       ;X = X(I), Y = Y(I)
01D7 15        434      DB    RTN
               435 ;
               436 ;SUBROUTINE TO FORM THE SUM (T) + (Z) - (Y) - (X)
               437 ;
01D8 02        438 XYSUM: DB  PLUS
01D9 0C        439      DB    CHGSIN
01DA 02        440      DB    PLUS
01DB 02        441      DB    PLUS
01DC 15        442      DB    RTN
               443 ;SUBROUTINE TO LOAD SPHERE, CYL AND AXIS INTO DISPLAY
               444 ;
01DD 22        445 DSPSCA: DB DISPLY, 0   ;X = SPHERE
01DE 00
01DF 0B        446      DB    ROLDN
01E0 22        447      DB    DISPLY, 1
01E1 01
01E2 0B        448      DB    ROLDN
01E3 22        449      DB    DISPLY, 2
01E4 02
01E5 25        450      DB    LAMPS, 0,1
01E6 00
01E7 01
01E8 25        451      DB    LAMPS, 1,1
01E9 01
01EA 01
01EB 25        452      DB    LAMPS, 2,1
01EC 02
01ED 01
01EE 15        453      DB    RTN
               454 ;    CONSTANTS AND SUCH...
               455 ;
01EF E8        456 ALPHA: DB  232, 199, 211, 4   ;13.2363 (2.0197 E-4 * 65536)
01F0 C7
01F1 D3
01F2 04
```

```
LOC  OBJ        SEQ       SOURCE STATEMENT

01F3 7B         457 BETA:   DB      123, 020, 158, 3       ;-4.94
01F4 14
01F5 9E
01F6 03
01F7 36         458 GAMMA:  DB      54, 0, 128, -1         ;.25 (90 DEGREES)
01F8 00
01F9 80
01FA FF
01FB AD         459 DELTA:  DB      173, 33, 252, -2       ;-.246222 (-88.64 DEGREES)
01FC 21
01FD FC
01FE FE
01FF 8F         460 X0:     DB      143, 194, 191, 1       ;-1.42
0200 C2
0201 BF
0202 01
0203 5C         461 Y0:     DB      92, 143, 146, 4        ;9.16
0204 8F
0205 92
0206 04
0207 CC         462 S:      DB      204, 204, 204, 2       ;3.2
0208 CC
0209 CC
020A 02
020B A3         463 Z:      DB      163, 112, 189, 2       ;-2.96
020C 70
020D BD
020E 02
020F 00         464 AA:     DB      0, 0, 0, 0             ;ZERO FOR NOW...
0210 00
0211 00
0212 00
0213 6E         465 DSUBL:  DB      110, 18, 131, -9       ;1.0 E-3
0214 12
0215 83
0216 F7
0217 00         466 ZCPLS2: DB      0, 0, 0, 0             ;ZC+ * 2
0218 00
0219 00
021A 00
                467
021B 00         468 ZCX2:   DB      0, 0, 0, 0             ;ZCX * 2
021C 00
021D 00
021E 00
                469
021F 00         470 C0PT5:  DB      0, 0, 128, 0           ;0.5
0220 00
0221 80
0222 00
0223 00         471 C1PT0:  DB      0, 0, 128, 1           ;1.0
0224 00
0225 80
0226 01
0227 00         472 C2PT0:  DB      0, 0, 128, 2           ;2.0
0228 00
0229 80
022A 02
022B 00         473 C180:   DB      0, 0, 180, 8
022C 00
022D B4
022E 08
022F 00         474 C360:   DB      0, 0, 180, 9
0230 00
0231 B4
0232 09
                475       END
```

PUBLIC SYMBOLS

RDSEQ C 0000   SEQORG C 0000

EXTERNAL SYMBOLS

USER SYMBOLS
| | | | | | | | | | | | | | | |
|---|---|---|---|---|---|---|---|---|---|---|---|---|---|---|
| AA | C 020F | ABS | A 000D | ACOS | A 0011 | ALPHA | C 01EF | ASIN | A 0010 | AXDWN | C 0181 | AXLP | C 0165 |
| AXOK | C 018A | AXUP | C 0178 | BETA | C 01F3 | C0PT5 | C 021F | C180 | C 022B | C1PT0 | C 0223 | C2PT0 | C 0227 |
| C360 | C 022F | CHGSIN | A 000C | COS | A 000F | DELTA | C 01FB | DISPLY | A 0022 | DIV | A 0005 | DSPCLR | A 0023 |
| DSPSCA | C 01DD | DSUBL | C 0213 | ENTER | A 0001 | EXCHG | A 0009 | GAMMA | C 01F7 | GETCNT | A 0024 | GOSUB | A 0013 |
| GOTO | A 0014 | LAMPS | A 0025 | LCOS | C 0121 | LCOS2 | C 013C | LCOS3 | C 013D | LOAD | A 0006 | LRX | C 0147 |
| LSIN2 | C 0113 | LSIN3 | C 0114 | MINUS | A 0003 | MPY | A 0004 | PLUS | A 0002 | RCL | A 0008 | RDSEQ | C 0000 |
| ROLDN | A 000B | ROLUP | A 000A | RTN | A 0015 | S | C 0207 | SEQORG | C 0000 | SIN | A 000E | SQRT | A 0012 |
| STO | A 0007 | STOP | A 0000 | X0 | C 01FF | XEQ0 | A 0016 | XEQY | A 001C | XGE0 | A 0019 | XGEY | A 001F |
| XGT0 | A 0018 | XGTY | A 001E | XLE0 | A 001B | XLEY | A 0021 | XLT0 | A 001A | XLTY | A 0020 | XNE0 | A 0017 |
| XNEY | A 001D | XYCLC | C 0194 | XYSUM | C 01D8 | Y0 | C 0203 | Z | C 020B | ZCPLS2 | C 0217 | ZCX2 | C 021B |

ASSEMBLY COMPLETE, NO ERROR(S)

N LOC  OBJ        SEQ       SOURCE STATEMENT

```
     0 ;****************************************************
     1 ;
     2 ;            LENS METER DISPLAY/KEYBOARD DRIVER
     3 ;
     4 ;****************************************************
     5 ;
     6 ;       PROGRAM NAME:   DSPDVR.ASM
     7 ;       AUTHOR:         J. CORENMAN
     8 ;
     9 ; EDIT HISTORY:
    10 ;       6/30/77 JEC
    11 ;       6/29/77 JEC
    12 ;       6/27/77 JEC     ADD LAMP, KEYBOARD DRIVERS
    13 ;       6/26/77 JEC     STARTED
    14 ;
    15 ;
    16           NAME DSPDVR
    17 ;
    18 ;DEFINITIONS...
    19 ;
0001 20         BIT0   EQU   00000001B
0002 21         BIT1   EQU   00000010B
0004 22         BIT2   EQU   00000100B
0008 23         BIT3   EQU   00001000B
0010 24         BIT4   EQU   00010000B
0020 25         BIT5   EQU   00100000B
0040 26         BIT6   EQU   01000000B
0080 27         BIT7   EQU   10000000B
    28 ;
    29 ;EXTERNALS...
    30 ;
    31         PUBLIC DSPCON, DSPBLK, LMPDVR
    32         PUBLIC KBDCOD, KBDFLG, TBLRT, TBLLFT, RADFLG
    33         PUBLIC KBDCHK
    34         EXTRN  XINTGR, XFRACT, FXPCON, SIGNX
    35         EXTRN  REGT1, REGT2, REGT15, REGT25, REGT27
```

```
N LOC  OBJ        SEQ       SOURCE STATEMENT

36 ;  SEGMENT DEFS...
                  37 ;
0001              38       SEGA    EQU   BIT0
0002              39       SEGB    EQU   BIT1
0004              40       SEGC    EQU   BIT2
0008              41       SEGD    EQU   BIT3
0010              42       SEGE    EQU   BIT4
0020              43       SEGF    EQU   BIT5
0040              44       SEGG    EQU   BIT6
0080              45       SEGDP   EQU   BIT7
                  46
003F              47       SEG0    EQU   SEGA+SEGB+SEGC+SEGD+SEGE+SEGF
0006              48       SEG1    EQU   SEGB+SEGC
005B              49       SEG2    EQU   SEGA+SEGB+SEGG+SEGE+SEGD
004F              50       SEG3    EQU   SEGA+SEGB+SEGG+SEGC+SEGD
0066              51       SEG4    EQU   SEGB+SEGC+SEGG+SEGF
006D              52       SEG5    EQU   SEGA+SEGF+SEGG+SEGC+SEGD
007D              53       SEG6    EQU   SEGA+SEGF+SEGE+SEGD+SEGC+SEGG
0007              54       SEG7    EQU   SEGA+SEGB+SEGC
007F              55       SEG8    EQU   SEG0+SEGG
006F              56       SEG9    EQU   SEG8-SEGE
0060              57       SEGPLS  EQU   SEGF+SEGG
0040              58       SEGMNS  EQU   SEGG
                  59 ;  DISPLAY INTERRUPT DRIVER...
                  60 ;
0020              61       DSPREG  EQU   20H
                  62
                  63       ASEG
0018              64       ORG 18H         ; INTERRUPT 3
0018 C30000  C    65       JMP DSPINT
                  66
                  67       CSEG
                  68 ;
                  69 ; INTERRUPT ENTRY:
                  70 ;
0000 F5           71 DSPINT: PUSH PSW      ; SAVE A COUPLE OF REGISTERS
0001 E5           72       PUSH H
0002 DB20         73       IN DSPREG       ; GET DISPLAY COUNTER
0004 E60F         74       ANI 0FH
0006 210000  D    75       LXI H,DSPBUF
0009 85           76       ADD L
000A 6F           77       MOV L,A
000B 7E           78       MOV A,M         ; GET BYTE TO BE DISPLAYED
000C D320         79       OUT DSPREG      ; OUTPUT IT
000E E1           80       POP H
000F F1           81       POP PSW
0010 FB           82       EI
0011 C9           83       RET
                  84 ;
                  85 ; DISPLAY BUFFER...
                  86 ;
                  87       DSEG
0000              88 DSPBUF: DS 12
                  89       CSEG
                  90 ;  DISPLAY CONVERSION ROUTINE...
                  91 ;  CALLED BY MATH INTERPRETER WITH ONE ARGUMENT (IN C),
                  92 ;  A FIELD NUMBER (0-4). THERE ARE FIVE FIELDS: TWO ARE
                  93 ;  USED WITH TWO DIFFERENT FORMATS, MAPPED INTO SAME DIGITS
                  94 ;
0012 C5           95 DSPCON: PUSH B
0013 CD0000  E    96       CALL FXPCON     ; DO FIXED POINT CONVERSION
0016 AF           97       XRA A
0017 321300  D    98       STA LZFLG       ; CLEAR LEADING ZERO FLAG
001A C1           99       POP B
001B 0600        100       MVI B,0
001D 79          101       MOV A,C         ; GET FIELD NUMBER
```

```
N LOC  OBJ        SEQ        SOURCE STATEMENT 001E 07           102        RLC              ;X2
001F 4F           103        MOV C,A
0020 212101  C    104        LXI H,FLDTBL     ;FIELD TABLE BASE
0023 09           105        DAD B
                  106 ;
                  107 ;H,L NOW POINT TO FIELD TABLE...GET PARAMTERS
                  108 ;
0024 4E           109        MOV C,M          ;GET FIRST DIGIT#
0025 EB           110        XCHG             ;TABLE POINTER TO D,E
0026 210000  D    111        LXI H,DSPBUF     ;DISPLAY BUFFER ORIGIN
0029 09           112        DAD B            ;GENERATE POINTER
002A 220C00  D    113        SHLD DSPPTR      ;STORE POINTER
002D 13           114        INX D
002E 1A           115        LDAX D           ;GET # DIGITS IN INTEGER
002F E607         116        ANI 7
0031 07           117        RLC              ;X2
0032 4F           118        MOV C,A
0033 210001  C    119        LXI H,FCTTBL     ;DECIMAL FACTOR TABLE
0036 09           120        DAD B
0037 221000  D    121        SHLD FCTPTR      ;SET FACTOR POINTER
003A 1A           122        LDAX D           ;GET SAME BYTE AGAIN
003B 321200  D    123        STA DIGFLG       ;STORE AS DIGIT FLAGS
                  124 ;
                  125 ;ROUND UP INTEGER IF NO FRACTION...
                  126 ;
003E E680         127        ANI FRACT        ;CHECK FRACTION FLAG
0040 C24E00  C    128        JNZ DIGLP0
0043 3A0000  E    129        LDA XFRACT       ;GET LOW FRACTION
0046 17           130        RAL
0047 D24E00  C    131        JNC DIGLP0       ;HI BIT NOT SET
004A 210000  E    132        LXI H,XINTGR
004D 34           133        INR M            ;INCREMENT INTEGER
                  134 ;
                  135 ;CONVERT NEXT DIGIT TO 7-SEGMENT FORMAT...
                  136 ;
004E 211701  C    137 DIGLP0: LXI H,SEGTBL    ;SEGMENT TABLE BASE
0051 220E00  D    138        SHLD SEGPTR      ;SET POINTER
0054 2A1000  D    139        LHLD FCTPTR      ;GET FACTOR TABLE POINTER
0057 7E           140        MOV A,M          ;CHECK FOR ZERO
0058 B7           141        ORA A
0059 CAC200  C    142        JZ DIGFCT        ;DONE...GO CHECK FOR FRACTION
005C 3C           143        INR A            ;CHECK FOR -1 (LAST DIGIT)
005D C26600  C    144        JNZ DIGL0        ;IS NOT
0060 111300  D    145        LXI D,LZFLG
0063 3E01         146        MVI A,1
0065 12           147        STAX D
0066 4E           148 DIGL0: MOV C,M         ;GET LOW BYTE
0067 23           149        INX H
0068 46           150        MOV B,M          ;AND HI BYTE
                  151 ;
                  152 ;LOOP FOR NEXT SUBTRACT...B,C = DECIMAL FACTOR TO SUBTRACTED..
                  153 ;
0069 2A0000  E    154 DIGLP1: LHLD XINTGR    ;GET REMAINING INTEGER
006C 09           155        DAD B            ;- FACTOR
006D D27D00  C    156        JNC DIGNG        ;NO GO...
0070 220000  E    157        SHLD XINTGR      ;STORE INTEGER
0073 2A0E00  D    158        LHLD SEGPTR      ;GET SEGMENTN POINTER
0076 23           159        INX H
0077 220E00  D    160        SHLD SEGPTR
007A C36900  C    161        JMP DIGLP1
                  162 ;
                  163 ;END OF DIGIT CONVERSION...STORE INTO BUFFER
                  164 ;
007D 2A0C00  D    165 DIGNG: LHLD DSPPTR     ;GET DISPLAY POINTER
0080 EB           166        XCHG             ;TO D,E
0081 2A0E00  D    167        LHLD SEGPTR
```

```
N LOC  OBJ        SEQ         SOURCE STATEMENT 0084 7E           168          MOV A,M        ;GET SEGMENT BYTE
0085 211300  D    169          LXI H,LZFLG
0088 B7           170          ORA A          ;CHECK FOR ZERO
0089 C29300  C    171          JNZ DIGL1      ;IS NOT
008C 7E           172          MOV A,M        ;GET FLAG
008D B7           173          ORA A
008E CA9400  C    174          JZ DIGL1B      ;NOT SET, LEAVE DIGIT ZERO
0091 3E3F         175          MVI A,SEG0
0093 34           176 DIGL1:   INR M
0094 12           177 DIGL1B:  STAX D         ;INTO BUFFER
                  178 ;
                  179 ;CHECK FOR PLUS/MINUS...
                  180 ;
0095 211200  D    181          LXI H,DIGFLG   ;POINT TO FLAG
0098 7E           182          MOV A,M
0099 E640         183          ANI PLSMNS
009B CAB200  C    184          JZ DIGL2       ;NO FLAG SET
009E 7E           185          MOV A,M
009F E6BF         186          ANI NOT PLSMNS ;CLEAR THE FLG
00A1 77           187          MOV M,A
00A2 3A0000  E    188          LDA SIGNX      ;GET SIGN BIT
00A5 1F           189          RAR            ;TO CARRY
00A6 1A           190          LDAX D         ;GET DIGIT
00A7 D2AF00  C    191          JNC DIGL3      ;PLUS
00AA F640         192          ORI SEGMNS     ;MINUS SEGMENT
00AC C3B100  C    193          JMP DIGL4
00AF F660         194 DIGL3:   ORI SEGPLS
00B1 12           195 DIGL4:   STAX D
00B2 EB           196 DIGL2:   XCHG
00B3 23           197          INX H
00B4 220C00  D    198          SHLD DSPPTR    ;STORE POINTER
00B7 2A1000  D    199          LHLD FCTPTR
00BA 2B           200          DCX H          ;DECREMENT FACTOR POINTER
00BB 2B           201          DCX H
00BC 221000  D    202          SHLD FCTPTR
00BF C34E00  C    203          JMP DIGLP0     ;DO NEXT DIGIT
                  204 ;
                  205 ;END OF INTEGER CONVERSION...CHECK FOR FRACTION
                  206 ;
00C2 3A1200  D    207 DIGFCT:  LDA DIGFLG     ;GET FLAGS
00C5 E680         208          ANI FRACT
00C7 CAED00  C    209          JZ DIGDON      ;NOT SET, ALL DONE
00CA 2A0000  E    210          LHLD XFRACT    ;GET FRACTION
00CD 7C           211          MOV A,H        ;GET HI BYTE
00CE C610         212          ADI 10H        ;ROUND UP
00D0 E6E0         213          ANI 0E0H       ;MASK UPPER 3 BITS
00D2 07           214          RLC            ;MOVE TO BITS 0-2
00D3 07           215          RLC
00D4 07           216          RLC
00D5 07           217          RLC            ;MULTIPLY BY 2
00D6 4F           218          MOV C,A        ;TO B,C FOR A TABLE LOOK-UP
00D7 0600         219          MVI B,0
00D9 21FB00  C    220          LXI H,FRCTTB
00DC 09           221          DAD B
00DD EB           222          XCHG           ;POINTER TO D,E
00DE 2A0C00  D    223          LHLD DSPPTR    ;DISPLAY POINTER TO H,L
00E1 2B           224          DCX H          ;BACK UP
00E2 7E           225          MOV A,M
00E3 F680         226          ORI SEGDP      ;SET DECIMAL POINT
00E5 77           227          MOV M,A
00E6 23           228          INX H
00E7 1A           229          LDAX D         ;GET 1ST DIGIT FROM FRACTION TABLE
00E8 13           230          INX D
00E9 77           231          MOV M,A
00EA 23           232          INX H
00EB 1A           233          LDAX D  ;SECOND BYTE
```

```
N LOC  OBJ          SEQ      SOURCE STATEMENT

00EC 77             234          MOV M,A
00ED C9             235 DIGDON: RET
                    236 ;       BLANK THE DISPLAY...
                    237 ;       CALLED BY MATH INTERPRETER, CLEARS THE DISPLAY BUFFER TO ZERO
                    238 ;
00EE 210000  D      239 DSPBLK: LXI  H,DSPBUF
00F1 0E0C           240          MVI  C,12
00F3 3600           241 BLKLP:  MVI  M,0
00F5 23             242          INX  H
00F6 0D             243          DCR  C
00F7 C2F300  C      244          JNZ  BLKLP
00FA C9             245          RET
                    246 ;       TABLES...
                    247 ;
                    248 ;       DECIMAL FRACTION TABLE:
                    249 ;
00FB 3F             250 FRCTTB: DB   SEG0, SEG0    ;.00
00FC 3F
00FD 06             251          DB   SEG1, SEG2    ;.12
00FE 5B
00FF 5B             252          DB   SEG2, SEG5    ;.25
0100 6D
0101 4F             253          DB   SEG3, SEG7    ;.37
0102 07
0103 6D             254          DB   SEG5, SEG0    ;.50
0104 3F
0105 7D             255          DB   SEG6, SEG2    ;.62
0106 5B
0107 07             256          DB   SEG7, SEG5    ;.75
0108 6D
0109 7F             257          DB   SEG8, SEG7    ;.87
010A 07
                    258 ;
                    259 ;DECIMAL INTEGER FACTORS:
                    260 ;
010B 0000           261 FCTTBL: DW   0
010D FFFF           262          DW   -1
010F F6FF           263          DW   -10
0111 9CFF           264          DW   -100
0113 18FC           265          DW   -1000
0115 F0D8           266          DW   -10000
                    267 ;
                    268 ;SEGMENT DEFINITIONS...
                    269 ;
0117 00             270 SEGTBL: DB   0
0118 06             271          DB   SEG1
0119 5B             272          DB   SEG2
011A 4F             273          DB   SEG3
011B 66             274          DB   SEG4
011C 6D             275          DB   SEG5
011D 7D             276          DB   SEG6
011E 07             277          DB   SEG7
011F 7F             278          DB   SEG8
0120 6F             279          DB   SEG9
                    280 ;
                    281 ;FIELD DEFINITON TABLE...
                    282 ;      BYTE 0 = 1ST DIGIT NUMBER
                    283 ;      BYTE 1 = # DIGITS IN INTEGER, BIT7 = FRACTION, BIT6 = +/- FLAG
0080                284          FRACT EQU  BIT7
0040                285          PLSMNS EQU BIT6
                    286 ;
0121 00             287 FLDTBL: DB   0, 3+FRACT+PLSMNS    ;SPHERE = FIELD 0
0122 C3
0123 05             288          DB   5, 2+FRACT+PLSMNS    ;CYL = FIELD 1
0124 C2
```

```
N LOC  OBJ        SEQ        SOURCE STATEMENT 0125 09           289        DB      9, 3              ;AXIS = FIELD 2
0126 03
0127 02           290        DB      2, 3              ;1ST PRISM = FIELD 3
0128 03
0129 06           291        DB      6, 3              ;2ND PRISM = FIELD 4
012A 03
                  292 ;
                  293 ;DATA REGISTERS...
                  294 ;
                  295        DSEG
000C              296 DSPPTR: DS 2
000E              297 SEGPTR: DS 2
0010              298 FCTPTR: DS 2
0012              299 DIGFLG: DS 1
0013              300 LZFLG:  DS 1
                  301        CSEG
                  302 ;      KEYBOARD DRIVER...
                  303 ;
                  304        ASEG
0028              305        ORG 28H              ;RESTART 5
0028 C32B01   C   306        JMP KBDINT
                  307        CSEG
                  308
0040              309        KBDREG EQU 40H
                  310 ;
                  311 ;KEYBOARD INTERRUPT DRIVER...STORE KEY CODE IN VARIOUS REGISTERS...
                  312 ;
012B F5           313 KBDINT: PUSH PSW
012C C5           314        PUSH B
012D DB40         315        IN KBDREG            ;GET KEY CODE
012F 4F           316        MOV C,A              ;SAVE IT
0130 3E01         317        MVI A,BIT0
0132 321500   D   318        STA KBDFLG
0135 79           319        MOV A,C
0136 E61F         320        ANI 1FH              ;MASK CODE
0138 321400   D   321        STA KBDCOD
013B 79           322        MOV A,C
013C 07           323        RLC                  ;BIT 5 TO BIT7
013D F5           324        PUSH PSW
013E 07           325        RLC
013F E680         326        ANI BIT7
0141 321800   D   327        STA TBLRT+2          ;TABLE RIGHT FLAG
0144 F1           328        POP PSW
0145 E680         329        ANI BIT7             ;ORIGINALLY BIT6
0147 321C00   D   330        STA TBLLFT+2
014A 79           331        MOV A,C
014B E680         332        ANI BIT7             ;RADIUSCOPE SWITCH
014D 322000   D   333        STA RADFLG+2
0150 C1           334        POP B
0151 F1           335        POP PSW
0152 FB           336        EI
0153 C9           337        RET
                  338 ;
                  339 ;INPUT KEYBOARD CODE AND RETURN IN AC...
                  340 ;
0154 DB40         341 KBDCHK: IN KBDREG
0156 E61F         342        ANI 01FH
0158 C9           343        RET
                  344 ;
                  345 ;DATA REGISTERS...IN FLOATING-POINT FORMAT???
                  346 ;
                  347        DSEG
0014 00           348 KBDCOD: DB    0
0015 00           349 KBDFLG: DB    0
```

```
N LOC  OBJ        SEQ       SOURCE STATEMENT 0016 00           350 TBLRT:   DB    0, 0, 0, 1
0017 00
0018 00
0019 01
001A 00           351 TBLLFT:  DB    0, 0, 0, 1
001B 00
001C 00
001D 01
001E 00           352 RADFLG:  DB    0, 0, 0, 1
001F 00
0020 00
0021 01
                  353           CSEG
                  354 ;         LAMP DRIVER...
                  355 ;         ENTERED WITH REG B = LAMP CODE, REG C = GROUP#
                  356 ;
0040              357           LMPREG  EQU  40H
                  358
0159 212200   D   359 LMPDVR: LXI  H,XLMP      ;TEMP'S
015C 36D3         360           MVI  M,0D3H    ;OUT
015E 23           361           INX  H
015F 79           362           MOV  A,C
0160 C640         363           ADI  LMPREG
0162 77           364           MOV  M,A
0163 23           365           INX  H
0164 36C9         366           MVI  M,0C9H    ;RET
0166 78           367           MOV  A,B
0167 CD2200   D   368           CALL XLMP
016A C9           369           RET
                  370
                  371           DSEG
0022              372 XLMP:    DS  4
                  373           CSEG
                  374 ;THE END...
                  375           END
```

PUBLIC SYMBOLS

DSPBLK C 00EE    DSPCON C 0012    KBDCHK C 0154    KBDCOD D 0014    KBDFLG D 0015    LMPDVR C 0159    RADFLG D 001E
TBLLFT D 001A    TBLRT  D 0016

EXTERNAL SYMBOLS
FXPCON E 0000    REGT1  E 0000    REGT15 E 0000    REGT2  E 0000    REGT25 E 0000    REGT27 E 0000    SIGNX  E 0000
XFRACT E 0000    XINTGR E 0000

USER SYMBOLS
BIT0   A 0001    BIT1   A 0002    BIT2   A 0004    BIT3   A 0008    BIT4   A 0010    BIT5   A 0020    BIT6   A 0040
BIT7   A 0080    BLKLP  C 00F3    DIGDON C 00ED    DIGFCT C 00C2    DIGFLG D 0012    DIGL0  C 0066    DIGL1  C 0093
DIGL1B C 0094    DIGL2  C 00B2    DIGL3  C 00AF    DIGL4  C 00B1    DIGLP0 C 004E    DIGLP1 C 0069    DIGNG  C 007D
DSPBLK C 00EE    DSPBUF D 0000    DSPCON C 0012    DSPINT C 0000    DSPPTR D 000C    DSPREG A 0020    FCTPTR D 0010
FCTTBL C 0108    FLDTBL C 0121    FRACT  A 0000    FRCTTB C 00FB    FXPCON E 0000    KBDCHK C 0154    KBDCOD D 0014
KBDFLG D 0015    KBDINT C 012B    KBDREG A 0040    LMPDVR C 0159    LMPREG A 0040    LZFLG  D 0013    PLSMNS A 0040
RADFLG D 001E    REGT1  E 0000    REGT15 E 0000    REGT2  E 0000    REGT25 E 0000    REGT27 E 0000    SEG0   A 003F
SEG1   A 0006    SEG2   A 005B    SEG3   A 004F    SEG4   A 0066    SEG5   A 006D    SEG6   A 0070    SEG7   A 0007
SEG8   A 007F    SEG9   A 006F    SEGA   A 0001    SEGB   A 0002    SEGC   A 0004    SEGD   A 0008    SEGDP  A 0080
SEGE   A 0010    SEGF   A 0020    SEGG   A 0040    SEGMNS A 0040    SEGPLS A 0060    SEGPTR D 000E    SEGTBL C 0117
SIGNX  E 0000    TBLLFT D 001A    TBLRT  D 0016    XFRACT E 0000    XINTGR E 0000    XLMP   D 0022

ASSEMBLY COMPLETE, NO ERROR(S)

```
LOC  OBJ       SEQ      SOURCE STATEMENT

0 ;*********************************************************************
                1 ;
                2 ;                  LENS METER MATH PACKAGE
                3 ;
                4 ;*********************************************************************
                5 ;
                6 ;        PROGRAM NAME:   MATH.ASM
                7 ;        AUTHOR:         J. CORENMAN
                8 ;
                9 ;   EDIT HISTORY:
               10 ;        6/30/77 JEC     CLEAN-UP
               11 ;        6/29/77 JEC     DUMP 3RD SINE TABLE BYTE
               12 ;        6/24/77 JEC     ADD ARCSIN, ARCCOS, ABSX
               13 ;        6/23/77 JEC     A FEW BUGZ
               14 ;        6/21/77 JEC
               15 ;        6/19/77 JEC     ADD SINE, ETC.
               16 ;        6/20/77 JEC     MORE ADDITIONS
               17 ;        6/14/77 JEC     STARTED
               18 ;
               19 ;
               20        NAME MATH
               21 ;
               22 ;DEFINITIONS...
               23 ;
0001           24        BIT0    EQU     00000001B
0002           25        BIT1    EQU     00000010B
0004           26        BIT2    EQU     00000100B
0008           27        BIT3    EQU     00001000B
0010           28        BIT4    EQU     00010000B
0020           29        BIT5    EQU     00100000B
0040           30        BIT6    EQU     01000000B
0080           31        BIT7    EQU     10000000B
               32 ;
               33 ;EXTERNALS....
               34 ;
               35        EXTRN   TRACE, TBLLFT, TBLRT, TRAP, KBDCHK
               36 ;
               37        PUBLIC  REGX, REGY, REGZ, REGT, REG1
               38        PUBLIC  REGT1,REGT2,REGT15,REGT25,REGT27
               39        PUBLIC  RUP, RDWN, FXPCON, XFRACT, XINTGR, SIGNX, TRCPC
               40        PUBLIC  TRPFLG, OPCOD
               41        PUBLIC  INTPR
               42 ;GENERAL DATA FORMATS...
               43 ;
               44 ;        THE PACKAGE IS ORGANIZED AROUND THE ARCHITECTURE OF AN TYPICAL
               45 ;        HP CALCULATOR. NO PARTICULAR MODEL IS EMULATED, BECAUSE
               46 ;        THIS MACHINE IS SHORTER ON FUNCTIONS AND LONGER ON MEMORY THAN
               47 ;        ANY OF THE HP LINE. A FEW STRANGE FUNCTIONS ALSO EXIST, SUCH AS
               48 ;        MULTIPLE DISPLAYS, ANNUNCIATOR LIGHTS, ENTRY POINT COMMANDS, ETC.
               49 ;
               50 ;        DATA IS REPRESENTED INTERNALLY AS 24-BIT FLOATING POINT WITH A
               51 ;        8-BIT EXPONENT. THE MANTISSA IS IN SIGN-MAGNITUDE
               52 ;        FORMAT, WITH THE BINARY POINT TO THE LEFT (IE VALUES OF MANTISSA
               53 ;        ARE BETWEEN 0 AND 1.0, OR 0.5 AND 1.0 IF NORMALIZED.)
               54 ;        EXPNENTS ARE IN TWO'S COMPLIMENT FORM.
               55 ;
               56 DSEG
               57
0000           58 REGXSV: DS  4
0004           59 REGX:   DS  4
0008           60 REGY:   DS  4
000C           61 REGZ:   DS  4
```

```
LOC  OBJ       SEQ    SOURCE STATEMENT 0010            62 REGT:    DS    4
                63
0004            64 STKSIZ EQU   4
                65
0014            66 SVREG:  DS    STKSIZ*4
                67
0024            68 SIGNX:  DS    1
                69
                70 ;WORKING STORAGE REGISTERS....FIRST IS INTERNAL...
                71 ;
0014            72 REGSIZ EQU   20
                73
0025            74 REGT2:  DS    4    ;REGISTER #-2
0029            75 REGT1:  DS    4
002D            76 REG0:   DS    4
0031            77 REG1:   DS    REGSIZ*4
                78
002B       D    79 RETT15 EQU   REGT1+2
0027       D    80 REGT25 EQU   REGT2+2
0028       D    81 REGT27 EQU   REGT2+3
                82 ;
                83 ;INTERPRETER PROGRAM COUNTER AND STACK FOR SAME...
                84 ;
0081       D    85 PC:     DS    2
0083       D    86 OPCOD:  DS    1
0084       D    87         DS    16    ;8 LEVELS OF STACK
                88 PCSTK:
0094       D    89 PCSP:   DS    2
                90 ;
                91 ;INTEGER CONVERSION CELLS..
                92 ;
0096       D    93 XINTGR: DS    2
0098       D    94 XFRACT: DS    2
                95 ;
                96 ;TRACE CONTROL...
                97 ;
009A       D    98 TRCFLG: DS    1
009B       D    99 TRCPC:  DS    2
009D       D   100 TRAPPC: DS    2
0080           101 TRCBIT EQU   BIT7
               102
               103 CSEG
               104
               105 ;
               106 ;CONSTANTS...LO, MIDDLE, HI BYTES, EXPONENT!
               107 ;
0000 00        108 C0PT25: DB    0, 0, BIT7, -1
0001 00
0002 80
0003 FF
0004 00        109 C0PT5:  DB    0, 0, BIT7, 0
0005 00
0006 80
0007 00
0008 00        110 C1PT0:  DB    0, 0, BIT7, 1
0009 00
000A 80
000B 01
000C 00        111 C0PT0:  DB    0, 0, 0, 0
000D 00
000E 00
000F 00
               112 ;  MATH PACKAGE FRONT END....THE INTERPRETER
               113 ;  CALLED AS A SUBROUTINE WITH REGISTERS B,C POINTING TO A CALCULATION
               114 ;  SEQUENCE, THIS ROUTINE EXECUTES THAT SEQUENCE UNTIL A "STOP" IN EXECUTED
```

```
LOC  OBJ        SEQ      SOURCE STATEMENT

115 ;    AND THEN RETURNS. COMMANDS ARE ONE, TWO OR THREE BYTES LONG, AND
                116 ;    CAL HAVE A TRACE BIT SET.
                117 ;
0010 219400  D  118 INTPR:  LXI H,PCSTK    ;INITIALIZE THE PC STACK
0013 229400  D  119         SHLD PCSP
0016 69         120         MOV L,C        ;INITIAL PC TO H,L
0017 60         121         MOV H,B
0018 223100  D  122         SHLD PC        ;INITIALIZE THE PROGRAM COUNTER
                123 ;
                124 ;LOOP FOR NEXT COMMAND...
                125 ;
001B 2A3100  D  126 INTPLP: LHLD PC        ;GET PROGRAM COUNTER
001E 229600  D  127         SHLD TRCPC     ;TRACE PC
0021 AF         128         XRA A          ;ZERO AC
0022 47         129         MOV B,A        ;CLEAR ARGUMENT
0023 4F         130         MOV C,A
0024 57         131         MOV D,A        ;UPPER BYTE OF D,E
0025 7E         132         MOV A,M        ;GET COMMAND BYTE
0026 328300  D  133         STA OPCOD      ;SAVE IT
0029 E67F       134         ANI 07FH       ;MASK OFF TRACE BIT
002B 5F         135         MOV E,A
002C E5         136         PUSH H         ;SAVE PC
002D 216207  C  137         LXI H,OPTAB    ;OP CODE TABLE ORIGIN
0030 19         138         DAD D          ;ADD OP CODE *3
0031 19         139         DAD D
0032 19         140         DAD D
0033 5E         141         MOV E,M        ;GET DISPATCH ADDRESS
0034 23         142         INX H
0035 56         143         MOV D,M
0036 23         144         INX H
0037 7E         145         MOV A,M        ;GET COMMAND LENGTH (IN BYTES)
0038 E1         146         POP H          ;RESTORE PC INTO H,L
0039 23         147         INX H          ;INCREMENT TO NEXT COMMAND
003A 3D         148         DCR A          ;CHECK COMMAND LENGTH
003B CA4A00  C  149         JZ INTGO       ;ONE BYTE LONG...
003E 4E         150         MOV C,M        ;GET ARGUMENT BYTE
003F 23         151         INX H
0040 3D         152         DCR A          ;CHECK FOR 2 BYTES
0041 CA4A00  C  153         JZ INTGO       ;IT IS, GO...
0044 46         154         MOV B,M        ;GET OTHER HALF OF ARGUMENT
0045 23         155         INX H
0046 3D         156         DCR A          ;ONCE MORE...
0047 C45900  C  157         CNZ CRASH      ;JUST IN CASE...
004A 223100  D  158 INTGO:  SHLD PC        ;STORE INCREMENTED PC
004D 215300  C  159         LXI H,INTRT    ;RETURN ADDRESS
0050 E5         160         PUSH H         ;ONTO STACK
0051 EB         161         XCHG           ;DISPTCH ADDRESS TO H,L
0052 E9         162         PCHL           ;JUMP TO IT
0053 CD0000  E  163 INTRT:  CALL TRACE     ;PRINT TRACE
0056 C31B00  C  164         JMP INTPLP
                165 ;      CRASH ROUTINE....
                166 ;
0059 320080     167 CRASH:  STA 8000H      ;TO BOMB ICE
005C 76         168         HLT
005D C35900  C  169         JMP CRASH
                170 ;
                171 ;      STOP ROUTINE...
                172 ;
0060 E1         173 ISTOP:  POP H
0061 C9         174         RET
                175 ;      FLOATING POINT ADD ROUTINE...
                176 ;      ENTERED FROM THE INTERPRETER, EXECUTES X=Y+X...
                177 ;
0062 CD8405  C  178 FPADD:  CALL EXPEQ     ;FORCE EXPONENTS EQUAL
0065 210400  D  179         LXI H,REGX     ;POINT H,L TO X REG ON STACK
0068 110800  D  180         LXI D,REGY     ;POINT D,E TO Y
```

```
LOC  OBJ       SEQ       SOURCE STATEMENT 006B 1A        181            LDAX D          ;GET LOW BYTE OF Y
006C AE        182            XRA M           ;COMPARE BITS WITH X
006D E601      183            ANI BIT0        ;MASK SIGN BIT
006F CAA800 C  184            JZ FPADD2       ;SAME SIGN, GO ADD...
               185 ;
               186 ;SIGNS DIFFER...PUT SMALLER NUMBER IN X AND SUBTRACT...
               187 ;
0072 1A        188            LDAX D          ;GET LSB OF Y
0073 E601      189            ANI BIT0        ;MASK SIGN
0075 322400 D  190            STA SIGNX       ;STORE IT AS SIGN OF RESULT (SPECULATIVELY)
0078 1A        191            LDAX D
0079 E6FE      192            ANI NOT BIT0    ;TAKE ABSOLUTE VALUE OF X AND Y
007B 12        193            STAX D
007C 7E        194            MOV A,M
007D E6FE      195            ANI NOT BIT0
007F 77        196            MOV M,A
0080 CD3B05 C  197            CALL XYCMP      ;COMPARE MAGNITUDES
0083 F29000 C  198            JP FPADD3       ;X IS SMALLER, SUBTRACT FROM Y
0086 CD8704 C  199            CALL XYXCHG     ;SWAP X AND Y...
0089 012400 D  200            LXI B,SIGNX     ;AND CHANGE THE SIGN BIT
008C 0A        201            LDAX B
008D EE01      202            XRI BIT0
008F 02        203            STAX B
0090 210400 D  204 FPADD3:    LXI H,REGX      ;SET POINTERS
0093 110800 D  205            LXI D,REGY
0096 CDD500 C  206            CALL TPSUB      ;SUBTRACT X FROM Y, OR VICE-VERSA
0099 210400 D  207            LXI H,REGX
009C 7E        208            MOV A,M
009D E6FE      209            ANI NOT BIT0    ;MASK OFF SIGN
009F 5F        210            MOV E,A
00A0 3A2400 D  211            LDA SIGNX
00A3 B3        212            ORA E
00A4 77        213            MOV M,A
00A5 C3B700 C  214            JMP FPADD4
               215 ;
               216 ;SAME SIGN...EXECUTE THE ADD...
               217 ;
00A8 CD5004 C  218 FPADD2:    CALL EXPUPX     ;BUMP X'S EXPONENT UP (RIGHT SHIFT THE MANTISSA)
00AB CD5604 C  219            CALL EXPUPY     ;SAME FOR Y (TO AVOID OVERFLOW)
00AE 210400 D  220            LXI H,REGX      ;POINT H,L AT X
00B1 110800 D  221            LXI D,REGY      ;AND D,E AT Y
00B4 CDC500 C  222            CALL TPADD      ;DO TRIPLE ADD
00B7 CDDC04 C  223 FPADD4:    CALL POPY       ;GET RID OF Y
00BA CD9204 C  224            CALL NORMX      ;NORMALIZE
00BD C9        225            RET
               226 ;    FLOATING-POINT SUBTRACT ROUTINE...
               227 ;    CALLED BY INTERPRETER, EXECUTES X=Y-X
               228 ;    METHOD: CALL THE CHANGE-SIGN ROUTINE TO MAKE X NEGATIVE, THEN
               229 ;            CALL THE ADD ROUTINE.
               230 ;
00BE CD2B05 C  231 FPSUB:     CALL XCHGSN     ;CHANGE THE SIGN OF X
00C1 CD6200 C  232            CALL FPADD      ;ADD -X TO Y
00C4 C9        233            RET
               234 ;    TRIPLE-PRECISION ADD ELEMENT...
               235 ;    CALLED INTERNALLY, ADD (H,L) TO (D,E) WITH
               236 ;            RESULT IN (H,L). SIGN BIT IS SET TO SIGN OF X
               237 ;
00C5 1A        238 TPADD:     LDAX D          ;GET LOW BYTE OF Y
00C6 E6FE      239            ANI 0FEH        ;MASK OFF SIGN
00C8 86        240            ADD M           ;ADD TO LOW BYTE OF X
00C9 77        241            MOV M,A         ;STORE (INCLUDING X'S SIGN BIT)
00CA 23        242            INX H           ;BUMP POINTERS TO MIDDLE BYTE
00CB 13        243            INX D
00CC 1A        244            LDAX D
00CD 8E        245            ADC M           ;ADD MIDDLE BYTES, WITH CARRY
00CE 77        246            MOV M,A
```

| LOC OBJ | SEQ | SOURCE STATEMENT | |
|---|---|---|---|
| 00CF 23 | 247 | INX H | ;MOVE POINTERS TO HI BYTE |
| 00D0 13 | 248 | INX D | |
| 00D1 1A | 249 | LDAX D | |
| 00D2 8E | 250 | ADC M | ;ADD HI BYTES |
| 00D3 77 | 251 | MOV M,A | ;STORE |
| 00D4 C9 | 252 | RET | ;RETURN, CARRY SET IF OVERFLOW OCCURRED. |
| | 253 ; | TRIPLE-PRECISION SUBTRACT ELEMENT... | |
| | 254 ; | CALLED INTERNALLY, PERFORMS (H,L) = (D,E) - (H,L) | |
| | 255 ; | ASSUMES (D,E) > (H,L) ... CARRY SETS IF NOT SO. | |
| | 256 ; | SIGN OF DIFFERENCE = SIGN OF (D,E) | |
| | 257 ; | | |
| 00D5 1A | 258 TPSUB: | LDAX D | ;GET LOW BYTE OF Y |
| 00D6 F601 | 259 | ORI 1 | ;SET SIGN (TO STOP BORROW) |
| 00D8 96 | 260 | SUB M | ;SUBTRACT LOW BYTE OF X |
| 00D9 E6FE | 261 | ANI 0FEH | ;MASK OFF SIGN BIT |
| 00DB 77 | 262 | MOV M,A | ;SAVE DIFF |
| 00DC 1A | 263 | LDAX D | ;GET SIGN BIT OF Y |
| 00DD E601 | 264 | ANI BIT0 | |
| 00DF B6 | 265 | ORA M | ;ADD TO DIFFERENCE |
| 00E0 77 | 266 | MOV M,A | ;STORE IN X |
| 00E1 23 | 267 | INX H | ;MOVE POINTERS TO MIDDLE BYTE |
| 00E2 13 | 268 | INX D | |
| 00E3 1A | 269 | LDAX D | |
| 00E4 9E | 270 | SBB M | ;SUBTRACT MIDDLE BYTES |
| 00E5 77 | 271 | MOV M,A | |
| 00E6 23 | 272 | INX H | ;MOVE TO HI BYTE |
| 00E7 13 | 273 | INX D | |
| 00E8 1A | 274 | LDAX D | |
| 00E9 9E | 275 | SBB M | ;SUBTRACT HI BYTES |
| 00EA 77 | 276 | MOV M,A | |
| 00EB C9 | 277 | RET | ;RETURN, CARRY SET IF BORROW OUT OCCURED... |
| | 278 ;FLOATING POINT MULTIPLY ROUTINE.... | | |
| | 279 ; | CALLED BY INTERPRETER, EXECUTES X=Y*X | |
| | 280 ; | | |
| | 281 ; | GENERAL ALGORITHM: | |
| | 282 ; | MULTIPLICAND IS SHIFTED RIGHT (IN Y) ONE BIT AT A TIME, WHILE | |
| | 283 ; | MULTIPLIER IS SHIFTED LEFT AND TESTED; MULT'ND IS | |
| | 284 ; | CONDITIONALLY ADDED TO PARTIAL PRODUCT IF NEXT MULT'ER BIT IS A 1. | |
| | 285 ; | A COUNTER (REG E) COUNTS THE ONE'S THAT FALL OFF THE RIGHT END | |
| | 286 ; | OF THE MULTIPLICAND FOR ROUNDING PURPOSES. (BECAUSE ONLY 24 BITS | |
| | 287 ; | ARE RETAINED DURING SHIFTING). | |
| | 288 ; | REGISTERS B,C,D CONTAIN THE PARTIAL PRODUCT THROUGHOUT. | |
| | 289 ; | | |
| 00EC 010000 | 290 FPMPY: | LXI B,0 | ;CLEAR PARTIAL PRODUCT AND ROUND-OFF COUNTER |
| 00EF 110000 | 291 | LXI D,0 | |
| | 292 ; | | |
| | 293 ;COMPUTE SIGN OF RESULT AND SAVE... | | |
| | 294 ; | | |
| 00F2 210400 D | 295 | LXI H,REGX | |
| 00F5 7E | 296 | MOV A,M | ;GET L.S. BYTE OF X |
| 00F6 210900 D | 297 | LXI H,REGY | |
| 00F9 AE | 298 | XRA M | ;COMPARE WITH SIGN OF Y |
| 00FA E601 | 299 | ANI BIT0 | ;MASK SIGN BIT |
| 00FC 322400 D | 300 | STA SIGNX | ;STORE AS SIGN OF X, THE PRODUCT. |
| | 301 ; | | |
| | 302 ;SHIFT MULTIPLICAND RIGHT ONE BIT.. | | |
| | 303 ; | | |
| 00FF AF | 304 FPMLP: | XRA A | ;CLEAR CARRY |
| 0100 210A00 D | 305 | LXI H,REGY+2 | ;HI BYTE POINTER |
| 0103 CD5F01 C | 306 | CALL RS24 | ;24-BIT RIGHT SHIFT OF (H,L) |
| 0106 F5 | 307 | PUSH PSW | ;SAVE BIT THAT JUST FELL OFF |
| | 308 ; | | |
| | 309 ;STEP 2: SHIFT MULTIPLIER LEFT AND CHECK NEXT BIT... | | |
| | 310 ; | | |
| 0107 AF | 311 | XRA A | ;CLEAR CARRY BIT |

| LOC  | OBJ    |   | SEQ  | SOURCE STATEMENT | |
|------|--------|---|------|---|---|
| 0108 | 210400 | D | 312  | LXI H,REGX | ;POINT AT LSB OF X |
| 010B | CD6B01 | C | 313  | CALL LS24 | ;LEFT SHIFT (H,L) ONE BIT |
|      |        |   | 314 ; | | |
|      |        |   | 315 ;ADD MULTIPLICAND TO PRODUCT IF CARRY BIT (IE BIT THAT FELL OUT OF M'ER) | | |
|      |        |   | 316 ; IS SET...ROUND UP ON ALTERNATE ONE'S OUT OF M'ND | | |
|      |        |   | 317 ; | | |
| 010E | D23401 | C | 318  | JNC FPMPY2 | ;NO CARRY NO ADD |
| 0111 | 210800 | D | 319  | LXI H,REGY | ;POINT AT LSB OF M'ND |
| 0114 | 7A     |   | 320  | MOV A,D | ;GET LOW BYTE OF PARTIAL PRODUCT |
| 0115 | 86     |   | 321  | ADD M | ;PLUS M'ND |
| 0116 | 57     |   | 322  | MOV D,A | ;BACK TO PROD |
| 0117 | 23     |   | 323  | INX H | |
| 0118 | 79     |   | 324  | MOV A,C | ;SAME FOR MIDDLE BYTE |
| 0119 | 8E     |   | 325  | ADC M | |
| 011A | 4F     |   | 326  | MOV C,A | |
| 011B | 23     |   | 327  | INX H | |
| 011C | 78     |   | 328  | MOV A,B | ;AND HI BYTE |
| 011D | 8E     |   | 329  | ADC M | |
| 011E | 47     |   | 330  | MOV B,A | |
| 011F | DC5900 | C | 331  | CC CRASH | ;BOO BOO |
|      |        |   | 332 ; | | |
|      |        |   | 333 ;ROUND-UP CODE....NOT FULLY UNDERSTOOD, HOPE IT WORKS... | | |
|      |        |   | 334 ; | | |
| 0122 | F1     |   | 335  | POP PSW | ;GET BIT THAT FELL OFF M'ND |
| 0123 | D23501 | C | 336  | JNC FPMPY3 | ;NOT A ONE |
| 0126 | 1C     |   | 337  | INR E | ;BUMP COUNT |
| 0127 | 7B     |   | 338  | MOV A,E | |
| 0128 | 0F     |   | 339  | RRC | ;LSB OF COUNT TO CARRY FOR TESTING |
| 0129 | D23501 | C | 340  | JNC FPMPY3 | ;EVEN, NO INCREMENT |
| 012C | 14     |   | 341  | INR D | ;INCREMENT LO BYTE OF PRODUCT |
| 012D | D23501 | C | 342  | JNC FPMPY3 | |
| 0130 | 03     |   | 343  | INX B | ;PROPOGATE THE CARRY OUT |
| 0131 | C33501 | C | 344  | JMP FPMPY3 | |
|      |        |   | 345 ; | | |
|      |        |   | 346 ;NO ADD OCCURRED... | | |
|      |        |   | 347 ; | | |
| 0134 | F1     |   | 348  | FPMPY2: POP PSW | ;CLEAN UP STACK |
|      |        |   | 349 ; | | |
|      |        |   | 350 ;CHECK FOR A ZERO MULTIPLIER...ALSO A ZERO MULTIPLICAND?? | | |
|      |        |   | 351 ; | | |
| 0135 | CD9D05 | C | 352  | FPMPY3: CALL TESTX | ;CHECK MULTIPLIER |
| 0138 | CA4101 | C | 353  | JZ FPMPY4 | ;DONE IF ZERO |
| 013B | CDA305 | C | 354  | CALL TESTY | ;SAME FOR MULT'ND |
| 013E | C2FF00 | C | 355  | JNZ FPMLP | ;NEITHER IS ZERO, CONTINUE... |
|      |        |   | 356 ; | | |
|      |        |   | 357 ;ALL DONE...STORE PRODUCT IN X, GET RID OF Y, SET EXPONENT (TO SUM) | | |
|      |        |   | 358 ;AND SET THE SIGN BIT IN X. | | |
|      |        |   | 359 ; | | |
| 0141 | 210400 | D | 360  | FPMPY4: LXI H,REGX | ;LSB OF X |
| 0144 | 7A     |   | 361  | MOV A,D | ;GET LSB OF PRODUCT |
| 0145 | E6FE   |   | 362  | ANI 0FEH | ;ZERO THE SIGN BIT |
| 0147 | 57     |   | 363  | MOV D,A | ;STORE IT FOR A MOMENT |
| 0148 | 3A2400 | D | 364  | LDA SIGNX | ;GET COMPUTED SIGN BIT |
| 014B | B2     |   | 365  | ORA D | ;ADD TO PRODUCT |
| 014C | 77     |   | 366  | MOV M,A | ;STORE IN X |
| 014D | 23     |   | 367  | INX H | |
| 014E | 71     |   | 368  | MOV M,C | |
| 014F | 23     |   | 369  | INX H | |
| 0150 | 70     |   | 370  | MOV M,B | |
| 0151 | 23     |   | 371  | INX H | ;MOVE POINTER TO EXPONENT |
| 0152 | 110B00 | D | 372  | LXI D,REGY+3 | ;POINT TO Y'S EXPONENT |
| 0155 | 1A     |   | 373  | LDAX D | ;GET IT |
| 0156 | 86     |   | 374  | ADD M | ;PLUS X'S EXPONENT |
| 0157 | 77     |   | 375  | MOV M,A | ;BACK TO X |
| 0158 | CDDC04 | C | 376  | CALL POPY | ;GOODBYE, Y |
| 015B | CD9204 | C | 377  | CALL NORMX | ;MAKE X "NORMAL" |
| 015E | C9     |   | 378  | RET | ;GET OUT OF HERE... TOO MANY NORMAL PEOPLE... |

```
LOC  OBJ         SEQ       SOURCE STATEMENT

379 ;     SUPPORTING CAST FOR THE MULTIPLY ROUTINE...
                 380 ;
                 381 ;RIGHT SHIFT...CALLED WITH H,L POINTING TO MOST SIGNIFICANT BYTE...
                 382 ;
015F 7E          383 RS24: MOV A,M
0160 1F          384       RAR
0161 77          385       MOV M,A
0162 2B          386       DCX H
0163 7E          387       MOV A,M
0164 1F          388       RAR
0165 77          389       MOV M,A
0166 2B          390       DCX H
0167 7E          391       MOV A,M
0168 1F          392       RAR          ;WHAT A DRAG...
0169 77          393       MOV M,A
016A C9          394       RET
                 395
                 396 ;LEFT SHIFT...CALLED WITH H,L POINTING TO LEAST SIG BYTE...
                 397 ;
016B 7E          398 LS24: MOV A,M       ;SAME, EXCEPT LEFT...
016C 17          399       RAL
016D 77          400       MOV M,A
016E 23          401       INX H
016F 7E          402       MOV A,M
0170 17          403       RAL
0171 77          404       MOV M,A
0172 23          405       INX H
0173 7E          406       MOV A,M       ;THIS IS NO BETTER...
0174 17          407       RAL
0175 77          408       MOV M,A
0176 C9          409       RET
                 410 ;    FLOATING-POINT DIVIDE ROUTINE...
                 411 ;    CALLED BY THE INTERPRETER, EXECUTES X = Y / X..
                 412 ;
                 413 ;    GENERAL METHOD:  (ANOTHER FAMOUS WAR HERO)
                 414 ;    TRY SUBTRACTING DIVISOR FROM DIVIDEND, KEEPING
                 415 ;        RESULT (AND PUTTING A "1" IN QUOTIENT) IF PLUS.
                 416 ;        THEN SHIFT DIVISOR RIGHT AND KEEP GOING UNTIL DIVISOR IS ALL GONE.
                 417 ;
                 418 ;REG B,C,D = PARTIAL QUOTIENT, SHIFTED IN FROM RIGHT.
                 419 ;
0177 010000      420 FPDIV: LXI B,0       ;CLEAR QUOTIENT
017A 111800      421       LXI D,24      ;SET REG E TO COUNT
                 422 ;
                 423 ;COMPUTE THE SIGN OF THE RESULT...
                 424 ;
017D 210400   D  425       LXI H,REGX
0180 7E          426       MOV A,M       ;GET LSB
0181 210800   D  427       LXI H,REGY
0184 AE          428       XRA M         ;MULTIPLY SIGN BITS
0185 E601        429       ANI BIT0      ;MASK IT
0187 322400   D  430       STA SIGNX     ;STORE
                 431 ;
                 432 ;SUBTRACT DIVISOR FROM REMAINING DIVIDEND AND CHECK SIGN OF RESULT...
                 433 ;BUT FIRST, CHECK DIVISOR FOR ZERO...
                 434 ;
018A CD9D05   C  435 FPDLP: CALL TESTX    ;ZERO TEST
018D CACD01   C  436       JZ FPDZRO     ;IS ZERO...
0190 210800   D  437       LXI H,REGY    ;POINT TO DIV'ND
0193 C5          438       PUSH B        ;SAVE QUOTIENT
0194 D5          439       PUSH D
0195 56          440       MOV D,M       ;MOVE DIV'ND TO B,C,D
0196 23          441       INX H
0197 4E          442       MOV C,M
0198 23          443       INX H
0199 46          444       MOV B,M
```

```
LOC  OBJ        SEQ    SOURCE STATEMENT 019A 210400  D  445           LXI  H,REGX      ;POINT TO D'ER
019D 7A         446           MOV  A,D         ;GET DIV'ND
019E 96         447           SUB  M           ;MINUS DIV'ER
019F 57         448           MOV  D,A         ;RESULT BACK TO B,C,D
01A0 79         449           MOV  A,C         ;FOR ALL 3 BYTES
01A1 23         450           INX  H
01A2 9E         451           SBB  M
01A3 4F         452           MOV  C,A
01A4 78         453           MOV  A,B
01A5 23         454           INX  H
01A6 9E         455           SBB  M
01A7 47         456           MOV  B,A
                457 ;
                458 ;STORE DIFFERENCE AS NEW DIVIDEND IF RESULT IS POSITITVE...
                459 ;
01A8 DAB701  C  460           JC   FPD2        ;NEGATIVE....
01AB 210800  D  461           LXI  H,REGY
01AE 72         462           MOV  M,D         ;STORE DIVIDEND
01AF 23         463           INX  H
01B0 71         464           MOV  M,C
01B1 23         465           INX  H
01B2 70         466           MOV  M,B
01B3 37         467           STC              ;A "1" FOR THE QUOTIENT
01B4 C3B801  C  468           JMP  FPD3
                469 ;
                470 ;DIFF WAS MINUS..
                471 ;
01B7 AF         472 FPD2:     XRA  A           ;A ZERO FOR THE QUO...
01B8 D1         473 FPD3:     POP  D           ;GET QUO BACK
01B9 C1         474           POP  B
01BA CDFA01  C  475           CALL LSBCD       ;SHIFT B,C,D LEFT...SHIFTING IN NEW BIT
01BD 1D         476           DCR  E           ;DECREMENT BIT COUNTER
01BE CAD901  C  477           JZ   FPDRET      ;DONE....24 SHIFTS
                478 ;
                479 ;SHIFT DIVISOR RIGHT AND DO IT ALL AGAIN...
                480 ;
01C1 210600  D  481           LXI  H,REGX+2
01C4 CD5F01  C  482           CALL RS24
                483 ;
                484 ;CHECK DIVIDEND FOR ZERO AND LOOP..
                485 ;
01C7 CDA305  C  486           CALL TESTY
01CA C2A801  C  487           JNZ  FPDLP       ;DO IT AGAIN, NON-ZERO
                488 ;
                489 ;FINISH SHIFTING QUO....
                490 ;
01CD 7B         491 FPDZRO:   MOV  A,E         ;CHECK COUNT
01CE B7         492           ORA  A
01CF CAD901  C  493           JZ   FPDRET      ;DONE IF ZERO
01D2 CDFA01  C  494           CALL LSBCD       ;LEFT SHIFT QUOTIENT
01D5 1D         495           DCR  E
01D6 C3CD01  C  496           JMP  FPDZRO
                497 ;
                498 ;DONE....STORE QUOTIENT, SET SIGN AND EXPONENT...
                499 ;
01D9 210400  D  500 FPDRET:   LXI  H,REGX
01DC 7A         501           MOV  A,D         ;GET QUOTIENT
01DD E6FE       502           ANI  0FEH
01DF 57         503           MOV  D,A
01E0 3A2400  D  504           LDA  SIGNX       ;GET COMPUTED SIGN BIT
01E3 B2         505           ORA  D           ;ADD QUOTIENT
01E4 77         506           MOV  M,A
01E5 23         507           INX  H
01E6 71         508           MOV  M,C
01E7 23         509           INX  H
01E8 70         510           MOV  M,B
                511
```

```
LOC  OBJ         SEQ        SOURCE STATEMENT

01E9 110B00   D  512        LXI  D,REGY+3     ;POINT TO EXPONENTS
01EC 210700   D  513        LXI  H,REGX+3
01EF 1A          514        LDAX D
01F0 96          515        SUB  M
01F1 3C          516        INR  A            ;MULTIPLY QUO BY TWO (DON'T ASK WHY...)
01F2 77          517        MOV  M,A          ;STORE DIFFERENCE
01F3 CDDC04   C  518        CALL POPY         ;GET RID OF Y
01F6 CD9204   C  519        CALL NORMX        ;NORMALIZE THE RESULT
01F9 C9          520        RET
                 521 ;
                 522 ;LEFT SHIFT REGISTERS B,C,D...
                 523 ;
01FA 7A          524 LSBCD: MOV  A,D
01FB 17          525        RAL
01FC 57          526        MOV  D,A
01FD 79          527        MOV  A,C
01FE 17          528        RAL
01FF 4F          529        MOV  C,A
0200 78          530        MOV  A,B
0201 17          531        RAL
0202 47          532        MOV  B,A
0203 C9          533        RET
                 534 ;      SINE ROUTINE...CALLED BY INTERPRETER, PERFORMS X = SIN(X)
                 535 ;      BY TABLE LOOK-UP AND INTERPOLATION.
                 536 ;
                 537 ;      STEP 1: ADD OR SUBTRACT FULL REVOLUTIONS (1.0) TO GET THE NUMBER
                 538 ;      BETWEEN 0 AND +1.0
                 539 ;
0204 CD1406   C  540 SINX:  CALL STKSAV       ;SAVE THE REST OF THE REGISTER STACK
0207 CD9D05   C  541 SINX0: CALL TESTX        ;CHECK X FOR NEGATIVE
020A F21902   C  542        JP   SINX1        ;POSITIVE, OK
020D 010800      543        LXI  B,C1PT0      ;ARG1 = POINTER TO CONSTANT 1.0
0210 CDB705   C  544        CALL XLOAD        ;LOAD INTO X
0213 CD6200   C  545        CALL FPADD        ;ADD TO X
0216 C30702   C  546        JMP  SINX0        ;REPEAT UNTIL POSITIVE
                 547 ;
0219 010800   C  548 SINX1: LXI  B,C1PT0
021C CDB705   C  549        CALL XLOAD        ;LOAD 1.0 INTO X REG
021F CD3B05   C  550        CALL XYCMP        ;COMPARE X-1.0
0222 FA2B02   C  551        JM   SINX2        ;X IS LESS THAN 1.0, OK
0225 CD8E00   C  552        CALL FPSUB        ;SUBTRACT (X-1.0)
0228 C31902   C  553        JMP  SINX1        ;UNTIL IT DOESN'T OVERFLOW
022B CDCB04   C  554 SINX2: CALL POPX         ;GET RID OF THE 1.0
                 555 ;
                 556 ;NOW REDUCE X TO THE FIRST QUADRANT...
                 557 ;      IF 0 <= X <= 0.25, THEN DO NOTHING.
                 558 ;      IF 0.5 < X < 1.0 THEN X = 1.0 - X, SINE IS NEGATIVE.
                 559 ;      THEN IF 0.25 < X < 0.5 THEN X = 0.5 - X
                 560 ;
022E AF          561        XRA  A            ;CLEAR SIGN BIT
022F F5          562        PUSH PSW          ;KEEP SIGN ON TOP OF STACK
0230 010400   C  563        LXI  B,C0PT5
0233 CDB705   C  564        CALL XLOAD        ;PUSH 0.5 ONTO STACK
0236 CD3B05   C  565        CALL XYCMP        ;COMPARE X - 0.5
0239 FA5202   C  566        JM   SINX3        ;LESS THAN 0.5, SIGN OF SINE IS PLUS.
023C CDCB04   C  567        CALL POPX         ;GET RID OF 0.5
                 568 ;
                 569 ;      3RD OR 4TH QUADRANT...CHANGE SIGN AND SET X = 1.0-X
                 570 ;
023F F1          571        POP  PSW
0240 3E01         572        MVI  A,1
0242 F5          573        PUSH PSW
0243 CD2B05   C  574        CALL XCHGSN       ;MAKE X MINUS
0246 010800   C  575        LXI  B,C1PT0
0249 CDB705   C  576        CALL XLOAD        ;LOAD 1.0
024C CD6200   C  577        CALL FPADD        ;SET X = 1.0-X
024F C35502   C  578        JMP  SINX3A
```

| LOC | OBJ | SEQ | SOURCE STATEMENT | |
|---|---|---|---|---|
| 0252 | CDCB04 | C | 579 SINX3: | CALL POPX |
| | | | 580 ; | |
| | | | 581 ; CHECK FOR 1ST OR 2ND QUADRANT... | |
| | | | 582 ; | |
| 0255 | 010000 | C | 583 SINX3A: | LXI B,C0PT25 |
| 0258 | CDB705 | C | 584 | CALL XLOAD ;LOAD 0.25 |
| 025B | CD3B05 | C | 585 | CALL XYCMP ;COMPARE X-0.25 |
| 025E | FA7302 | C | 586 | JM SINX4 ;IS OK...LESS THAN 0.25 |
| 0261 | CDCB04 | C | 587 | CALL POPX |
| 0264 | CD2B05 | C | 588 | CALL XCHGSN ;MAKE X MINUS |
| 0267 | 010400 | C | 589 | LXI B,C0PT5 |
| 026A | CDB705 | C | 590 | CALL XLOAD ;LOAD 0.5 |
| 026D | CD6200 | C | 591 | CALL FPADD ;SET X = 0.5-X |
| 0270 | C37602 | C | 592 | JMP SINX4A |
| 0273 | CDCB04 | C | 593 SINX4: | CALL POPX |
| | | | 594 ; | |
| | | | 595 ;NOW EXTRACT 7 MOST SIGNIFICANT BITS FROM X...FOR A TABLE INDEX | |
| | | | 596 ; | |
| 0276 | CDA104 | C | 597 SINX4A: | CALL ZEXPX ;SET EXPONENT TO ZERO |
| 0279 | DC5900 | C | 598 | CC CRASH ;NO CARRY OUT EXPECTED IF X < 1 |
| 027C | 210600 | D | 599 | LXI H,REGX+2 |
| 027F | 7E | | 600 | MOV A,M ;GET MOST SIG BYTE |
| 0280 | 07 | | 601 | RLC ;MOVE TO BITS 1-6 |
| 0281 | 4F | | 602 | MOV C,A |
| 0282 | 2B | | 603 | DCX H |
| 0283 | 7E | | 604 | MOV A,M ;GET MIDDLE BYTE |
| 0284 | 07 | | 605 | RLC |
| 0285 | E601 | | 606 | ANI BIT0 ;MASK BIT0 |
| 0287 | B1 | | 607 | ORA C ;ADD TO OTHER 6 BITS |
| 0288 | 4F | | 608 | MOV C,A |
| 0289 | 0600 | | 609 | MVI B,0 ;CLEAR B FOR A DAD... |
| 028B | C5 | | 610 | PUSH B |
| | | | 611 ; | |
| | | | 612 ;GET THE REMAINING BITS AS THE INCREMENT FOR INTERPOLATION... | |
| | | | 613 ; | |
| 028C | 210500 | D | 614 | LXI H,REGX+1 |
| 028F | 7E | | 615 | MOV A,M ;GET MIDDLE BYTE OF X |
| 0290 | 07 | | 616 | RLC |
| 0291 | E6FE | | 617 | ANI 0FEH ;MASK OFF TOP BIT (USED AS TABLE INDEX) |
| 0293 | 57 | | 618 | MOV D,A ;STORE AS HI BYTE OF INCREMENT (SHORT A BIT, YET) |
| 0294 | 2B | | 619 | DCX H |
| 0295 | 7E | | 620 | MOV A,M ;GET LOW BYTE |
| 0296 | 17 | | 621 | RAL ;SHIFT HI BIT TO CARRY |
| 0297 | E6FE | | 622 | ANI 0FEH ;MASK OFF WHATEVER CAME IN FROM CARRY |
| 0299 | 5F | | 623 | MOV E,A ;STORE AS LOW BYTE OF INCREMENT |
| 029A | 3E00 | | 624 | MVI A,0 |
| 029C | 17 | | 625 | RAL ;EXTRA BIT TO BIT 0 |
| 029D | B2 | | 626 | ORA D ;ADD TO HI BYTE |
| 029E | 57 | | 627 | MOV D,A |
| | | | 628 ; | |
| | | | 629 ;NOW STORE INCREMENT IN X REG... | |
| | | | 630 ; | |
| 029F | 210400 | D | 631 | LXI H,REGX |
| 02A2 | 3600 | | 632 | MVI M,0 ;LOW BYTE IS ZERO |
| 02A4 | 23 | | 633 | INX H |
| 02A5 | 73 | | 634 | MOV M,E ;MIDLLE BYTE |
| 02A6 | 23 | | 635 | INX H |
| 02A7 | 72 | | 636 | MOV M,D ;HI BYTE |
| 02A8 | 23 | | 637 | INX H |
| 02A9 | 3600 | | 638 | MVI M,0 ;ZERO EXPONENT |
| 02AB | CD9204 | C | 639 | CALL NORMX |
| | | | 640 ; | |
| | | | 641 ;NEXT, GENERATE TABLE POINTER FROM INDEX IN B,C | |
| 02AE | 21DD07 | C | 642 | LXI H,SINTAB ;TABLE ORIGIN |
| 02B1 | C1 | | 643 | POP B |
| 02B2 | 09 | | 644 | DAD B ;PLUS INDEX * 2 |

```
LOC  OBJ          SEQ         SOURCE STATEMENT

02B3 09           645         DAD B
                  646 ;
                  647 ;LOAD THE TABLE VALUE INTO X, NEXT VALUE INTO Y, PUSHING INCREMENT TO Z
                  648 ;
02B4 44           649         MOV B,H
02B5 4D           650         MOV C,L            ;GET POINTER INTO TABLE
02B6 CDCA05  C    651         CALL XLDZXP        ;PUSH ONTO STACK, ZERO EXPONENT
02B9 CDCA05  C    652         CALL XLDZXP        ;PUSH NEXT VALUE ALSO
02BC CDB704  C    653         CALL XYXCHG        ;CORRECT ORDER
                  654 ;
                  655 ;NOW INTERPOLATE...X = VALUE FROM TABLE, Y = NEXT VALUE, Z = INCREMENT
                  656 ;
02BF 010000       657         LXI B,0
02C2 CDE505  C    658         CALL XSTO          ;STORE X IN REG 0 (INTERNAL)
02C5 CDEE00  C    659         CALL FPSUB         ;X = Y - X
02C8 CDEC00  C    660         CALL FPMPY         ;MULTIPLY BY INCREMENT (A FRACTION BETWEEN 0 AND 1.0)
02CB 010000       661         LXI B,0
02CE CDFA05  C    662         CALL XRCL          ;GET ORIGINAL X BACK
02D1 CD6200  C    663         CALL FPADD         ;ADD TO COMPUTED INCREMENT
                  664 ;
                  665 ;NOW ADD SIGN BIT TO RESULT... WE'RE ALMOST DONE??
                  666 ;
02D4 210400  D    667         LXI H,REGX
02D7 F1           668         POP PSW
02D8 B6           669         ORA M              ;ADD SIGN BIT TO LOW-ORDER BYTE
02D9 77           670         MOV M,A
02DA CD9204  C    671         CALL NORMX         ;NORMALIZE...
02DD CD2506  C    672         CALL STKUSV        ;RESTORE STACK
02E0 C9           673         RET
                  674 ;      COSINE ROUTINE... CALLED BY INTERPRETER, PERFOMS
                  675 ;      X = COS (X) == SIN (90-X)
                  676 ;
02E1 CD1406  C    677 COSX:  CALL STKSAV        ;SAVE THE REGISTER STACK
02E4 010000  C    678         LXI B,C0PT25       ;0.25 = 90 DEGREES
02E7 CDB705  C    679         CALL XLOAD
02EA CDB704  C    680         CALL XYXCHG        ;SWAP X AND Y
02ED CDEE00  C    681         CALL FPSUB         ;EXECUTE X = X-0.25
02F0 CD2506  C    682         CALL STKUSV        ;RESTORE STACK
02F3 CD0402  C    683         CALL SINX          ;GET THE SINE
02F6 C9           684         RET                ;DONE
                  685 ;      ARC SINE ROUTINE...RETURNS -.25 < X < 0.25 (90 DEGREES)
                  686 ;      CALLED BY INTERPRETER, USES SINE TABLE BACKWARDS, WITH A
                  687 ;      BINARY SEARCH AND INTERPOLATION
                  688 ;
02F7 CD1406  C    689 ARCSIN: CALL STKSAV       ;SAVE THE STACK
                  690 ;
                  691 ;FIRST, SET THE SIGN BIT OF THE RESULT AND CHECK THAT -1.0 < X < 1.0
                  692 ;
02FA 210400  D    693         LXI H,REGX         ;POINT TO ARGUMENT
02FD 7E           694         MOV A,M            ;GET SIGN
02FE E601         695         ANI BIT0
0300 F5           696         PUSH PSW           ;STORE SIGN BIT ( = SIGN OF RESULT)
0301 7E           697         MOV A,M            ;TAKE ABSOLUTE VALUE
0302 E6FE         698         ANI NOT BIT0
0304 77           699         MOV M,A
0305 010800  C    700         LXI B,C1PT0
0308 CDB705  C    701         CALL XLOAD         ;LOAD 1.0
030B CD3B05  C    702         CALL XYCMP         ;CHECK 1.0 - X
030E CA1403  C    703         JZ ARCS1           ;X IS 1.0 EXACTLY???
0311 F45900  C    704         CP CRASH           ;CRASH IF GREATER THAN 1.0
                  705 ;
                  706 ;NOW FIND X IN THE SINE TABLE...
                  707 ;REGT1 AND REGT2 ARE USED FOR THE BRACKETING VALUES OF ANGLE FROM THE
                  708 ;TABLE (REGT1 = LOW VALUE, REGT2 = HIGH). REG0 CONTAINS THE ANGLE THAT
                  709 ;GENREATED THE LOW VALUE.
                  710 ;
```

```
LOC  OBJ           SEQ       SOURCE STATEMENT

8314 CDCB04   C    711 ARCS1: CALL POPX
8317 010C00   C    712        LXI B,C0PT0
831A CDB705   C    713        CALL XLOAD      ;LOAD A ZERO
831D 010000        714        LXI B,0         ;STORE INTO REG0
8320 CDE505   C    715        CALL XSTO
8323 CDCB04   C    716        CALL POPX
8326 114040        717        LXI D,4040H     ;INCREMENT AND INDEX = 64
                   718 ;
                   719 ;COMPUTE TABLE POINTER...FIRST CHECK INCREMENT FOR ZERO
                   720 ;
8329 7B            721 ARCLP: MOV A,E         ;GET INCREMENT
832A B7            722        ORA A
832B CA7803   C    723        JZ ARCBKT       ;BRACKETED
832E 21DD07   C    724        LXI H,SINTAB    ;TABLE
8331 4A            725        MOV C,D ;MOVE INDEX TO B,C
8332 0600          726        MVI B,0
8334 09            727        DAD B           ;ADD INDEX*3 TO TABLE BASE
8335 09            728        DAD B
8336 44            729        MOV B,H ;BACK TO B,C
8337 4D            730        MOV C,L
8338 D5            731        PUSH D          ;SAVE INDEX
8339 CDCA05   C    732        CALL XLDZXP     ;LOAD TABLE SINE VALUE
833C CD3B05   C    733        CALL XYCMP      ;COMPARE WITH OUR SINE
833F D1            734        POP D
8340 CA4603   C    735        JZ ARCLO        ;RIGHT ON - CALL IT LOW
8343 FA6103   C    736        JM ARCHI        ;TABLE VALUE IS HIGH...
                   737 ;
                   738 ;TABLE VALUE IS LOW...STORE IN REGT1, SET REG0 AND MOVE INDEX UP BY
                   739 ;THE INCREMENT.
                   740 ;
8346 D5            741 ARCLO: PUSH D
8347 01FFFF        742        LXI B,-1
834A CDE505   C    743        CALL XSTO       ;STORE TABLE VALUE IN REGT1
834D D1            744        POP D
834E 212D00   D    745        LXI H,REG0      ;POINT TO REG0
8351 3600          746        MVI M,0         ;LOW BYTE = 0
8353 23            747        INX H
8354 3600          748        MVI M,0         ;MIDDLE BYTE = 0
8356 23            749        INX H
8357 72            750        MOV M,D         ;STORE INDEX AS HI BYTE
8358 23            751        INX H
8359 36FF          752        MVI M,-1        ;EXPO = -1 ( 0.0 < ANGLE < 0.25)
835B 7A            753        MOV A,D         ;GET INDEX
835C 83            754        ADD E           ;PLUS INCREMENT
835D 57            755        MOV D,A
835E C36C03   C    756        JMP ARCELP      ;GO TO END OF LOOP
                   757 ;
                   758 ;TABLE VALUE IS HIGH...STORE IN REGT2 AND MOVE INDEX DOWN.
                   759 ;
8361 D5            760 ARCHI: PUSH D
8362 01FEFF        761        LXI B,-2
8365 CDE505   C    762        CALL XSTO       ;STORE SINE
8368 D1            763        POP D
8369 7A            764        MOV A,D
836A 93            765        SUB E           ;SUBTRACT INCREMENT FROM INDEX
836B 57            766        MOV D,A
                   767 ;
                   768 ;END OF LOOP...GET RID OF TABLE ANGLE, DIVIDE INCREMENT BY 2
                   769 ;
836C AF            770 ARCELP: XRA A
836D 7B            771        MOV A,E         ;GET INCREMENT
836E 1F            772        RAR
836F 5F            773        MOV E,A
8370 D5            774        PUSH D
8371 CDCB04   C    775        CALL POPX       ;DUMP TABLE SINE
8374 D1            776        POP D
```

```
LOC OBJ       SEQ        SOURCE STATEMENT

0375 C32903  C  777           JMP ARCLP       ;TRY AGAIN
                778 ;
                779 ;VALUE IS BRACKETED BY (REGT1) AND (REGT2)...
                780 ;
0378 CDE704  C  781  ARCBKT:  CALL PUSHX      ;EXTRA COPY OF X
037B 01FFFF     782           LXI B,-1
037E CDFA05  C  783           CALL XRCL       ;GET LOW SINE VALUE
0381 CDBE00  C  784           CALL FPSUB      ;SUBTRACT FROM ARGUMENT
0384 01FEFF     785           LXI B,-2
0387 CDFA05  C  786           CALL XRCL       ;GET HI VALUE
038A 01FFFF     787           LXI B,-1
038D CDFA05  C  788           CALL XRCL       ;GET LOW VALUE
0390 CDBE00  C  789           CALL FPSUB      ;HI-LOW = INTERVAL
0393 CD7701  C  790           CALL FPDIV      ;DIVIDE INTO INCREMENT
                791 ;
                792 ;REGX NOW CONTAINS A NUMBER FROM 0 TO 1.0 REPRESENTING THE INCREMENT OVER
                793 ;THE REG0 ANGLE...DIVIDE BY 128 OR SOMETHING AND ADD...
                794 ;
0396 210700  D  795           LXI H,REGX+3    ;POINT TO EXP
0399 7E         796           MOV A,M
039A DE09       797           SBI 9           ;EASY DIVIDE
039C 77         798           MOV M,A
039D CD9204  C  799           CALL NORMX      ;REQUIRED??????
03A0 010000     800           LXI B,0
03A3 CDFA05  C  801           CALL XRCL       ;GET ANGLE
03A6 CD9204  C  802           CALL NORMX      ;IS WASN'T NORMAL
03A9 CD6200  C  803           CALL FPADD
                804 ;
                805 ;REGX NOW CONTAINS THE FINISHED ANGLE...ADD SIGN BIT
                806 ;
03AC 210400  D  807           LXI H,REGX
03AF F1         808           POP PSW
03B0 B6         809           ORA M
03B1 77         810           MOV M,A
03B2 CD2506  C  811           CALL STKUSV
03B5 C9        812           RET
                813 ;  ARC COSINE ROUTINE...RETURNS 0 < X < 0.5 (180 DEGREES)
                814 ;  COMPUTE X = 90 - ARCSIN(X)
                815 ;
03B6 CDF702  C  816  ARCCOS:  CALL ARCSIN
03B9 010000  C  817           LXI B,C0PT25
03BC CDB705  C  818           CALL XLOAD      ;LOAD REGX WITH 90 DEGREES
03BF CDB704  C  819           CALL XYXCHG
03C2 CDBE00  C  820           CALL FPSUB
03C5 C9        821           RET
                822 ;  SQUARE ROOT ROUTINE...
                823 ;
03C6 CD9D05  C  824  SQRTX:   CALL TESTX
03C9 C8        825           RZ
03CA FC5900  C  826           CM CRASH        ;NOTHING IMAGINARY HERE...
03CD CD1406  C  827           CALL STKSAV     ;SAVE THE STACK REGISTERS
03D0 CDE704  C  828           CALL PUSHX      ;MAKE AN EXTRA COPY OF X
03D3 010400  C  829           LXI B,C0PT5
03D6 CDB705  C  830           CALL XLOAD      ;GET 0.5
03D9 210B00  D  831  SQRT1:   LXI H,REGY+3    ;POINT TO ARGUMENTS EXP
03DC 7E         832           MOV A,M         ;SET CARRY TO SIGN BIT
03DD 17         833           RAL
03DE 7E         834           MOV A,M         ;GET IT
03DF 1F         835           RAR             ;DIVIDE BY 2
03E0 D2E403  C  836           JNC SQRT2       ;EVEN, NO SWEAT
03E3 3C         837           INR A           ;ODD, INCREMENTN IT
03E4 210700  D  838  SQRT2:   LXI H,REGX+3    ;EXPONENT OF OUR GUESS
03E7 E5         839           PUSH H
03E8 77         840           MOV M,A         ;STORE ARGUMEMNTS EXP/2
03E9 CDE704  C  841           CALL PUSHX      ;MAKE ANOTHER COPY
03EC E1         842           POP H
03ED 35         843           DCR M           ;DIVIDE GUESS BY 2 FOR INCREMENT
```

```
LOC    OBJ           SEQ       SOURCE STATEMENT

03EE   010000        844              LXI  B,0
03F1   CDE505    C   845              CALL XSTO       ;STORE INCREMENT IN REG0
03F4   CDCB04    C   846              CALL POPX       ;GET IT OFF STACK
                     847  ;
                     848  ;SAVE SQUARE-ROOT GUESS IN REGT1, ADD INCREMENT, SAVE INCREMENTED GUESS
                     849  ;IN REGT2, RE-SQUARE THE GUESS AND CHECK...
                     850  ;
03F7   0E18          851              MVI  C,24
03F9   C5            852  SQRTLP:     PUSH B          ;SAVE THE COUNT
03FA   01FFFF        853              LXI  B,-1
03FD   CDE505    C   854              CALL XSTO       ;STORE THE GUESS
0400   010000        855              LXI  B,0
0403   CDFA05    C   856              CALL XRCL       ;GET INCREMENT
0406   CD6200    C   857              CALL FPADD      ;ADD TO GUESS
0409   01FEFF        858              LXI  B,-2
040C   CDE505    C   859              CALL XSTO       ;STORE INCREMENTED GUESS
040F   CDE704    C   860              CALL PUSHX      ;MAKE AN EXTRA COPY
0412   CDEC00    C   861              CALL FPMPY      ;MULTIPLY INCREMENTED GUESS BY ITSELF
0415   CD3B05    C   862              CALL XYCMP      ;COMPARE WITH ORIG NUMBER
0418   CA3F04    C   863              JZ   SQRT5      ;RIGHT ON...
041B   F22A04    C   864              JP   SQRT3      ;WE ARE STILL LOW, KEEP INCREMENTED VALUE
                     865  ;
                     866  ;WE ARE HIGH...GO BACK TO PRE-INCREMENT GUESS IN REGT1
                     867  ;
041E   CDCB04    C   868              CALL POPX       ;GET RID OF SQUARED GUESS
0421   01FFFF        869              LXI  B,-1
0424   CDFA05    C   870              CALL XRCL       ;GET PRE-INCREMENT GUES
0427   C33304    C   871              JMP  SQRT6
                     872  ;
                     873  ;LOW...USE INCREMENTED VALUE
                     874  ;
042A   CDCB04    C   875  SQRT3:      CALL POPX
042D   01FEFF        876              LXI  B,-2
0430   CDFA05    C   877              CALL XRCL
                     878  ;
                     879  ;DIVIDE INCREMENT BY 2 AND LOOP...
                     880  ;
0433   213000    D   881  SQRT6:      LXI  H,REG0+3   ;EXPONENT OF REG0
0436   35            882              DCR  M
0437   C1            883              POP  B          ;GET COUNTER
0438   0D            884              DCR  C
0439   C2F903    C   885              JNZ  SQRTLP     ;LOOP
                     886  ;
                     887  ;ALL DONE...
                     888  ;
043C   C34904    C   889              JMP  SQRT7
043F   C1            890  SQRT5:      POP  B
0440   CDCB04    C   891              CALL POPX
0443   01FEFF        892              LXI  B,-2
0446   CDFA05    C   893              CALL XRCL
0449   CDDC04    C   894  SQRT7:      CALL POPY       ;GET RID OF ORIGINAL ARGUMENT
044C   CD2506    C   895              CALL STKUSV     ;RESTORE STACK
044F   C9            896              RET
                     897  ; EXPONENT BUMPERS AND MANTISSA SHIFTERS...
                     898  ;     CALLED INTERNALLY TO MANIPULATE THE FLOATING-POINT REGISTERS.
                     899  ;
                     900  ;SHIFT X REG RIGHT AND RAISE THE EXPONENT APPROPRIATLY...
                     901  ;
0450   210400    D   902  EXPUPX:     LXI  H,REGX
0453   C36804    C   903              JMP  EXPUP
                     904  ;
                     905  ;SHIFT Y REGISTER RIGHT AND RAISE EXPONENT...
                     906  ;
0456   210800    D   907  EXPUPY:     LXI  H,REGY
0459   C36804    C   908              JMP  EXPUP
                     909  ;
```

```
LOC  OBJ        SEQ      SOURCE STATEMENT

910 ;SHIFT X REGISTER LEFT AND DROP EXPONENT ACCORDINGLY...RETURN MSB IN CARRY.
                911 ;
045C 210400  D  912 EXDWNX: LXI H,REGX
045F C37B04  C  913         JMP EXDWN
                914 ;
                915 ;SHIFT Y REGISTER LEFT AND DROP EXPONENT...ETC
                916 ;
0462 210800  D  917 EXDWNY: LXI H,REGY
0465 C37B04  C  918         JMP EXDWN
                919 ;
                920 ;ROUTINE TO PERFORM RIGHT SHIFT...ENTER WITH H,L POINTING TO REG.
                921 ;
0468 23         922 EXPUP:  INX H        ;MOVE TO HI BYTE
0469 23         923         INX H
046A 23         924         INX H        ;POINT TO EXPONENT
046B 34         925         INR M        ;INCREMENT IT
046C 2B         926         DCX H        ;BACK TO HI BYTE
046D AF         927         XRA A        ;CLEAR CARRY
046E CD5F01  C  928         CALL RS24    ;DO RIGHT SHIFT...24 BITS
0471 3E00       929         MVI A,0      ;CLEAR AC (BUT NOT CARRY)
0473 17         930         RAL          ;SIGN BIT TO BIT0
0474 47         931         MOV B,A      ;SAVE IT
0475 7E         932         MOV A,M      ;GET LOW BYTE
0476 E6FE       933         ANI 0FEH     ;ZERO THE SIGN
0478 B0         934         ORA B        ;ADD NEW SIGN
0479 77         935         MOV M,A      ;BACK TO MEM
047A C9         936         RET
                937 ;ROUTINE TO EXECUTE LEFT SHIFT..
                938 ;REGISTER POINTED TO BY H,L...RETURN MSB IN CARRY.
                939 ;
047B 23         940 EXDWN:  INX H        ;MOVE TO HI BYTE
047C 23         941         INX H
047D 7E         942         MOV A,M      ;GET IT
047E 17         943         RAL          ;MSB TO CARRY
047F D8         944         RC           ;RETURN IT IF SET...
0480 2B         945         DCX H        ;BACK TO LOW BYTE
0481 2B         946         DCX H
0482 7E         947         MOV A,M      ;GET LOW BYTE
0483 1F         948         RAR          ;SIGN BIT TO CARRY
0484 D28C04  C  949         JNC EXDWN2   ;POSITIVE, DON'T SWEAT IT
0487 7E         950         MOV A,M      ;GET LOW BYTE AGAIN
0488 E6FE       951         ANI 0FEH     ;ZERO SIGN SO THAT IT DOESN'T PROPAGATE
048A 77         952         MOV M,A
048B 37         953         STC          ;SET CARRY AGAIN (THE AND CLEARED IT)
048C CD6B01  C  954 EXDWN2: CALL LS24    ;SHIFT LEFT, MOVING SIGN BIT FROM CARRY TO LSB
048F 23         955         INX H        ;MOVE TO EXPONENT
0490 35         956         DCR M        ;LOWER IT A NOTCH
                957         RET
                958 ;      NORMALIZE ROUTINE....
                959 ;      CALLED INTERNALLY, THIS ROUTINE MAKES THINGS NORMAL
                960 ;      (VERY USEFUL AROUND HERE).
                961 ;
0492 CD9D05  C  962 NORMX:  CALL TESTX   ;CHECK FOR A ZERO....
0495 C8         963         RZ           ;ZERO, RETURN
0496 210400  D  964 NORMLP: LXI H,REGX
0499 CD7B04  C  965         CALL EXDWN   ;SHIFT LEFT
049C D29604  C  966         JNC NORMLP   ;UNTIL IT WON'T GO ANY FURTHER
049F 3F         967         CMC          ;CLEAR CARRY
04A0 C9         968         RET
                969 ;
                970 ;      FORCE A ZERO EXPONENT.... IN THE X REG.
                971 ;
04A1 210700  D  972 ZEXPX:  LXI H,REGX+3 ;POINT TO EXPONENT
04A4 7E         973         MOV A,M      ;CHECK FOR ZERO
04A5 B7         974         ORA A
04A6 C8         975         RZ           ;IT IS, RETURN ZERO FLAG
```

```
LOC  OBJ         SEQ       SOURCE STATEMENT

04A7 FAB104   C  976           JM   ZEX2         ;MINUS, RAISE IT
04AA CD5C04   C  977           CALL EXDWNX       ;LOWER EXPONENT
04AD D8          978           RC                ;ERROR
04AE C3A104   C  979           JMP  ZEXPX        ;CHECK AGAIN
04B1 CD5004   C  980  ZEX2:    CALL EXPUPX       ;RAISE EXPONENT
04B4 C3A104   C  981           JMP  ZEXPX        ;CHECK AGAIN
                 982      ;    EXCHANGE THE X AND Y REGISTERS...
                 983      ;    CALLABLE BY THE INTERPRETER, THIS ROUTINE SIMPLY EXCHANGES THE
                 984      ;    CONTENTS OF X AND Y.
                 985      ;
04B7 110400   D  986  XYXCHG:  LXI  D,REGX       ;SET POINTERS
04BA 210800   D  987           LXI  H,REGY
04BD 0E04        988           MVI  C,4          ;COUNTER
04BF 46          989  XCHGB:   MOV  B,M          ;GET A BYTE FROM Y
04C0 1A          990           LDAX D            ;AND X...
04C1 EB          991           XCHG              ;SWAP THEM
04C2 12          992           STAX D            ;RETURN THEM TO MEM
04C3 70          993           MOV  M,B
04C4 13          994           INX  D
04C5 23          995           INX  H
04C6 0D          996           DCR  C
04C7 C2BF04   C  997           JNZ  XCHGB        ;DO IT UNTIL DONE...
04CA C9          998           RET
                 999      ;    POP THE X REGISTER OFF THE CALCULATOR STACK...
                 1000     ;
04CB 110400   D  1001 POPX:    LXI  D,REGX       ;"TO" POINTER
04CE 210800   D  1002          LXI  H,REGY       ;"FROM" POINTER
04D1 0E0C        1003          MVI  C,(STKSIZ-1)*4  ;BYTE COUNT
04D3 7E          1004 POPLP:   MOV  A,M          ;GET A BYTE
04D4 12          1005          STAX D            ;STORE IT
04D5 13          1006          INX  D
04D6 23          1007          INX  H
04D7 0D          1008          DCR  C
04D8 C2D304   C  1009          JNZ  POPLP
04DB C9          1010          RET
                 1011     ;
                 1012     ;POP THE Y REGISTER FROM THE STACK...
                 1013     ;
04DC 110800   D  1014 POPY:    LXI  D,REGY       ;"TO" POINTER
04DF 210C00   D  1015          LXI  H,REGZ       ;"FROM" POINTER
04E2 0E08        1016          MVI  C,(STKSIZ-2)*4  ;COUNT
04E4 C3D304   C  1017          JMP  POPLP
                 1018     ;
                 1019     ;PUSH THE X REGISTER UP THE STACK...T GETS LOST...
                 1020     ;
04E7 111000   D  1021 PUSHX:   LXI  D,REGT       ;"FROM" POINTER
04EA 211400   D  1022          LXI  H,REGT+4     ;"TO" POINTER
04ED 0E0C        1023          MVI  C,(STKSIZ-1)*4  ;COUNT
04EF 1B          1024 PUSHLP:  DCX  D
04F0 2B          1025          DCX  H
04F1 1A          1026          LDAX D            ;GET A BYTE
04F2 77          1027          MOV  M,A          ;STORE IT
04F3 0D          1028          DCR  C
04F4 C2EF04   C  1029          JNZ  PUSHLP
04F7 C9          1030          RET
                 1031     ;    ROLL REGISTERS UP AND DOWN...
                 1032     ;    DOWN MEANS Z TO Y, Y TO X, ETC...
                 1033     ;
04F8 110400   D  1034 RDWN:    LXI  D,REGX       ;POINT TO X ("FROM" POINTER)
04FB 210000   D  1035          LXI  H,REGXSV     ;AND X-SAVE REGISTER
04FE 0E10        1036          MVI  C,STKSIZ*4   ;BYTE COUNT
0500 CD4606   C  1037          CALL MOVBYT       ;SHIFT STACK DOWNWARDS (X GOES TO X-SAVE)
0503 110000   D  1038          LXI  D,REGXSV
0506 211000   D  1039          LXI  H,REGT
0509 0E04        1040          MVI  C,4
050B CD4606   C  1041          CALL MOVBYT       ;MOVE X TO T
```

```
LOC  OBJ          SEQ     SOURCE STATEMENT

050E C9          1042         RET
                 1043 ;
                 1044 ;ROLL UP....T TO X-SAVE, THEN X-SAVE TO X, X TO Y, ETC.....
                 1045 ;
050F 111000  D   1046 RUP:    LXI  D,REGT       ;POINT TO T AND X-SAVE
0512 210000  D   1047         LXI  H,REGXSV
0515 0E04        1048         MVI  C,4
0517 CD4606  C   1049         CALL MOVBYT       ;MOVE T DOWN
051A 111400  D   1050         LXI  D,REGT+4     ;POINT TO T AND Z...WE HAVE TO SHIFT FROM THE TOP DOWN...
051D 211000  D   1051         LXI  H,REGT
0520 0E10        1052         MVI  C,STKSIZ*4
0522 1B          1053 RUPLP:  DCX  D
0523 2B          1054         DCX  H
0524 7E          1055         MOV  A,M
0525 12          1056         STAX D
0526 0D          1057         DCR  C
0527 C22205  C   1058         JNZ  RUPLP
052A C9          1059         RET
                 1060 ;       CHANGE SIGN ROUTINE...
                 1061 ;       CALLABLE FROM THE INTERPRETER, THIS ROUTINE CHANGES THE SIGN
                 1062 ;       OF REGISTER X...
                 1063 ;
052B 210400  D   1064 XCHGSN: LXI  H,REGX       ;POINT H,L TO X REG
052E 7E          1065         MOV  A,M          ;GET LOW BYTE
052F EE01        1066         XRI  1            ;TOGGLE SIGN BIT
0531 77          1067         MOV  M,A
0532 C9          1068         RET
                 1069 ;
                 1070 ;ABSOLUTE VALUE ROUTINE....CALLABLE FROM INTERPRETER...
                 1071 ;
0533 210400  D   1072 ABSX:   LXI  H,REGX       ;POINT TO X'S SIGN BYTE
0536 3EFE        1073         MVI  A,NOT BIT0   ;MASK
0538 A6          1074         ANA  M
0539 77          1075         MOV  M,A
053A C9          1076         RET
                 1077 ;       COMPARE THE X AND Y REGISTERS...
                 1078 ;       CALLED BY THE INTERPRETER, RETURNS FLAGS SET FOR Y-X
                 1079 ;       ALGORITHM:
                 1080 ;               IF MANITSSA SIGNS DIFFER THEN RETURN THE SIGN OF Y.
                 1081 ;               IF SIGNS ARE THE SAME, THEN RETURN EXP(Y) - EXP (X)
                 1082 ;               IF EXPONENTS ARE EQUAL, THEN COMPARE MANTISSAS; RETURN
                 1083 ;                       POSITIVE IF Y>X, ZERO IF Y=X.
                 1084 ;
053B 110800  D   1085 XYCMP:  LXI  D,REGY       ;POINTER TO Y
053E 210400  D   1086         LXI  H,REGX       ;AND X
0541 1A          1087         LDAX D            ;GET LOW BYTE OF Y
0542 AE          1088         XRA  M            ;COMPARE SIGN BIT WITH X
0543 E601        1089         ANI  BIT0         ;MASK SIGN
0545 CA5105  C   1090         JZ   XYCMP2       ;EQUAL SIGNS...
                 1091 ;
                 1092 ;SIGNS DIFFER...
                 1093 ;
0548 1A          1094         LDAX D            ;GET SIGN OF Y
0549 1F          1095         RAR               ;TO SIGN BIT
054A 1F          1096         RAR
054B E680        1097         ANI  BIT7         ;MASK IT
054D 3C          1098         INR  A            ;DON'T SET ZERO FLAG
054E FE00        1099         CPI  0            ;SET FLAGS
0550 C9          1100         RET               ;RETURN
                 1101 ;
                 1102 ;SIGNS SAME...CHECK EXPONENTS..
                 1103 ;
0551 110B00  D   1104 XYCMP2: LXI  D,REGY+3     ;SET POINTERS TO EXPONENT BYTES
0554 210700  D   1105         LXI  H,REGX+3
0557 CD6805  C   1106         CALL SCMP8        ;DO 8-BIT SIGNED COMPARE
055A C0          1107         RNZ               ;RETURN FLAGS IF NOT ZERO
```

```
LOC  OBJ        SEQ        SOURCE STATEMENT

1108 ;
                1109 ;EXPONENTS ARE EQUAL...CHECK HI-ORDER BYTES, THEN MIDDLE, FINALLY
                1110 ;  LOW-ORDER BYTES BEFORE CALLING IT EQUAL
                1111 ;
055B 0E03       1112           MVI C,3         ;BYTE COUNTER
055D 1B         1113 XYCMP3:   DCX D           ;MOVE TO HI-ORDER BYTES
055E 2B         1114           DCX H
055F CD7605  C  1115           CALL UCMP8      ;UNSIGNED 8-BIT COMPARE
0562 C0         1116           RNZ             ;RETURN IF WE SET THE FLAGS NON-ZERO
0563 0D         1117           DCR C           ;CHECK COUNT
0564 C25D05  C  1118           JNZ XYCMP3      ;KEEP CHECKING
0567 C9         1119           RET             ;RETURN ZERO FLAGS
                1120 ;
                1121 ;ROUTINE TO DO 8-BIT SIGNED COMPARE...(D,E) - (H,L)
                1122 ;
0568 1A         1123 SCMP8:    LDAX D          ;GET Y VALUE
0569 AE         1124           XRA M           ;CHECK SIGN AGAINST X
056A E680       1125           ANI BIT7
056C CA7605  C  1126           JZ UCMP8        ;EQUAL SIGN BITS
056F 1A         1127           LDAX D          ;NOT EQUAL...GET Y SIGN
0570 E680       1128           ANI BIT7        ;MASK SIGN
0572 3C         1129           INR A           ;NON-ZERO
0573 FE00       1130           CPI 0           ;SET FLAGS
0575 C9         1131           RET
                1132 ;
                1133 ;SAME SIGNS...UNSIGNED COMPARE
                1134 ;
0576 1A         1135 UCMP8:    LDAX D
0577 BE         1136           CMP M
0578 C8         1137           RZ              ;EQUAL, NO FIDDLING REQUIRED
0579 DA8005  C  1138           JC UCMPM        ;CARRY MEANS (H,L) > (D,E)...IE X > Y = MINUS RETURN
057C 3E01       1139           MVI A,1         ;PLUS NON-ZERO RETURN
057E B7         1140           ORA A
057F C9         1141           RET
0580 3EFF       1142 UCMPM:    MVI A,-1
0582 B7         1143           ORA A
0583 C9         1144           RET
                1145           ;FORCE X AND Y EXPONENTS TO BE EQUAL..
                1146 ;         CALLED INTERNALLY ONLY, THIS ROUTINE INCREMENTS THE SMALLER
                1147 ;         EXPONENT UNTIL IT EQUALS THE LARGER...
                1148 ;
0584 210700  D  1149 EXPEQ:    LXI H,REGX+3    ;POINT TO EXPONENT BYTES
0587 110B00  D  1150           LXI D,REGY+3
058A CD6805  C  1151           CALL SCMP8      ;DO SIGNED COMPARE
058D C8         1152           RZ              ;EQUAL, RETURN
058E FA9705  C  1153           JM XEQ2         ;X IS BIGGER...
                1154 ;
                1155 ;Y EXPONENT IS BIGGER...SHIFT X
                1156 ;
0591 CD5004  C  1157           CALL EXPUPX
0594 C38405  C  1158           JMP EXPEQ       ;CHECK AGAIN
0597 CD5604  C  1159 XEQ2:     CALL EXPUPY     ;SHIFT Y
059A C38405  C  1160           JMP EXPEQ       ;CHECK AGAIN
                1161 ;         TEST THE X REGISTER FOR MINUS OR ZERO..
                1162 ;
059D 210400  D  1163 TESTX:    LXI H,REGX
05A0 C3A605  C  1164           JMP TST2
                1165 ;
                1166 ;         TEST THE Y REGISTER ...
                1167 ;
05A3 210800  D  1168 TESTY:    LXI H,REGY
05A6 7E         1169 TST2:     MOV A,M         ;GET LOW BYTE
05A7 E6FE       1170           ANI 0FEH        ;MASK OFF SIGN
05A9 E5         1171           PUSH H
05AA 23         1172           INX H
05AB B6         1173           ORA M           ;ADD MIDDLE BYTE
```

```
LOC  OBJ         SEQ          SOURCE STATEMENT

05AC 23          1174         INX H
05AD B6          1175         ORA M          ;AND HI BYTE
05AE E1          1176         POP H
05AF C8          1177         RZ             ;ZERO, RETURN
05B0 7E          1178         MOV A,M        ;GET LOW BYTE AGAIN
05B1 1F          1179         RAR            ;SIGN TO CARRY
05B2 3E00        1180         MVI A,0        ;ZERO AC, NOT FLAGS
05B4 1F          1181         RAR            ;SIGN TO BIT7
05B5 3C          1182         INR A          ;SET MINUS FLAG, NOT ZERO...
05B6 C9          1183         RET
                 1184 ;       LOAD A CONSTANT POINTED TO BY B,C INTO REG X, PUSHING THE STACK.
                 1185 ;       THE EXPONENT IS LOADED ALSO, IT IS ASSUMED THE CONSTANT IN ALREADY
                 1186 ;       NORMAL...
                 1187 ;
05B7 C5          1188 XLOAD:  PUSH B
05B8 CDE704   C  1189         CALL PUSHX     ;MAKE ROOM
05BB C1          1190         POP B
05BC 210400   D  1191         LXI H,REGX     ;POINT TO REG X
05BF 1E04        1192         MVI E,4        ;COUNTER
05C1 0A          1193 XLDLP:  LDAX B
05C2 77          1194         MOV M,A
05C3 03          1195         INX B
05C4 23          1196         INX H
05C5 1D          1197         DCR E
05C6 C2C105   C  1198         JNZ XLDLP
05C9 C9          1199         RET
                 1200 ;
                 1201 ;SAME AS ABOVE, EXCEPT THE EXPONENT IS LOADED WITH A ZERO AND THE RESULT
                 1202 ;IS NORMALIZED..POSITIVE VALUES ONLY!!!!!.(USED TO LOAD 2-BYTE TABLE VALUES..)
                 1203 ;RETURNS B,C POINTING TO WHATEVER FOLLOWS THE 2 BYTES LOADED.
                 1204 ;
05CA C5          1205 XLDZXP: PUSH B
05CB CDE704   C  1206         CALL PUSHX
05CE C1          1207         POP B
05CF 210400   D  1208         LXI H,REGX
05D2 3600        1209 ZLDLP:  MVI M,0        ;LOW BYTE
05D4 23          1210         INX H
05D5 0A          1211         LDAX B
05D6 77          1212         MOV M,A
05D7 03          1213         INX B
05D8 23          1214         INX H
05D9 0A          1215         LDAX B
05DA 77          1216         MOV M,A
05DB 03          1217         INX B
05DC 23          1218         INX H
05DD 3600        1219         MVI M,0
05DF C5          1220         PUSH B
05E0 CD9204   C  1221         CALL NORMX
05E3 C1          1222         POP B
05E4 C9          1223         RET
                 1224 ;       STORE AND RECALL WORKING REGISTERS...
                 1225 ;       REGISTERS B,C CONTAIN WORKING REGISTER NO. (ZERO = INTERNAL)
                 1226 ;       RECALL PUSHES THE STACK, STORE DOESN'T CHANGE IT.
                 1227 ;
05E5 212D00   D  1228 XSTO:   LXI H,REG0     ;BASE ADDRESS
05E8 09          1229         DAD B          ;PLUS REG# *4
05E9 09          1230         DAD B
05EA 09          1231         DAD B
05EB 09          1232         DAD B
05EC 110400   D  1233         LXI D,REGX     ;POINT TO X
05EF 0E04        1234         MVI C,4        ;COUNTER
05F1 1A          1235 XSTOLP: LDAX D
05F2 77          1236         MOV M,A
05F3 23          1237         INX H
05F4 13          1238         INX D
05F5 0D          1239         DCR C
```

```
LOC  OBJ        SEQ       SOURCE STATEMENT

05F6 C2F105  C  1240      JNZ XSTOLP
05F9 C9         1241      RET
                1242
05FA C5         1243 XRCL: PUSH B
05FB CDE704  C  1244      CALL PUSHX
05FE C1         1245      POP B
05FF 212000  D  1246      LXI H,REG0
0602 09         1247      DAD B
0603 09         1248      DAD B
0604 09         1249      DAD B
0605 09         1250      DAD B
0606 110400  D  1251      LXI D,REGX
0609 0E04       1252      MVI C,4
060B 7E         1253 XRCLLP: MOV A,M
060C 12         1254      STAX D
060D 23         1255      INX H
060E 13         1256      INX D
060F 0D         1257      DCR C
0610 C20B06  C  1258      JNZ XRCLLP
0613 C9         1259      RET
                1260 ;    SAVE AND UNSAVE THE REGISTER STACK...
                1261 ;    CALLED INTERNALLY TO ALLOW USE OF THE STACK FOR INTERNAL CALCULATIONS..
                1262 ;
0614 110800  D  1263 STKSAV: LXI D,REGY    ;"FROM" REG
0617 211400  D  1264      LXI H,SVREG      ;"TO" REG
061A 0E0C       1265 STKSV2: MVI C,(STKSIZ-1)*4  ;COUNT
061C 1A         1266 STKSLP: LDAX D
061D 77         1267      MOV M,A
061E 23         1268      INX H
061F 13         1269      INX D
0620 0D         1270      DCR C
0621 C21C06  C  1271      JNZ STKSLP
0624 C9         1272      RET
                1273 ;
                1274 ;    UNSAVE...
                1275 ;
0625 210800  D  1276 STKUSV: LXI H,REGY
0628 111400  D  1277      LXI D,SVREG
062B C31A06  C  1278      JMP STKSV2
                1279 ;    SAVE THE X REGISTER FROM CERTIAN DESTRUCTION AT THE HANDS
                1280 ;    OF SOME DASTURDLY ARITHMETIC ROUTINE...
                1281 ;
062E 110400  D  1282 XSAVE: LXI D,REGX    ;SET POINTERS TO X, XSV REGGIES
0631 210800  D  1283      LXI H,REGXSV
0634 0E04       1284      MVI C,4           ;4 BYTES
0636 CD4606  C  1285      CALL MOVBYT
0639 C9         1286      RET
063A 110800  D  1287 XUNSAV: LXI D,REGXSV
063D 210400  D  1288      LXI H,REGX
0640 0E04       1289      MVI C,4
0642 CD4606  C  1290      CALL MOVBYT
0645 C9         1291      RET
                1292 ;
                1293 ;TRANSFER C BYTES FROM (D,E) TO (H,L)
                1294 ;
0646 1A         1295 MOVBYT: LDAX D
0647 77         1296      MOV M,A
0648 13         1297      INX D
0649 23         1298      INX H
064A 0D         1299      DCR C
064B C24606  C  1300      JNZ MOVBYT
064E C9         1301      RET
                1302 ;    CALL A SUBROUTINE....PUSH CURRENT PC ONTO PC STACK AND EXECUTE
                1303 ;    A JUMP...B,C = JUMP ADDRESS...
                1304 ;
064F 2A9400  D  1305 CALLSB: LHLD PCSP       ;GET PC STACK POINTER
```

```
LOC  OBJ        SEQ      SOURCE STATEMENT 0652 2B         1306         DCX H
0653 2B         1307         DCX H          ;DECREMENT 2 BYTES
0654 229400  D  1308         SHLD PCSP      ;STORE IT
0657 118100  D  1309         LXI D,PC       ;POINT TO PC
065A 1A         1310         LDAX D         ;GET LOW BYTE
065B 77         1311         MOV M,A        ;ONTO STACK
065C 13         1312         INX D
065D 23         1313         INX H
065E 1A         1314         LDAX D  ;GET HI BYTE
065F 77         1315         MOV M,A
0660 C37406  C  1316         JMP JUMP       ;GO TO JUMP ROUTINE
                1317 ;
                1318 ;RETURN FROM A SUBROUTINE...
                1319 ;
0663 2A9400  D  1320 RTNSUB: LHLD PCSP     ;GET STACK POINTER
0666 118100  D  1321         LXI D,PC       ;POINT TO PROG COUNTER
0669 7E         1322         MOV A,M
066A 12         1323         STAX D         ;STORE LOW BYTE
066B 13         1324         INX D
066C 23         1325         INX H
066D 7E         1326         MOV A,M
066E 12         1327         STAX D         ;HI BYTE
066F 23         1328         INX H
0670 229400  D  1329         SHLD PCSP
0673 C9         1330         RET
                1331 ;
                1332 ;JUMP ROUTINE....B,C = ABSOLUTE JUMP ADDRESS
                1333 ;
0674 60         1334 JUMP:   MOV H,B        ;MOVE JUMP ADDRESS TO H,L
0675 69         1335         MOV L,C
0676 228100  D  1336         SHLD PC        ;SET NEW PC
0679 C9         1337         RET
                1338 ;       TEST ROUTINES....EXECUTE BRANCH IF CONDITION IS TRUE...
                1339 ;
                1340 ;JUMP IF X > Y...
                1341 ;
067A C5         1342 JPXGTY: PUSH B
067B CD3B05  C  1343         CALL XYCMP     ;CHECK Y-X
067E C1         1344         POP B
067F FC7406  C  1345         CM JUMP
0682 C9         1346         RET
                1347 ;
                1348 ;JUMP IF X >= Y
                1349 ;
0683 C5         1350 JPXGEY: PUSH B
0684 CD3B05  C  1351         CALL XYCMP
0687 C1         1352         POP B
0688 CA8C06  C  1353         JZ JPX2
068B F0         1354         RP
068C CD7406  C  1355 JPX2:   CALL JUMP
068F C9         1356         RET
                1357 ;
                1358 ;JUMP IF X < Y
                1359 ;
0690 C5         1360 JPXLTY: PUSH B
0691 CD3B05  C  1361         CALL XYCMP
0694 C1         1362         POP B
0695 C8         1363         RZ
0696 F47406  C  1364         CP JUMP
0699 C9         1365         RET
                1366 ;
                1367 ;JUMP IF X <= Y
                1368 ;
069A C5         1369 JPXLEY: PUSH B
069B CD3B05  C  1370         CALL XYCMP
069E C1         1371         POP B
```

```
LOC  OBJ        SEQ        SOURCE STATEMENT

069F F47406  C  1372          CP JUMP
06A2 C9         1373          RET
                1374 ;
                1375 ;JUMP IF X = Y
                1376 ;
06A3 C5         1377 JPXEQY: PUSH B
06A4 CD3B05  C  1378          CALL XYCMP
06A7 C1         1379          POP B
06A8 CC7406  C  1380          CZ JUMP
06AB C9         1381          RET
                1382 ;
                1383 ;JUMP IF X NOT= Y
                1384 ;
06AC C5         1385 JPXNEY: PUSH B
06AD CD3B05  C  1386          CALL XYCMP
06B0 C1         1387          POP B
06B1 C47406  C  1388          CNZ JUMP
06B4 C9         1389          RET
                1390 ;
                1391 ;JUMP IF X = 0
                1392 ;
06B5 C5         1393 JPXEQ0: PUSH B
06B6 CD9D05  C  1394          CALL TESTX
06B9 C1         1395          POP B
06BA CC7406  C  1396          CZ JUMP
06BD C9         1397          RET
                1398 ;
                1399 ;JUMP IF X NOT= 0
                1400 ;
06BE C5         1401 JPXNE0: PUSH B
06BF CD9D05  C  1402          CALL TESTX
06C2 C1         1403          POP B
06C3 C47406  C  1404          CNZ JUMP
06C6 C9         1405          RET
                1406 ;
                1407 ;JUMP IF X > 0
                1408 ;
06C7 C5         1409 JPXGT0: PUSH B
06C8 CD9D05  C  1410          CALL TESTX
06CB C1         1411          POP B
06CC C8         1412          RZ
06CD F47406  C  1413          CP JUMP
06D0 C9         1414          RET
                1415 ;
                1416 ;JUMP IF X < 0
                1417 ;
06D1 C5         1418 JPXLT0: PUSH B
06D2 CD9D05  C  1419          CALL TESTX
06D5 C1         1420          POP B
06D6 FC7406  C  1421          CM JUMP
06D9 C9         1422          RET
                1423 ;
                1424 ;JUMP IF X >= 0
                1425 ;
06DA C5         1426 JPXGE0: PUSH B
06DB CD9D05  C  1427          CALL TESTX
06DE C1         1428          POP B
06DF F47406  C  1429          CP JUMP
06E2 C9         1430          RET
                1431 ;
                1432 ;JUMP IF X <= 0
                1433 ;
06E3 C5         1434 JPXLE0: PUSH B
06E4 CD9D05  C  1435          CALL TESTX
06E7 C1         1436          POP B
06E8 CAEC06  C  1437          JZ JPX3
```

```
LOC  OBJ        SEQ          SOURCE STATEMENT

06EB F0         1438         RP
06EC CD7406  C  1439 JPX3:   CALL JUMP
06EF C9         1440         RET
                1441 ;    FIXED POINT CONVERSION...
                1442 ;    CONVERTS THE CONTENTS OF THE X REGISTER TO A FIXED-POINT NUMBER,
                1443 ;    WITH THE INTEGER PART IN XINTGR AND THE FRACTION PART IN
                1444 ;    XFRACT, 16 BITS EACH. THE FRACTION PART IS LEFT ADJUSTED,
                1445 ;    THE INTEGER PART IS RIGHT ADJUSTED....
                1446 ;    (IE THE BIT POSITIONS OF THE FRACTION HAVE VALUES OF
                1447 ;    0.5, 0.25, 0.125, ETC FROM THE LEFT TO THE RIGHT).
                1448 ;    ALSO SETS SIGNX = 1 FOR NEGATIVE...
                1449 ;
06F0 CD2E06  C  1450 FXPCON: CALL XSAVE       ;SAVE THE X REG
06F3 210400  D  1451         LXI H,REGX       ;GET SIGN OF X
06F6 7E         1452         MOV A,M
06F7 E601       1453         ANI BIT0         ;MASK IT
06F9 322400  D  1454         STA SIGNX
06FC 119600  D  1455         LXI D,XINTGR     ;POINT D,E TO INTEGER TRASH-CAN
06FF AF         1456         XRA A            ;CLEAR AC
0700 12         1457         STAX D           ;CLEAR THE TRASH-CAN
0701 13         1458         INX D
0702 12         1459         STAX D
0703 210700  D  1460         LXI H,REGX+3     ;POINT TO X'S EXPONENT
0706 7E         1461         MOV A,M          ;GET IT
0707 4F         1462         MOV C,A          ;COPY TO C
0708 B7         1463         ORA A
0709 FA3C07  C  1464         JM FXPMXP        ;IT IS MINUS, NO INTEGER AT ALL
070C CA2607  C  1465         JZ FXPZXP        ;ALREADY ZERO, NOTHING TO DO...
070F 210400  D  1466 FXPLP:  LXI H,REGX       ;POINT TO LSB OF X
0712 119600  D  1467         LXI D,XINTGR     ;AND OUR ACCUMULATING INTEGER
0715 CD6801  C  1468         CALL LS24        ;SHIFT THE MANTISSA LEFT
0718 1A         1469         LDAX D           ;GET LOW BYTE OF INTEGER
0719 17         1470         RAL              ;ADD ANY BIT THAT FELL OUT OF MANTISSA
071A 12         1471         STAX D
071B 13         1472         INX D
071C 1A         1473         LDAX D           ;HI BYTE
071D 17         1474         RAL
071E 12         1475         STAX D
071F DC5900  C  1476         CC CRASH         ;A CARRY OUT WOULD BE MOST STRANGE...
0722 0D         1477         DCR C            ;DECREMENT THE EXPONENT
0723 C20F07  C  1478         JNZ FXPLP        ;AND LOOP UNTIL IT GOES AWAY
                1479 ;
                1480 ;EXPONENT IS ZERO...STORE WHAT'S LEFT IN THE MANTISSA AS THE FRACTION
                1481 ;
0726 210400  D  1482 FXPZXP: LXI H,REGX
0729 119800  D  1483         LXI D,XFRACT     ;POINT TO MANTISSA, FRCTION
072C 7E         1484         MOV A,M          ;GET LOW BYTE
072D C67F       1485         ADI 07FH         ;ROUND-UP CONSTANT
072F 23         1486         INX H            ;POINT TO MIDDLE BYTE
0730 3E00       1487         MVI A,0          ;A ZERO IN AC
0732 8E         1488         ADC M            ;ADD CARRY TO MIDDLE BYTE
0733 12         1489         STAX D           ;AND STORE IT AS LOW BYTE OF FRACTION
0734 23         1490         INX H
0735 13         1491         INX D
0736 7E         1492         MOV A,M          ;GET HI BYTE
0737 12         1493         STAX D
0738 CD3A06  C  1494         CALL XUNSAV      ;RESTORE X REG
073B C9         1495         RET
                1496 ;
                1497 ;EXPONENT WAS MINUS...RIGHT SHIFT REQUIRED BEFORE STORING FRACTION
                1498 ;
073C AF         1499 FXPMXP: XRA A            ;CLEAR CARRY
073D 210600  D  1500         LXI H,REGX+2     ;POINT TO MSB
0740 CD5F01  C  1501         CALL RS24        ;SHIFT RIGHT
```

```
LOC  OBJ        SEQ       SOURCE STATEMENT 0743 0C         1502           INR  C          ;BUMP EXPONENT TOWARDS ZERO
0744 C23C07  C  1503           JNZ  FXPMXP     ;LOOP UNTIL ZERO
0747 C32607  C  1504           JMP  FXPZXP     ;GO STORE FRACTION
                1505 ;     GET KEYBOARD VALUE INTO REGISTER X FOR TESTING
                1506 ;
074A CDE704  C  1507 KBDX: CALL PUSHX          ;MAKE ROOM
074D CD0000  E  1508       CALL KBDCHK         ;GET KEY VALUE
0750 210400  D  1509       LXI  H,REGX
0753 3600       1510       MVI  M,0            ;SIGN
0755 23         1511       INX  H
0756 3600       1512       MVI  M,0            ;MIDDLE BYTE
0758 23         1513       INX  H
0759 3607       1514       MVI  M,A            ;HI BYTE = KEY CODE
075B 23         1515       INX  H
075C 3608       1516       MVI  M,8            ;EXP = 8
075E CD9204  C  1517       CALL NORMX          ;BE NICE AND NORMALIZE IT
0761 C9         1518       RET
                1519 ;     INTERPRETER OP CODE DEFS AND LOOK-UP TABLE...
                1520 ;
                1521 ;     THREE BYTES PER OP CODE: A 16-BIT DISPATCH ADDRESS AND A COMMAND BYTE COUNT.
                1522 ;
                1523       PUBLIC STOP, PLUS, MINUS, MPY, DIV, LOAD, STO, RCL
                1524       PUBLIC EXCHG, CHGSIN, ABS, SIN, COS, GOSUB, GOTO, RTN
                1525       PUBLIC XEQ0, XNE0, XGT0, XLT0, XGE0, XLE0
                1526       PUBLIC XEQY, XNEY, XGTY, XLTY, XGEY, XLEY
                1527       PUBLIC ACOS, ASIN, SQRT, ENTER, DISPLY, DSPCLR, GETCNT
                1528       EXTRN  DSPCON, DSPBLK, LMDATA, LMPDVR
                1529
                1530 ;
                1531 OPTAB:
0000            1532       STOP   EQU  0
0762 6000    C  1533                              DW ISTOP
0764 01         1534                              DB 1
0001            1535       ENTER  EQU  STOP+1
0765 E704    C  1536                              DW PUSHX
0767 01         1537                              DB 1
0002            1538       PLUS   EQU  ENTER+1
0768 6200    C  1539                              DW FPADD
076A 01         1540                              DB 1
0003            1541       MINUS  EQU  PLUS+1
076B BE00    C  1542                              DW FPSUB
076D 01         1543                              DB 1
0004            1544       MPY    EQU  MINUS+1
076E EC00    C  1545                              DW FPMPY
0770 01         1546                              DB 1
0005            1547       DIV    EQU  MPY+1
0771 7701    C  1548                              DW FPDIV
0773 01         1549                              DB 1
0006            1550       LOAD   EQU  DIV+1
0774 B705    C  1551                              DW XLOAD
0776 03         1552                              DB 3
0007            1553       STO    EQU  LOAD+1
0777 E505    C  1554                              DW XSTO
0779 02         1555                              DB 2
0008            1556       RCL    EQU  STO+1
077A FA05    C  1557                              DW XRCL
077C 02         1558                              DB 2
0009            1559       EXCHG  EQU  RCL+1
077D B704    C  1560                              DW XYXCHG
077F 01         1561                              DB 1
000A            1562       ROLUP  EQU  EXCHG+1
0780 0F05    C  1563                              DW RUP
0782 01         1564                              DB 1
000B            1565       ROLDN  EQU  ROLUP+1
0783 F804    C  1566                              DW RDWN
0785 01         1567                              DB 1
```

```
LOC  OBJ        SEQ    SOURCE STATEMENT 000C            1568   CHGSIN EQU ROLDN+1
0786 2B05  C    1569                   DW XCHGSN
0788 01         1570                   DB 1
000D            1571   ABS    EQU CHGSIN+1
0789 3305  C    1572                   DW ABSX
078B 01         1573                   DB 1
000E            1574   SIN    EQU ABS+1
078C 0402  C    1575                   DW SINX
078E 01         1576                   DB 1
000F            1577   COS    EQU SIN+1
078F E102  C    1578                   DW COSX
0791 01         1579                   DB 1
0010            1580   ASIN   EQU COS+1
0792 F702  C    1581                   DW ARCSIN
0794 01         1582                   DB 1
0011            1583   ACOS   EQU ASIN+1
0795 B603  C    1584                   DW ARCCOS
0797 01         1585                   DB 1
0012            1586   SQRT   EQU ACOS+1
0798 C603  C    1587                   DW SQRTX
079A 01         1588                   DB 1
0013            1589   GOSUB  EQU SQRT+1
079B 4F06  C    1590                   DW CALLSB
079D 03         1591                   DB 3
0014            1592   GOTO   EQU GOSUB+1
079E 7406  C    1593                   DW JUMP
07A0 03         1594                   DB 3
0015            1595   RTN    EQU GOTO+1
07A1 6306  C    1596                   DW RTNSUB
07A3 01         1597                   DB 1
0016            1598   XEQ0   EQU RTN+1
07A4 B506  C    1599                   DW JPXEQ0
07A6 03         1600                   DB 3
0017            1601   XNE0   EQU XEQ0+1
07A7 BE06  C    1602                   DW JPXNE0
07A9 03         1603                   DB 3
0018            1604   XGT0   EQU XNE0+1
07AA C706  C    1605                   DW JPXGT0
07AC 03         1606                   DB 3
0019            1607   XGE0   EQU XGT0+1
07AD DA06  C    1608                   DW JPXGE0
07AF 03         1609                   DB 3
001A            1610   XLT0   EQU XGE0+1
07B0 D106  C    1611                   DW JPXLT0
07B2 03         1612                   DB 3
001B            1613   XLE0   EQU XLT0+1
07B3 E306  C    1614                   DW JPXLE0
07B5 03         1615                   DB 3
001C            1616   XEQY   EQU XLE0+1
07B6 A306  C    1617                   DW JPXEQY
07B8 03         1618                   DB 3
001D            1619   XNEY   EQU XEQY+1
07B9 AC06  C    1620                   DW JPXNEY
07BB 03         1621                   DB 3
001E            1622   XGTY   EQU XNEY+1
07BC 7A06  C    1623                   DW JPXGTY
07BE 03         1624                   DB 3
001F            1625   XGEY   EQU XGTY+1
07BF 8306  C    1626                   DW JPXGEY
07C1 03         1627                   DB 3
0020            1628   XLTY   EQU XGEY+1
07C2 9006  C    1629                   DW JPXLTY
07C4 03         1630                   DB 3
0021            1631   XLEY   EQU XLTY+1
07C5 9A06  C    1632                   DW JPXLEY
07C7 03         1633                   DB 3
```

```
LOC  OBJ         SEQ      SOURCE STATEMENT 0022             1634     DISPLY  EQU XLEV+1
07C8 0000    E   1635                             DW DSPCON
07CA 02          1636                             DB 2
0023             1637     DSPCLR  EQU DISPLY+1
07CB 0000    E   1638                             DW DSPBLK
07CD 01          1639                             DB 1
0024             1640     GETCNT  EQU DSPCLR+1
07CE 0000    E   1641                             DW LMDATA
07D0 01          1642                             DB 1
0025             1643     LAMPS   EQU GETCNT+1
07D1 0000    E   1644                             DW LMPDVR
07D3 03          1645                             DB 3
0026             1646     GETKDB  EQU LAMPS+1
07D4 4A07    C   1647                             DW KBDX
07D6 01          1648                             DB 1
                 1649   ; SPARES...
07D7 5900    C   1650                             DW CRASH
07D9 01          1651                             DB 1
                 1652
07DA 5900    C   1653                             DW CRASH
07DC 01          1654                             DB 1
                 1655   ;   TABLE OF SINES......FOR X = 0 TO 0.25 (90 DEGREES), IN STEPS OF 1/128...
                 1656   ;
07DD 00          1657     SINTAB: DB      0,    0    ;0
07DE 00
07DF 24          1658             DB     36,    3    ;1
07E0 03
07E1 48          1659             DB     72,    6    ;2
07E2 06
07E3 6C          1660             DB    108,    9    ;3
07E4 09
07E5 8F          1661             DB    143,   12    ;4
07E6 0C
07E7 B2          1662             DB    178,   15    ;5
07E8 0F
07E9 D5          1663             DB    213,   18    ;6
07EA 12
07EB F6          1664             DB    246,   21    ;7
07EC 15
07ED 17          1665             DB     23,   25    ;8
07EE 19
07EF 37          1666             DB     55,   28    ;9
07F0 1C
07F1 56          1667             DB     86,   31    ;10
07F2 1F
07F3 73          1668             DB    115,   34    ;11
07F4 22
07F5 90          1669             DB    144,   37    ;12
07F6 25
07F7 AA          1670             DB    170,   40    ;13
07F8 28
07F9 C4          1671             DB    196,   43    ;14
07FA 2B
07FB DB          1672             DB    219,   46    ;15
07FC 2E
07FD F1          1673             DB    241,   49    ;16
07FE 31
07FF 05          1674             DB      5,   53    ;17
0800 35
0801 17          1675             DB     23,   56    ;18
0802 38
0803 26          1676             DB     38,   59    ;19
0804 3B
0805 33          1677             DB     51,   62    ;20
0806 3E
0807 3E          1678             DB     62,   65    ;21
0808 41
```

| LOC OBJ | SEQ | SOURCE STATEMENT | | | |
|---|---|---|---|---|---|
| 8809 47 | 1679 | DB | 71, | 68 | ;22 |
| 880A 44 | | | | | |
| 880B 4D | 1680 | DB | 77, | 71 | ;23 |
| 880C 47 | | | | | |
| 880D 50 | 1681 | DB | 80, | 74 | ;24 |
| 880E 4A | | | | | |
| 880F 50 | 1682 | DB | 80, | 77 | ;25 |
| 8810 4D | | | | | |
| 8811 4D | 1683 | DB | 77, | 80 | ;26 |
| 8812 50 | | | | | |
| 8813 47 | 1684 | DB | 71, | 83 | ;27 |
| 8814 53 | | | | | |
| 8815 3E | 1685 | DB | 62, | 86 | ;28 |
| 8816 56 | | | | | |
| 8817 31 | 1686 | DB | 49, | 89 | ;29 |
| 8818 59 | | | | | |
| 8819 22 | 1687 | DB | 34, | 92 | ;30 |
| 881A 5C | | | | | |
| 881B 0E | 1688 | DB | 14, | 95 | ;31 |
| 881C 5F | | | | | |
| 881D F7 | 1689 | DB | 247, | 97 | ;32 |
| 881E 61 | | | | | |
| 881F DC | 1690 | DB | 220, | 100 | ;33 |
| 8820 64 | | | | | |
| 8821 BD | 1691 | DB | 189, | 103 | ;34 |
| 8822 67 | | | | | |
| 8823 9B | 1692 | DB | 155, | 106 | ;35 |
| 8824 6A | | | | | |
| 8825 74 | 1693 | DB | 116, | 109 | ;36 |
| 8826 6D | | | | | |
| 8827 49 | 1694 | DB | 73, | 112 | ;37 |
| 8828 70 | | | | | |
| 8829 19 | 1695 | DB | 25, | 115 | ;38 |
| 882A 73 | | | | | |
| 882B E5 | 1696 | DB | 229, | 117 | ;39 |
| 882C 75 | | | | | |
| 882D AD | 1697 | DB | 173, | 120 | ;40 |
| 882E 78 | | | | | |
| 882F 70 | 1698 | DB | 112, | 123 | ;41 |
| 8830 7B | | | | | |
| 8831 2E | 1699 | DB | 46, | 126 | ;42 |
| 8832 7E | | | | | |
| 8833 E7 | 1700 | DB | 231, | 128 | ;43 |
| 8834 80 | | | | | |
| 8835 9C | 1701 | DB | 156, | 131 | ;44 |
| 8836 83 | | | | | |
| 8837 4B | 1702 | DB | 75, | 134 | ;45 |
| 8838 86 | | | | | |
| 8839 F5 | 1703 | DB | 245, | 136 | ;46 |
| 883A 88 | | | | | |
| 883B 9A | 1704 | DB | 154, | 139 | ;47 |
| 883C 8B | | | | | |
| 883D 39 | 1705 | DB | 57, | 142 | ;48 |
| 883E 8E | | | | | |
| 883F D3 | 1706 | DB | 211, | 144 | ;49 |
| 8840 90 | | | | | |
| 8841 B8 | 1707 | DB | 184, | 147 | ;50 |
| 8842 93 | | | | | |
| 8843 F6 | 1708 | DB | 246, | 149 | ;51 |
| 8844 95 | | | | | |
| 8845 7F | 1709 | DB | 127, | 152 | ;52 |
| 8846 98 | | | | | |
| 8847 02 | 1710 | DB | 2, | 155 | ;53 |
| 8848 9B | | | | | |
| 8849 7F | 1711 | DB | 127, | 157 | ;54 |
| 884A 9D | | | | | |
| 884B F6 | 1712 | DB | 246, | 159 | ;55 |

| LOC | OBJ | SEQ | SOURCE STATEMENT | | |
|---|---|---|---|---|---|
| 884C | 9F | | | | |
| 884D | 67 | 1713 | DB | 103, 162 | ;56 |
| 884E | A2 | | | | |
| 884F | D2 | 1714 | DB | 210, 164 | ;57 |
| 8850 | A4 | | | | |
| 8851 | 36 | 1715 | DB | 54, 167 | ;58 |
| 8852 | A7 | | | | |
| 8853 | 94 | 1716 | DB | 148, 169 | ;59 |
| 8854 | A9 | | | | |
| 8855 | EB | 1717 | DB | 235, 171 | ;60 |
| 8856 | AB | | | | |
| 8857 | 3B | 1718 | DB | 59, 174 | ;61 |
| 8858 | AE | | | | |
| 8859 | 85 | 1719 | DB | 133, 176 | ;62 |
| 885A | B0 | | | | |
| 885B | C8 | 1720 | DB | 200, 178 | ;63 |
| 885C | B2 | | | | |
| 885D | 04 | 1721 | DB | 4, 181 | ;64 |
| 885E | B5 | | | | |
| 885F | 3A | 1722 | DB | 58, 183 | ;65 |
| 8860 | B7 | | | | |
| 8861 | 68 | 1723 | DB | 104, 185 | ;66 |
| 8862 | B9 | | | | |
| 8863 | 8F | 1724 | DB | 143, 187 | ;67 |
| 8864 | BB | | | | |
| 8865 | AE | 1725 | DB | 174, 189 | ;68 |
| 8866 | BD | | | | |
| 8867 | C7 | 1726 | DB | 199, 191 | ;69 |
| 8868 | BF | | | | |
| 8869 | D8 | 1727 | DB | 216, 193 | ;70 |
| 886A | C1 | | | | |
| 886B | E2 | 1728 | DB | 226, 195 | ;71 |
| 886C | C3 | | | | |
| 886D | E4 | 1729 | DB | 228, 197 | ;72 |
| 886E | C5 | | | | |
| 886F | DE | 1730 | DB | 222, 199 | ;73 |
| 8870 | C7 | | | | |
| 8871 | D1 | 1731 | DB | 209, 201 | ;74 |
| 8872 | C9 | | | | |
| 8873 | BB | 1732 | DB | 187, 203 | ;75 |
| 8874 | CB | | | | |
| 8875 | 9F | 1733 | DB | 159, 205 | ;76 |
| 8876 | CD | | | | |
| 8877 | 7A | 1734 | DB | 122, 207 | ;77 |
| 8878 | CF | | | | |
| 8879 | 4D | 1735 | DB | 77, 209 | ;78 |
| 887A | D1 | | | | |
| 887B | 18 | 1736 | DB | 24, 211 | ;79 |
| 887C | D3 | | | | |
| 887D | DB | 1737 | DB | 219, 212 | ;80 |
| 887E | D4 | | | | |
| 887F | 95 | 1738 | DB | 149, 214 | ;81 |
| 8880 | D6 | | | | |
| 8881 | 48 | 1739 | DB | 72, 216 | ;82 |
| 8882 | D8 | | | | |
| 8883 | F2 | 1740 | DB | 242, 217 | ;83 |
| 8884 | D9 | | | | |
| 8885 | 94 | 1741 | DB | 148, 219 | ;84 |
| 8886 | DB | | | | |
| 8887 | 2D | 1742 | DB | 45, 221 | ;85 |
| 8888 | DD | | | | |
| 8889 | BE | 1743 | DB | 190, 222 | ;86 |
| 888A | DE | | | | |
| 888B | 46 | 1744 | DB | 70, 224 | ;87 |
| 888C | E0 | | | | |
| 888D | C5 | 1745 | DB | 197, 225 | ;88 |
| 888E | E1 | | | | |

| LOC OBJ | SEQ | SOURCE STATEMENT | | | |
|---|---|---|---|---|---|
| 888F 3C | 1746 | DB | 60, | 227 | ;89 |
| 8890 E3 | | | | | |
| 8891 AA | 1747 | DB | 170, | 228, | ;90 |
| 8892 E4 | | | | | |
| 8893 0F | 1748 | DB | 15, | 230 | ;91 |
| 8894 E6 | | | | | |
| 8895 6B | 1749 | DB | 107, | 231 | ;92 |
| 8896 E7 | | | | | |
| 8897 BF | 1750 | DB | 191, | 232 | ;93 |
| 8898 E8 | | | | | |
| 8899 09 | 1751 | DB | 9, | 234 | ;94 |
| 889A EA | | | | | |
| 889B 4B | 1752 | DB | 75, | 235 | ;95 |
| 889C EB | | | | | |
| 889D 83 | 1753 | DB | 131, | 236 | ;96 |
| 889E EC | | | | | |
| 889F B2 | 1754 | DB | 178, | 237 | ;97 |
| 88A0 ED | | | | | |
| 88A1 D8 | 1755 | DB | 216, | 238 | ;98 |
| 88A2 EE | | | | | |
| 88A3 F5 | 1756 | DB | 245, | 239 | ;99 |
| 88A4 EF | | | | | |
| 88A5 09 | 1757 | DB | 9, | 241 | ;100 |
| 88A6 F1 | | | | | |
| 88A7 13 | 1758 | DB | 19, | 242 | ;101 |
| 88A8 F2 | | | | | |
| 88A9 14 | 1759 | DB | 20, | 243 | ;102 |
| 88AA F3 | | | | | |
| 88AB 0B | 1760 | DB | 11, | 244 | ;103 |
| 88AC F4 | | | | | |
| 88AD FA | 1761 | DB | 250, | 244 | ;104 |
| 88AE F4 | | | | | |
| 88AF DE | 1762 | DB | 222, | 245 | ;105 |
| 88B0 F5 | | | | | |
| 88B1 BA | 1763 | DB | 186, | 246 | ;106 |
| 88B2 F6 | | | | | |
| 88B3 8B | 1764 | DB | 139, | 247 | ;107 |
| 88B4 F7 | | | | | |
| 88B5 53 | 1765 | DB | 83, | 248 | ;108 |
| 88B6 F8 | | | | | |
| 88B7 12 | 1766 | DB | 18, | 249 | ;109 |
| 88B8 F9 | | | | | |
| 88B9 C7 | 1767 | DB | 199, | 249 | ;110 |
| 88BA F9 | | | | | |
| 88BB 73 | 1768 | DB | 115, | 250 | ;111 |
| 88BC FA | | | | | |
| 88BD 14 | 1769 | DB | 20, | 251 | ;112 |
| 88BE FB | | | | | |
| 88BF AC | 1770 | DB | 172, | 251 | ;113 |
| 88C0 FB | | | | | |
| 88C1 3B | 1771 | DB | 59, | 252 | ;114 |
| 88C2 FC | | | | | |
| 88C3 BF | 1772 | DB | 191, | 252 | ;115 |
| 88C4 FC | | | | | |
| 88C5 3A | 1773 | DB | 58, | 253 | ;116 |
| 88C6 FD | | | | | |
| 88C7 AB | 1774 | DB | 171, | 253 | ;117 |
| 88C8 FD | | | | | |
| 88C9 13 | 1775 | DB | 19, | 254 | ;118 |
| 88CA FE | | | | | |
| 88CB 70 | 1776 | DB | 112, | 254 | ;119 |
| 88CC FE | | | | | |
| 88CD C4 | 1777 | DB | 196, | 254 | ;120 |
| 88CE FE | | | | | |

```
LOC  OBJ      SEQ        SOURCE STATEMENT

03CF 0E       1778       DB    14,   255    ;121
03D0 FF
03D1 4E       1779       DB    78,   255    ;122
03D2 FF
03D3 84       1780       DB    132,  255    ;123
03D4 FF
03D5 B1       1781       DB    177,  255    ;124
03D6 FF
03D7 D3       1782       DB    211,  255    ;125
03D8 FF
03D9 EC       1783       DB    236,  255    ;126
03DA FF
03DB FB       1784       DB    251,  255    ;127
03DC FF
03DD FF       1785       DB    255,  255    ;128  (REQ'D FOR INTERPOLATION)
03DE FF
              1786 ;THE END
              1787       END
```

PUBLIC SYMBOLS

| | | | | | | |
|---|---|---|---|---|---|---|
| ABS      A 000D | ACOS   A 0011 | ASIN   A 0010 | CHGSIN A 000C | COS    A 000F | DISPLY A 0022 | DIV    A 0005 |
| DSPCLR   A 0023 | ENTER  A 0001 | EXCHG  A 0009 | FXPCON C 06F0 | GETCNT A 0024 | GOSUB  A 0013 | GOTO   A 0014 |
| INTPR    C 0010 | LOAD   A 0006 | MINUS  A 0003 | MPY    A 0004 | OPCOD  D 0083 | PLUS   A 0002 | RCL    A 0008 |
| RDWN     C 04F8 | REG1   D 0031 | REGT   D 0010 | REGT1  D 0029 | REGT2  D 0025 | REGT25 D 0027 | REGT27 D 0028 |
| REGX     D 0004 | REGY   D 0008 | REGZ   D 000C | RTN    A 0015 | RUP    C 050F | SIGNX  D 0024 | SIN    A 000E |
| SQRT     A 0012 | STO    A 0007 | STOP   A 0000 | TRCPC  D 009B | XEQ0   A 0016 | XEQY   A 001C | XFRACT D 0098 |
| XGE0     A 0019 | XGEY   A 001F | XGT0   A 0018 | XGTY   A 001E | XINTGR D 0096 | XLE0   A 001B | XLEY   A 0021 |
| XLT0     A 001A | XLTY   A 0020 | XNE0   A 0017 | XNEY   A 001D | | | |

EXTERNAL SYMBOLS

| | | | | | | |
|---|---|---|---|---|---|---|
| DSPBLK E 0000 | DSPCON E 0000 | KBDCHK E 0000 | LMDATA E 0000 | LMPDVR E 0000 | TBLLFT E 0000 | TBLRT E 0000 |
| TRACE  E 0000 | TRAP   E 0000 | | | | | |

USER SYMBOLS

| | | | | | | |
|---|---|---|---|---|---|---|
| ABS      A 000D | ABSX   C 0533 | ACOS   A 0011 | ARCBKT C 0378 | ARCCOS C 03B6 | ARCELP C 036C | ARCHI  C 0361 |
| ARCLO    C 0346 | ARCLP  C 0329 | ARCS1  C 0314 | ARCSIN C 02F7 | ASIN   A 0010 | BIT0   A 0001 | BIT1   A 0002 |
| BIT2     A 0004 | BIT3   A 0008 | BIT4   A 0010 | BIT5   A 0020 | BIT6   A 0040 | BIT7   A 0080 | C0PT0  C 000C |
| C0PT25   C 0000 | C0PT5  C 0004 | C1PT0  C 0008 | CALLSB C 064F | CHGSIN A 000C | COS    A 000F | COSX   C 02E1 |
| CRASH    C 0059 | DISPLY A 0022 | DIV    A 0005 | DSPBLK E 0000 | DSPCLR A 0023 | DSPCON E 0000 | ENTER  A 0001 |
| EXCHG    A 0009 | EXDWN  C 047B | EXDWN2 C 048C | EXDWNX C 045C | EXDWNY C 0462 | EXPEQ  C 0584 | EXPUP  C 0468 |
| EXPUPX   C 0450 | EXPUPY C 0456 | FPADD  C 0062 | FPADD2 C 00A8 | FPADD3 C 0090 | FPADD4 C 0087 | FPD2   C 01B7 |
| FPD3     C 01B8 | FPDIV  C 0177 | FPDLP  C 018A | FPDRET C 01D9 | FPDZRO C 01CD | FPMLP  C 00FF | FPMPY  C 00EC |
| FPMPY2   C 0134 | FPMPY3 C 0135 | FPMPY4 C 0141 | FPSUB  C 00BE | FXPCON C 06F0 | FXPLP  C 070F | FXPMXP C 073C |
| FXPZXP   C 0726 | GETCNT A 0024 | GETKDB C 0826 | GOSUB  A 0013 | GOTO   A 0014 | INTGO  C 004A | INTPLP C 001B |
| INTPR    C 0010 | INTRT  C 0053 | ISTOP  C 0060 | JPX2   C 068C | JPX3   C 06EC | JPXEQ0 C 06B5 | JPXEQY C 06A3 |
| JPXGE0   C 06DA | JPXGEY C 0683 | JPXGT0 C 06C7 | JPXGTY C 067A | JPXLE0 C 06E3 | JPXLEY C 069A | JPXLT0 C 06D1 |
| JPXLTY   C 0690 | JPXNE0 C 06BE | JPXNEY C 06AC | JUMP   C 0674 | KBDCHK E 0000 | KBDX   C 074A | LAMPS  A 0025 |
| LMDATA E 0000   | LMPDVR E 0000 | LOAD   A 0006 | LS24   C 016B | LSBCD  C 01FA | MINUS  A 0003 | MOVBYT C 0646 |
| MPY      A 0004 | NORMLP C 0496 | NORMX  C 0492 | OPCOD  D 0083 | OPTAB  C 0762 | PC     D 0081 | PCSP   D 0094 |
| PCSTK    D 0094 | PLUS   A 0002 | POPLP  C 04D3 | POPX   C 04CB | POPY   C 04DC | PUSHLP C 04EF | PUSHX  C 04E7 |
| RCL      A 0008 | RDWN   C 04F8 | REG0   D 0020 | REG1   D 0031 | REGSIZ A 0014 | REGT   D 0010 | REGT1  D 0029 |
| REGT2    D 0025 | REGT25 D 0027 | REGT27 D 0028 | REGX   D 0004 | REGXSV D 0000 | REGY   D 0008 | REGZ   D 000C |
| RETT15   D 002B | ROLDN  A 000B | ROLUP  A 000A | RS24   C 015F | RTN    A 0015 | RTNSUB C 0663 | RUP    C 050F |
| RUPLP    C 0522 | SCMP8  C 0568 | SIGNX  D 0024 | SIN    A 000E | SINTAB C 07DD | SINX   C 0204 | SINX0  C 0207 |
| SINX1    C 0219 | SINX2  C 022B | SINX3  C 0252 | SINX3A C 0255 | SINX4  C 0273 | SINX4A C 0276 | SQRT   A 0012 |
| SQRT1    C 03D9 | SQRT2  C 03E4 | SQRT3  C 042A | SQRT5  C 043F | SQRT6  C 0433 | SQRT7  C 0449 | SQRTLP C 03F9 |
| SQRTX    C 03C6 | STKSAV C 0614 | STKSIZ A 0004 | STKSLP C 061C | STKSV2 C 061A | STKUSV C 0625 | STO    A 0007 |
| STOP     A 0000 | SVREG  D 0014 | TBLLFT E 0000 | TBLRT  E 0000 | TESTX  C 059D | TESTY  C 05A3 | TPADD  C 00C5 |
| TPSUB    C 00D5 | TRACE  E 0000 | TRAP   E 0000 | TRAPPC D 009D | TRCBIT A 0080 | TRCFLG D 009A | TRCPC  D 009B |
| TST2     C 05A6 | UCMP8  C 0576 | UCMPM  C 0580 | XCHGB  C 04BF | XCHGSN C 052B | XEQ0   A 0016 | XEQ2   C 0597 |
| XEQY     A 001C | XFRACT D 0098 | XGE0   A 0019 | XGEY   A 001F | XGT0   A 0018 | XGTY   A 001E | XINTGR D 0096 |

```
 .LP  C 05C1    XLDZXP C 05CA    XLE0   A 001B    XLEY   A 0021    XLOAD  C 0587    XLT0  A 001A    XLTY   A 0020
 :E0  A 0017    XNEY   A 001D    XRCL   C 05FA    XRCLLP C 0608    XSAVE  C 062E    XSTO  C 05E5    XSTOLP C 05F1
 SAY  C 063A    XYCMP  C 053B    XYCMP2 C 0551    XYCMP3 C 055D    XYXCHG C 04B7    ZEX2  C 04B1    ZEXPX  C 04A1
 _LP  C 0502

SEMBLY COMPLETE, NO ERROR(S)
```

I claim:

1. In the combination of a suspect optical system for measurement of deflection, at least one light source emanating at least three spaced apart discrete beams passed to said suspect optical system and deflected by said suspect optical system to a deviated beam path for measurement within a preselected area of excursion; and, means for measurement of said deviated path, the improvement in said means for measurement of said deviated path comprising: a moving boundary locus placed in a known plane at a preselected distance from said suspect optical system; said moving boundary locus arranged for sweeping movement along a predetermined path within said known plane, said boundary locus including a first portion, a second portion and at least two boundaries therebetween of distinctly different shape with each of said boundaries sweeping at differing angularities with respect to the predetermined path of said moving boundary locus to provide a single unambiguous point of boundary intersection; means for sweeping said moving boundary locus along said predetermined path producing occultation of each said beam by said boundaries; one of said portions including equal intervals between said boundaries with respect to the path of sweep of said locus whereby said portion occupies the interval between said light source and detector for equal interval of sweeping movement at all positions of excursion of each said beam and the other portion of said locus including changing intervals between said boundaries with respect to the path of sweep of said locus whereby said other portion occupies the interval between said light source and detector for differing intervals of sweeping movement at differing positions of excursion of each said beam; said differing intervals being proportional to the displacement of said beams with respect to the path of sweep of said locus; at least one photosensitive detector aligned to receive each said beam; means for identification of each said beam from all other beams; means for measuring the position of said moving boundary locus when said detector detects produced occultation of each said beam at said boundaries of said moving boundary locus whereby at least one measurement of each of said moving boundaries of said moving boundary locus at the time of detector detection of occultation of each said beam measures the excursion of said beam due to deflection of said suspect optics.

2. The combination of claim 1 and wherein said light source is independent of said moving boundary locus.

3. The combination of claim 1 and wherein said photodetector is independent of said moving boundary locus.

4. The combination of claim 1 and wherein said first portion of said moving boundary locus is substantially opaque and said second portion of said moving boundary locus is substantially transparent and said moving boundary locus intercepts said light source between said light source and said photodetector.

5. The combination of claim 1 and wherein said moving boundary locus sweeps along said predetermined path to produce occultation at a substantially constant velocity.

6. The combination of claim 1 and wherein said suspect optics refract each of said beams.

7. The combination of claim 1 and wherein each of said beams from said light source is collimated.

8. The combination of claim 1 and wherein each of said beams from said light source is not collimated.

9. The combination of claim 1 and wherein said locus produces occultation of each of said beams after passage through said suspect optics.

10. The combination of claim 1 and wherein said locus occults each of said beams before passage through said suspect optics.

11. The combination of claim 1 and including means for optically deflecting said beam within said preselected area of excursion to said detector, said optically deflecting means positioned immediately adjacent said moving boundary locus.

12. The invention of claim 1 and wherein said moving boundary locus rotates.

13. The invention of claim 1 and wherein said moving boundary locus is arranged to rotate about an axis within said plane; and, said axis of rotation of said moving boundary locus is displaced to one side of said plane.

14. The invention of claim 1 and including a rotating moving boundary locus having a first area for determining the rotational position of said moving boundary locus and a second area containing said substantially transparent portion and said substantially opaque portion with said boundaries therebetween; and, means for reading said first area to determine the precise rotational position of said moving boundary locus.

15. In the combination of a suspect optical system for measurement of deflection, at least one light source emanating at least three spaced apart discrete beams passed to said suspect optical system and deflected by said suspect optical system of a deviated path for measurement within a preselected area of excursion; means for measurement of said deviated path, the improvement in said means for measurement of said deviated path comprising: a moving boundary locus placed in a known plane at a preselected distance from said suspect optical system, said moving boundary locus arranged for movement along a predetermined path within said known plane, said boundary locus including a first portion, a second portion, and at least two boundaries therebetween each having a different slope with each of said boundaries sweeping at differing intersecting angularities with respect to the predetermined path of said moving boundary locus to provide a single unambiguous point of boundary intersection at all positions of excursion of each said beam; one of said portions including equal intervals between said boundaries with respect to the path of sweep of said locus whereby said portion occupies the interval between said light source and detector for equal interval of sweeping movement at all positions of excursion of each said beam and the other portion of said locus including changing intervals between said boundaries with respect to the path of sweep of said locus whereby said other portion occupies the interval between said light source and detector for differing intervals of sweeping movement at differing positions of excursion of each said beam; said differing intervals proportional to the displacement of said beams with respect to the path of sweep of said locus; first and second beams deflected through said suspect optical system; means for moving said moving boundary locus along said predetermined path for produced occultation of said beams by said boundaries; at least one photosensitive detector aligned to receive said respective first and second beams; means for identification of each said beam from all other beams; means for measuring the position of said moving boundary locus when each said detector detects the occultation of a light beam produced at said boundaries of said moving boundary locus; and, means for computing and displaying at least the power of said suspect optics in sphere from at least one measurement of the position of each of said moving boundaries of said moving boundary locus at a time of detector detection of occultation for each of said beams.

16. The combination of claim 15 and wherein said moving boundary locus is arranged to rotate about an axis within said plane; and, said axis of rotation of said moving boundary locus is displaced to one side of said plane so that said preselected area of excursion lies on said moving boundary locus outside of the axis of rotation of said moving boundary locus.

17. The combination of claim 15 and including a rotating moving boundary locus having a first area for determining the rotational position of said moving boundary locus and a second area containing said first and second portions with said boundaries therebetween; and, means for reading said first area to determine the rotational position of said moving boundary locus.

18. The combination of claim 15 and wherein said moving boundary locus intercepts said light beam between said light source and said photodetector.

19. The combination of claim 15 and wherein said first portion of said moving boundary locus is substantially opaque at one portion and defines said other portion exteriorly of said opaque portion.

20. The combination of claim 15 and wherein said other portion of said moving boundary locus is solid and transparent.

21. The combination of claim 15 and including respective discrete photodetectors for respective receipt of said each beam.

22. The combination of claim 15 and including optical deflecting means adjacent said moving boundary locus for directing said respective beams to respective photodetectors.

23. Apparatus for measurement of the deviated path of at least two beams of light having spaced apart discrete beams with all said beams confined within a preselected area of excursion comprising; a moving boundary locus placed to intercept said beam in a known plane at a preselected distance from the point of deviation of said light beam; said moving boundary locus arranged for movement along a predetermined path at a velocity within said known plane; said boundary locus including a first substantially transparent portion, a second substantially opaque portion, and at least two boundaries therebetween with each of said boundaries sweeping said beam at differing intersecting angularities with respect to the predetermined path of said moving boundary locus one of said boundaries being defined by the equation $R = +K\theta$ and the another of said boundaries being defined by the equation $R = -K\theta$ where $\theta$ is the angle from a central point of said boundary and K is a constant said boundaries providing a single unambiguous point of boundary intersection at all positions of excursion of said beams; means for moving said moving boundary locus at said velocity along said predetermined path for occultation of said beam by said boundaries; a discrete photosensitive detector for each said beam to receive said each beam; means for measuring the position of said moving boundary locus when said detector detects occultation of said light beam by said boundaries of said moving boundary locus whereby at least one measurement of each of said moving boundaries of said moving boundary locus at the time of detector detection of occultation measures the excursion of said beam.

24. The invention of claim 23 and wherein said moving boundary locus occults said beam before deviation.

25. The invention of claim 23 and wherein said moving boundary locus occults said beam after deviation.

26. The invention of claim 23 and where said moving boundary locus is arranged to rotate about an axis within said plane; and, the axis of rotation of said moving boundary locus is displaced to one side of said plane so that said preselected area of excursion lies on said moving boundary locus outside of the axis of rotation of said moving boundary locus.

27. The invention of claim 23 and including a moving boundary locus having two substantially opaque portions and two substantially transparent portions; said boundaries of said moving boundary locus including two said boundaries described by the equation $R = -k\theta$, and two said boundaries described by the equation $R = +k\theta$.

28. The invention of claim 23 and wherein all of said transparent portions located at a distance R from the center of rotation of said moving boundary locus are separated by equal angular intervals.

29. Apparatus for remote determination of sphere, cylinder, cylinder axis and prism from suspect optics comprising in combination: at least one light source for emanating light at one end of a light path; a sampling interval for the placement of suspect optics in said light paths; means for optically directing light from said emission area to a plurality of at least three spaced apart non-colinear sampling apertures at said sampling interval for deflection of said light at each aperture by said suspect optics; a moving boundary locus having a substantially opaque portion, a substantially transparent portion and at least two boundaries therebetween; a detector having a photosensitive portion for receiving light from each sampling aperture, said detector placed at the other end of said light path with said sampling interval and locus between said detector and light source; one of said portions including equal intervals between said boundaries with respect to the path of sweep of said locus whereby said portion occupies the interval between said light source and detector for equal interval of sweeping movement at all positions of excursion of each said beam and the other portion of said locus including changing intervals between said boundaries with respect to the path of sweep of said locus whereby said other portion occupies the interval between said light source and detector for differing intervals of sweeping movement at differing positions of excursion of each said beam; said differing intervals proportional to the displacement of said beams with respect to the path of sweep of said locus; means for identification of each said beams from all other said beams; means for moving said moving boundary locus along a preselected path of movement on said light path, one of said boundaries of said locus having an algebraically larger slope across said light path than the other of said boundaries with respect to a preselected path of movement of said locus to occult light from said light source to said detector at said boundaries and to provide at the time of occultation of each said boundary a single unambiguous point of boundary intersection at a position of excursion of said beams; position sensing means for sensing the position of said moving boundary locus across said light path; and means for relating locus occultation sensed at said detector to locus position to determine the power of suspect optics in sphere, cylinder, cylinder axis and prism.

30. Apparatus of claim 29 and wherein locus occults beam after passage through said sampling apertures.

31. Apparatus according to claim 29 and wherein said optically directing means directs collimated light from said light through said sampling apertures and said moving boundary locus occults said light source between said detector and said sampling apertures.

32. Apparatus of claim 29 and wherein locus occults beams before passage through said sampling apertures.

33. Apparatus according to claim 29 and wherein said means for optically directing directs non-collimated light through said sampling apertures and said moving boundary locus occults said light between said emission area and said sampling apertures.

34. A process of measuring the optical power of suspect optics comprising the steps of providing a light source, passing at least three discrete spaced apart beams from said light source to said suspect optics; providing a moving boundary locus placed to produce occultation of all said beams in a known plane at a preselected distance from said suspect optical system, said provided moving boundary locus including a first substantially transparent portion, a second substantially opaque portion and at least two boundaries therebetween of a distinctly different shape to provide a single unambiguous point of boundary intersection at all positions of excursion of said beams; one of said portions including equal intervals between said boundaries with respect to the path of sweep of said locus whereby said portion occupies the interval of sweeping movement at all positions of excursion of each said beam and the other portion of said locus including changing intervals between said boundaries with respect to the path of sweep of said locus whereby said other portion occupies the interval between said light source and detector for differing intervals of sweeping movement at differing positions of excursion of each said beam; said differing intervals proportional to the displacement of said beams with respect to the path of sweep of said locus; moving said moving boundary locus along a path whereby each of said boundaries sweep each said beam from said light source at differing angularities with respect to a predetermined path of movement for said moving boundary locus; sensing the time of an occultation of said light beam at a preselected point; measuring the position of said moving boundary locus when occultation is detected of each said light beam by said boundaries of said moving boundary locus whereby at least one measurement of each of said moving boundaries of said moving boundary locus at the time of detection of said occultation measures the excursion of said beam due to deflection by said suspect optics.

35. The process of claim 34 and wherein said step of moving said moving boundary locus includes the steps of providing a photosensor, and placing said photosensor at one end of said light path with said locus between said photosensor and light source.

36. The process of claim 34 and wherein said passing a beam step includes passing a plurality of at least three beams.

37. The process of claim 36 and including the steps of computing the power of said suspect optics in sphere, cylinder, cylinder axis and prism.

38. In the combination of a suspect optical system for measurement of deflection, a light source emanating a beam passing through said suspect optical system and deflected by said suspect optical system to a deviated path within a preselected area of excursion and means for detecting said light source at the end of a path, the improvement in said means for detecting comprising: a photodetector placed at the end of said path for interception of said beam; a moving boundary locus placed in said light path between said light source and said photodetector, said boundary locus including a first substantially transparent portion, a second substantially opaque portion and boundaries between said portions; means for sweeping said moving boundary locus between said light source and detecting means; first means for measuring and maintaining the value of said photodetector when occultation by said first substantially transparent portion occurs; second means for measuring and maintaining the value of said photodetector state when occultation by said substantially opaque portion occurs; camparator means operably connected to said first and second measuring and maintaining means for detecting passage of said photodetector when said photodetector passes a state which is the average between said maintained states.

* * * * *